(12) United States Patent
Tour et al.

(10) Patent No.: US 12,054,391 B2
(45) Date of Patent: Aug. 6, 2024

(54) FLASH JOULE HEATING SYNTHESIS METHOD AND COMPOSITIONS THEREOF

(71) Applicant: WILLIAM MARSH RICE UNIVERSITY, Houston, TX (US)

(72) Inventors: James Mitchell Tour, Bellaire, TX (US); Duy X. Luong, Houston, TX (US); Wilbur Carter Kittrell, Houston, TX (US); Weiyin Chen, Houston, TX (US)

(73) Assignee: William Marsh Rice University, Houston, TX (US)

( * ) Notice: Subject to any disclaimer, the term of this patent is extended or adjusted under 35 U.S.C. 154(b) by 228 days.

(21) Appl. No.: 17/272,895

(22) PCT Filed: Aug. 23, 2019

(86) PCT No.: PCT/US2019/047967
§ 371 (c)(1),
(2) Date: Mar. 2, 2021

(87) PCT Pub. No.: WO2020/051000
PCT Pub. Date: Mar. 12, 2020

(65) Prior Publication Data
US 2021/0206642 A1  Jul. 8, 2021

Related U.S. Application Data

(60) Provisional application No. 62/880,482, filed on Jul. 30, 2019, provisional application No. 62/727,510, filed on Sep. 5, 2018.

(51) Int. Cl.
*C01B 32/184* (2017.01)
*H01B 1/04* (2006.01)

(52) U.S. Cl.
CPC ............ *C01B 32/184* (2017.08); *H01B 1/04* (2013.01); *C01B 2204/22* (2013.01); *C01B 2204/32* (2013.01); *C01P 2002/72* (2013.01); *C01P 2002/82* (2013.01); *C01P 2002/85* (2013.01); *C01P 2002/88* (2013.01); *C01P 2004/04* (2013.01)

(58) Field of Classification Search
None
See application file for complete search history.

(56) References Cited

U.S. PATENT DOCUMENTS

| | | | |
|---|---|---|---|
| 9,440,857 B2 | 9/2016 | Sorensen et al. | |
| 2014/0134409 A1* | 5/2014 | Odagawa | C01B 32/184 427/457 |
| 2017/0062821 A1 | 3/2017 | Tour et al. | |
| 2017/0247257 A1 | 8/2017 | Jung et al. | |
| 2021/0206642 A1 | 7/2021 | Tour et al. | |

FOREIGN PATENT DOCUMENTS

| | | | | |
|---|---|---|---|---|
| CN | 106927452 A | * | 7/2017 | ............ B82Y 30/00 |
| CN | 113165880 A | | 7/2021 | |
| EP | 3178967 A1 | | 6/2017 | |
| IN | 475929 | | 12/2023 | |
| JP | 2017222538 A | | 12/2017 | |
| WO | WO-2016040948 A1 | * | 3/2016 | ............ B01J 19/087 |
| WO | WO-2016133571 A2 | * | 8/2016 | ........... C01B 32/184 |
| WO | 2020051000 A1 | | 3/2020 | |

OTHER PUBLICATIONS

Intellectual Property India; Examination Report for Indian Application No. 202147013459, dated Sep. 6, 2022; 6 pages.
Yu, Y. et al., "High phase-purity 1 T' -MoS2- and 1 T' -M0Se2-layered crystals," Nat. Chem., 2018, 10, 638-643 ("Yu 2018"). 6 pages.
Zhang, C. et al., "Single-Atomic Ruthenium Catalytic Sites on Nitrogen-Doped Graphene for Oxygen Reduction Reaction in Acidic Medium," ACS Nano 2017, 11, 6930-6941 ("C. Zhang 2017"). 12 pages.
Zhang, J. et al., "Efficient Water-Splitting Electrodes Based on Laser-Induced Graphene," ACS Appl. Mater. Interfaces 2017, 9, 26840-26847 ("J Zhang 2017"). 8 pages.
Zhang, J. et al., "In Situ Synthesis of Efficient Water Oxidation Catalysts in Laser-Induced Graphene," ACS Energy Lett. 2018, 3, 677-683 ("J Zhang 2018"). 7 pages.
Intenational Searching Authority, International Search Report and Written Opinion for PCT/ US2019/047967 dated Dec. 16, 2019; 21 pages.
Patent Cooperation Treaty, International Preliminary Report on Patentability for PCT/US2019/047967 dated Mar. 9, 2021; 11 pages.
Acerce, M. et al., "Metallic 1 T phase MoS2 nanosheets as supercapacitor electrode materials," Nat. Nanotech., 2015, 10, 313-318 ("Acerce 2015"). 6 pages.
Advincula, P. et al., "Accommodating volume change and imparting thermal conductivity by encapsulation of phase change materials in carbon nanoparticles," J of Mater. Chem. A, 2018, 6, 2461-2467 ("Advincula 2018"). 7 pages.
Allen, M. et al., "Honeycomb carbon: a review of graphene," Chem. Rev., 2009, 110, 132-145 ("Allen 2009"). 14 pages.
Allen, S. et al., "Atmospheric transport and deposition of microplastics in a remote mountain catchment," Nat. Geosci. 12, 339-344 (2019). 9 pages.
Brenner, D. et al., "A second-generation reactive empirical bond order (REBO) potential energy expression for hydrocarbons," J Phys.: Condens. Matter, 2002, 14, 783 ("Brenner 2002"). 21 pages.
Cai, M. et al., "Methods of graphite exfoliation," J Mater. Chem., 2012, 22, 24992-25002 ("Cai 2012"). 11 pages.
Chang, K. et al., "Targeted Synthesis of 2H- and 1 T-Phase MoS2 Monolayers for Catalytic Hydrogen Evolution," Adv. Mater., 2016, 28, 10033-10041 ("Chang 2016"). 9 pages.

(Continued)

*Primary Examiner* — Tanisha Diggs
(74) *Attorney, Agent, or Firm* — Dickinson Wright PLLC; Ross Spencer Garsson

(57) ABSTRACT

Methods for the synthesis of graphene, and more particularly the method of synthesizing graphene by flash Joule heating (FJH). Such methods can be used to synthesize turbostratic graphene (including low-defect turbostratic graphene) in bulk quantities. Such methods can further be used to synthesize composite materials and 2D materials.

4 Claims, 47 Drawing Sheets

(56) References Cited

OTHER PUBLICATIONS

Duy, L. et al., "Laser-induced graphene fibers," Carbon, 2018, 126, 472-479 ("Duy 2018"). 8 pages.
Eda, G., et al., "Large-area ultrathin films of reduced graphene oxide as a transparent and flexible electronic material," Nat. Nano., 2008, 3, 270 ("Eda 2008"). 5 pages.
Ferrari, A. et al. "Raman spectroscopy of graphene and graphite: Disorder, electron-phonon coupling, doping and nonadiabatic effects," Solid State Commun., 2007, 143, 47-57 ("Ferrari 2007"). 11 pages.
Ferrari, A. et al., "Raman spectroscopy as a versatile tool for studying the properties of graphene," Nat. Nano., 2013, 8, 235 ("Ferrari 2013"). 12 pages.
Ferrari, A. et al., "Raman spectrum of graphene and graphene layers," Phys. Rev. Lett., 2006, 97, 187401 ("Ferrari 2006"). 4 pages.
Garlow, J. et al., "Large-area growth of turbostratic graphene on Ni (111) via physical vapor deposition," Scientific reports, 2016, 6, 19804 ("Garlow 2016"). 11 pages.
Gibb, B. "Plastics are forever," Nat. Chem. 11, 394-395 (2019). 2 pages.
Gustavsson, J. et al., "Global food losses and food waste," FAQ Rome, 2011 ("Gustavsson 2011"). 37 pages.
Han, X. et al., "Laser-Induced Graphene from Wood Impregnated with Metal Salts and Use in Electrocatalysis," ACS Appl. Nano Mater. 2018, 9, 5053-5061 ("Han 2018"). 9 pages.
Hao, Y. et al., "Probing Layer Number and Stacking Order of Few-Layer Graphene by Raman Spectroscopy," Small, 1990, 6(2), 195-200 ("Hao 1990"). 6 pages.
Harris, P., "Engineering carbon materials with electricity," Carbon, 2017, 122, 504-513 ("Harris 2017"). 10 pages.
Hernandez, Y. et al., "High-yield production of graphene by liquid-phase exfoliation of graphite," Nat. Nano., 2008, 3, 563 ("Hernandez 2008"). 6 pages.
Hofmann, M. et al., "Controlling the properties of graphene produced by electrochemical exfoliation", Nanotechnology IOP Publishing, vol. 26, No. 33, Jul. 29, 2015, p. 335607. 6 pages.
Hosseini, E. et al., "Tunable, multifunctional ceramic composites via intercalation of fused graphene-boron nitride nanosheets," ACS App. Mater. Interf, 2019, 11, 8635-8644 ("Hosseini 2019"). 10 pages.
Jambeck, J. et al., "Plastic waste inputs from land into the ocean," Science, 2015, 347, 768-771 ("Jambeck 2015"). 5 pages.
Kato, H. et al., "Growth and Raman spectroscopy of thickness-controlled rotationally faulted multilayer graphene," Carbon, 2019, 141, 76-82 ("Kato 2019"). 7 pages.
Kim, K. et al., "Raman spectroscopy study of rotated double-layer graphene: misorientation-angle dependence of electronic structure," Phys. Rev. Lett., 2012, 108, 246103 ("'Kim 2012"). 16 pages.
Kiselov, V. et al., "The growth of weakly coupled graphene sheets from silicon carbide powder," Semiconductor physics quantum electronics & optoelectronics, 2014, 301-307 ("Kiselov 2014"). 7 pages.
Kudin, K. et al., "Raman spectra of graphite oxide and functionalized graphene sheets," Nano Lett., 2008, 8, 36-41 ("'Kudin 2008"). 6 pages.
Kumar, N. et al., "High-temperature phase transformation and low friction behaviour in highly disordered turbostratic graphite," J Phys. D: Appl. Phys., 2013, 46, 395305 ("Kumar 2013"). 11 pages.
Li, D. et al., "Processable aqueous dispersions of graphene nanosheets," Nat. Nano., 2008, 3, 101 ("Li 2008"). 5 pages.
Li, Z. et al., "X-ray diffraction patterns of graphite and turbostratic carbon," Carbon, 2007, 45, 1686-1695 ("Li 2007"). 10 pages.
In, J. et al., "Laser-Induced Porous Graphene Films from Commercial Polymers," Nature Comm. 2014, 5:5714 ("Lin 2014"). 8 pages.
In, L. et al., "Synthesis challenges for graphene industry," Nat. Mater. 18, 520-524(2019). 5 pages.

Liu, J. et al., "Reinforcing Mechanism of Graphene and Graphene Oxide Sheets on Cement-Based Materials," J. Mater. Civ. Eng. 31, 04019014 (2019). 9 pages.
Malard, L. et al., "Raman spectroscopy in graphene," Phys. Rep., 2009, 473, 51-87 ("Malard 2009"). 37 pages.
Moghaddam, S. et al., "Morphogenesis of cement hydrate," J of Mater. Chem. A, 2017, 5, 3798-3811 ("Moghaddam 2017"). 14 pages.
Ni, Z. et al. "Probing Charged Impurities in Suspended Graphene Using Raman Spectroscopy," ACS Nano, 2009, 3, 569-574 ("Ni 2009"). 6 pages.
Niilisk, A. et al., "Raman characterization of stacking in multi-layer graphene grown on Ni," Carbon, 2016, 98, 658-665 ("Niilisk 2016"). 8 pages.
Novoselov, K. et al., "Electric Field Effect in Atomically Thin Carbon Films," Science, 2009, 306, 666-669 ("Novoselov 2004"). 5 pages.
Novoselov, K. et al., "Two-dimensional gas of massless Dirac fermions in graphene," Nature, 2005, 438, 197 ("Novoselov 2005"). 4 pages.
Parfitt, J. et al., "Food waste within food supply chains: quantification and potential for change to 2050," Philos. Trans. R Soc. Lond B Biol. Sci., 2010, 365, 3065-3081 ("Parfitt 2010"). 17 pages.
Partoens, B. et al., "From graphene to graphite: Electronic structure around the K point," Physical Review B, 2006, 74, 075404 (Partoens 2006). 11 pages.
Plimpton, S., "Fast parallel algorithms for short-range molecular dynamics," J Comput. Phys., 1995, 117, 1-19 ("Plimpton 1995"). 19 pages.
Stankovich, S. et al., "Synthesis of graphene-based nanosheets via chemical reduction of exfoliated graphite oxide," Carbon, 2007, 45, 1558-1565 ("Stankovich 2007"). 8 pages.
Stuart, S. et al., "A reactive potential for hydrocarbons with intermolecular interactions," J Chem. Phys., 2000, 112, 6472-6486 ("Stuart 2000"). 16 pages.
Wang, C. et al., "Hexagonal Boron Nitride-Graphene Core-Shell Arrays Formed by Self-Symmetrical Etching Growth," J Am. Chem. Soc., 2017, 139, 13997-14000 ("Wang 2017"). 4 pages.
Xu, Y. et al., "Liquid-Phase exfoliation of graphene: An overview on exfoliation media, techniques, and challenges," Nanomaterials 8, 942 (2018). 32 pages.
Yan, Z. et al., "Hexagonal graphene onion rings," J Am. Chem. Soc. 2013, 13 5, 10755-10762 ("Yan 2013"). 8 pages.
Yan, Z. et al., "Toward the Synthesis of Wafer-Scale Single-Crystal Graphene on Copper Foils," ACS Nano 2012, 6, 9110-9117 ("Yan 2012"). 8 pages.
Yao, Y. et al., "Carbothermal shock synthesis of high-entropy-alloy nanoparticles," Science 359, 1489-1494 ("Yao 2018"). 7 pages.
Ye, R. et al.,. "Laser-Induced Graphene," Acc. Chem. Res. 2018, 51, 1609-1620. ("Ye 2018"). 12 pages.
Yi, M. et al., "A review on mechanical exfoliation for the scalable production of graphene," J of Mater. Chem. A, 2015, 3, 11700-11715 ("Yi 2015"). 16 pages.
Office Action for Brazilian Application No. BR112021004146-0, dated Dec. 26, 2022; 7 pages.
Japanese Patent Office, Notice of Rejection for Japanese Patent Application No. 2021-512688, dated Apr. 26, 2023; 6 pages.
Russian Patent Office, Office Action for Russian Patent Application No. 2021108973, dated Jun. 14, 2023; 12 pages with translation.
Israel Patent Office, Office Action for Israel Patent Application No. 281259, dated Aug. 15, 2023; 3 pages.
China National Intellectual Property Administration, Office Action for Chinese Patent Application No. 201980067945.6, dated Dec. 27, 2023; 14 pages with translation.
Japanese Patent Office, Notice of Rejection for Japanese Patent Application No. 2021-512688, dated Nov. 2, 2023; 12 pages with translation.
Russian Patent Office, Office Action for Russian Patent Application No. 2021108973, dated Nov. 9, 2023; 11 pages with translation.

* cited by examiner

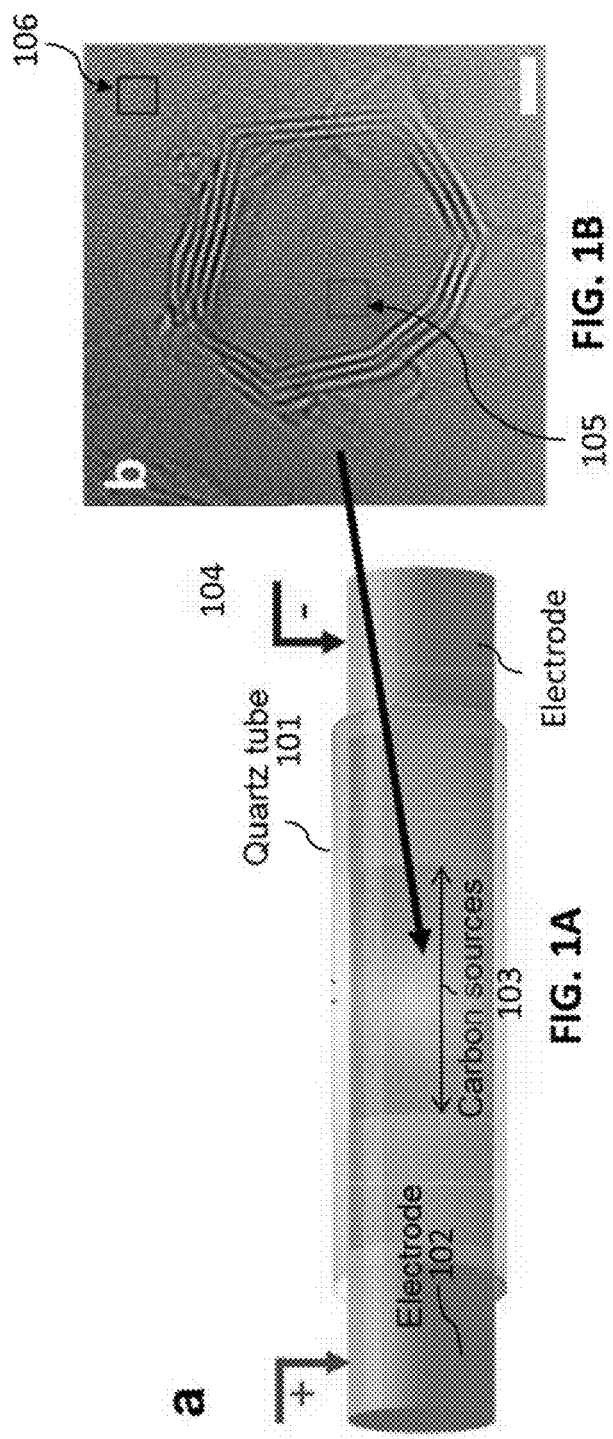

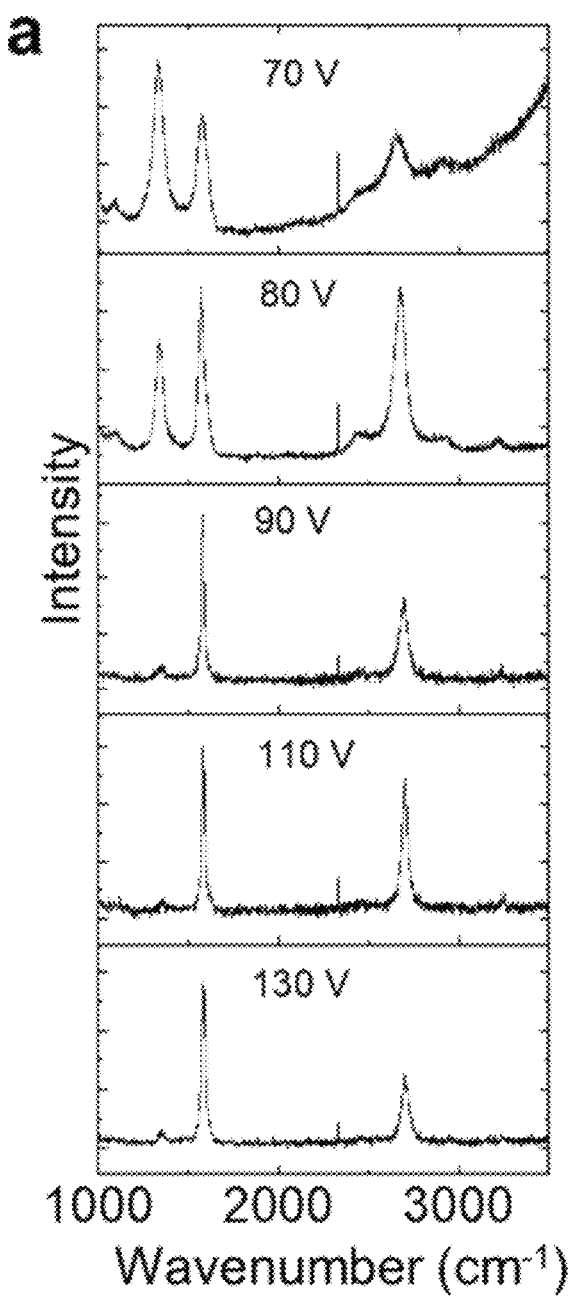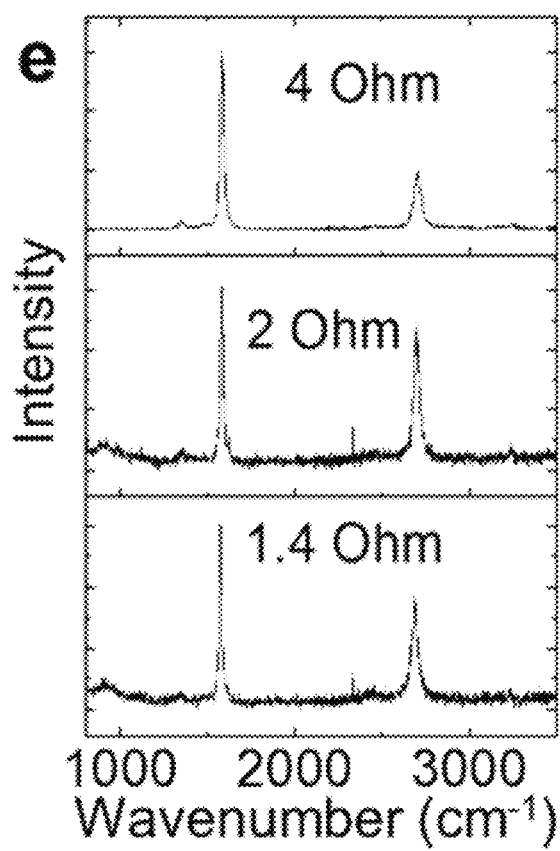
FIG. 5A
FIG. 5E

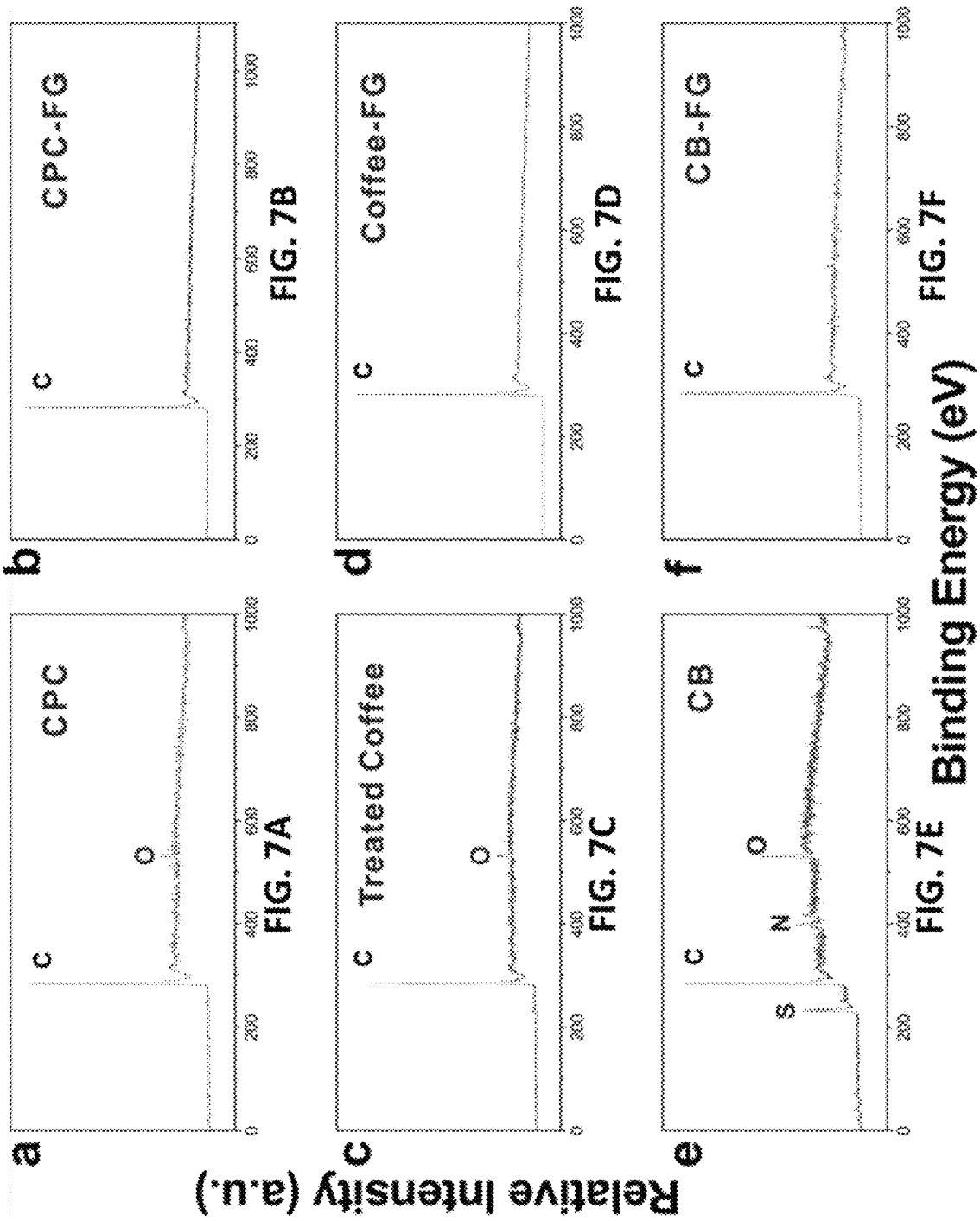

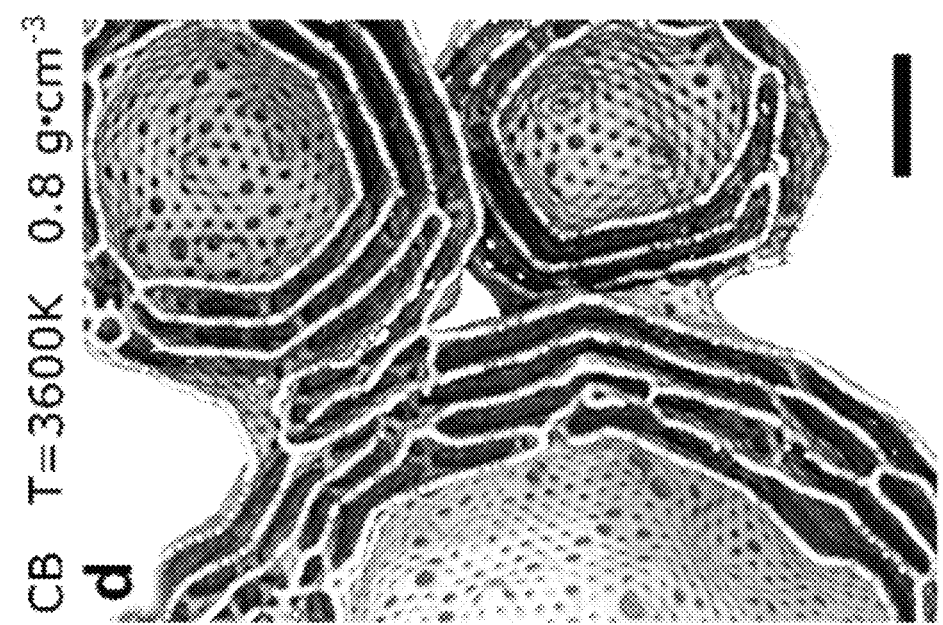
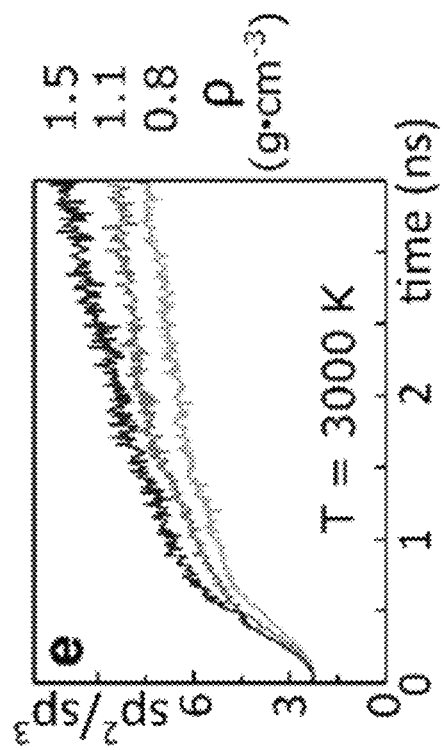
FIG. 9E
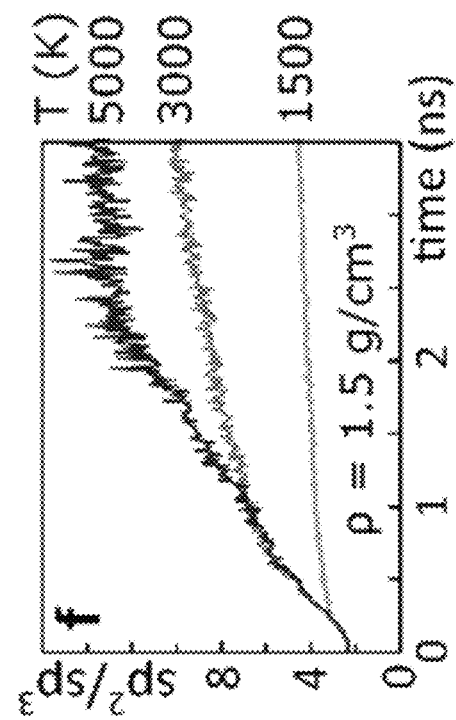
FIG. 9F
FIG. 9D

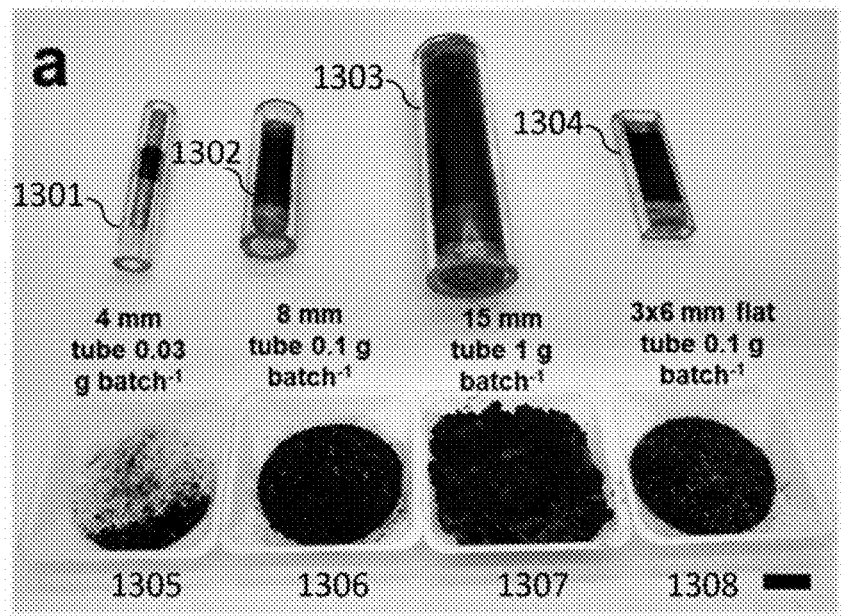
FIG. 13A
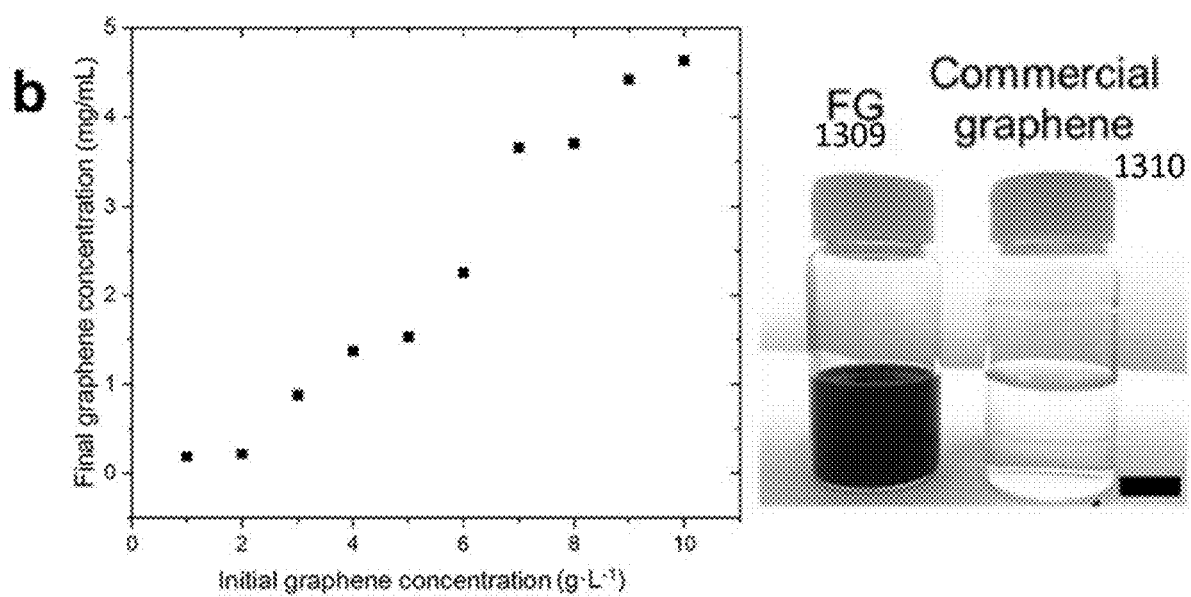
FIG. 13B  FIG. 13E

(a)

(b)

us 12,054,391 B2

FLASH JOULE HEATING SYNTHESIS METHOD AND COMPOSITIONS THEREOF

CROSS-REFERENCE TO RELATED PATENT APPLICATIONS

This application is a 35 U.S.C § 371 national application of PCT Application No. PCT/US2019/047967, filed on Aug. 23, 2019, entitled "Flash Joule Heating Synthesis Method And Compositions Thereof," which claims priority to U.S. Patent Appl. Ser. No. 62/727,510, filed Sep. 5, 2018 and U.S. Patent Appl. Ser. No. 62/880,482, filed Jul. 30, 2019, each entitled "Sub-Second Graphene Synthesis By Flash Joule Heating." These patent applications are commonly owned by the owner of the present invention. These patent applications are incorporated herein in their entirety.

GOVERNMENT INTEREST

This invention was made with government support under Grant No. FA9550-14-1-0111, awarded by the United States Department of Defense/Air Force Office of Scientific Research. The United States government has certain rights in the invention.

TECHNICAL FIELD

The present invention relates to methods for the synthesis of graphene and other materials, and more particularly the method for the bulk synthesis of turbostratic graphene and other materials by flash Joule heating (FJH).

BACKGROUND

Most bulk-scale graphene is produced by a top-down approach through the exfoliation of graphite, often requiring large amounts of solvent with high energy mixing, shearing, sonication or electrochemical treatment. [Allen 2009; Yi 2015; Hernandez 2008]. This affords AB-stacked graphene where there is highly aligned order between the graphene layers. While chemical oxidation of graphite to graphene oxide promotes exfoliation, it requires harsh oxidants and leaves the graphene with a defective perforated structure upon the subsequent reduction step. [Hernandez 2008; Eda 2008]. Bottom-up synthesis of high-quality graphene is often restricted to ultra-small amounts if done by chemical vapor deposition or advanced synthetic organic methods, or it affords a defect-ridden structure if done in bulk solution. Eda 2008; Li 2008]. Accordingly, there is a need for an improved process to synthesize graphene and other materials.

SUMMARY OF THE INVENTION

It has been discovered that flash Joule heating (FJH) of many inexpensive carbon sources, such as coal, petroleum coke, biochar, carbon black, discarded food, rubber tires, and mixed plastic waste can afford graphene in gram-scales in less than 1 second. The graphene is termed "flash graphene" ("FG"). The process uses no furnace and no solvents or reactive gases. Yields depend upon the carbon content of the source; if using a high carbon source, yields can range from 80 to 90% with a carbon purity greater than 99%. By Raman spectroscopic analysis, FG shows a low intensity or absent D band with $I_{2D/G}$ reaching more than 10 and sometimes even 17, making FG among the lowest defect graphene ever reported. FG is turbostratic as observed by Raman analysis, meaning that is has little order between the graphene layers, thereby facilitating its rapid exfoliation upon mixing during composite formation; such rapid exfoliation cannot be accomplished from the more common AB-stacked graphene. The turbostratic nature of FG distinguishes it from most other forms of bulk graphene synthesis which produce AB-stacked graphene. FG is particularly attractive since mixed plastic waste can be converted into a single component graphene while discarded food waste can become fixed carbon FG rather than carbon dioxide and methane in landfills. The electrical energy cost for FG synthesis is only around 7.2 kJ·g$^{-1}$. This renders FG suitable for use in bulk composites of plastic, metals, paints, concrete and other building materials. Its turbostratic nature facilitates FG's good dispersion in this wide range of composites and solvents.

Moreover, 2D materials can be prepared by applying voltage pulse(s) (i.e., flash Joule heating) across respective precursors. The present invention further encompasses a method to synthesize different kinds of 2D materials in millisecond timescales and the cost of this method is very low. Compared with the other methods, such as chemical vapor deposition (CVD) and hydrothermal methods, a higher yield can be obtained in a much shorter time period, and without the need to use any solvent in the progress (which is much more economical). The voltage pulse process is very short, which makes it possible to synthesize some metastable forms of 2D materials that are very hard to synthesize by other methods, for example, 1T'-MoS$_2$ and black phosphorus.

In general, in one embodiment, the invention features a process that includes synthesizing graphene by applying a voltage pulse across a conductive carbon source that is substantially not graphene.

Implementations of the invention can include one or more of the following features:

The conductivity of the conductive carbon source can be greater than 10$^{-5}$ S/cm.

The conductivity of the conductive carbon source can be greater than 10$^{-3}$ S/cm.

The duration of the voltage pulse can be between 1 microsecond and 5 seconds.

The duration of the voltage pulse can be between 100 milliseconds and 500 milliseconds.

The voltage pulse can be repeated between 2 times and 100 times.

The voltage pulse can be repeated between 2 times and 10 times.

The current across the sample can be between 0.01 A/cm$^2$ and 10000 A/cm$^2$.

The current across the sample can be between 0.1 A/cm$^2$ and 1000 A/cm$^2$.

The voltage across the sample can be between 10 V/cm and 4000 V/cm.

The voltage across the sample can be between 100 V/cm and 400 V/cm.

The conductive carbon source can be selected from a group consisting of anthracite coal, higher temperature-treated biochar, calcined petroleum coke, shungite, carbon nanotubes, asphaltenes, acetylene black, carbon black, and mixtures thereof.

The conductive carbon source can include a conductive carbon source additive that renders the conductive carbon source to have sufficient conductivity for the process.

The conductive carbon source additive can be selected from a group consisting of anthracite coal, higher temperature-treated biochar, calcined petroleum coke, carbon nanotubes, graphene quantum dots, acetylene black, carbon black, shungite, graphene, or mixtures thereof. The conductive carbon source can be a lower conductivity carbon material selected from a group consisting of feces, plastics, vinyl polymers, condensation polymers, step-growth polymers, chain-growth polymers, living polymers, rubbers, humic acid, carbohydrates, rice powder, food waste, food, coal, organic waste, organic material, bituminous coal, coke, petroleum coke, oil, petroleum products, carbon from the stripping of the non-carbon atoms off of natural gas or oil or carbon dioxide, wood, cellulose, leaves, branches, grass, biomass, animal carcasses, fish carcasses, proteins, and mixtures thereof. The conductive carbon source additive can be added to the lower conductivity carbon material to render the lower conductivity source to have the sufficient conductivity for the process.

Before the process, the conductive carbon source can include less than 50% graphene.

Before the process, the conductive carbon source can include essentially no spectroscopically detectable graphene.

The product yield of the process can include at least 70% graphene.

The product yield can be at least 90% graphene.

The product yield can be 100% graphene.

The synthesized graphene can be turbostratic graphene.

The conductive carbon source can include a carbon source that has a conductivity of at most $10^{-7}$ S/cm. The conductive carbon source can further include a conductive carbon source additive intermixed with the carbon source. The conductive carbon source can have a conductivity of at least $10^{-5}$ S/cm.

The conductive carbon source can have a conductivity of at least $10^3$ S/cm.

The conductive carbon source additive can be selected from a group consisting of carbon black, metal powder, and combinations thereof.

The process can be a continuous process.

The process can be an automated process.

The conductive carbon source can include carbon black and rubber.

The conductive carbon source can include 1 wt % to 10 wt % carbon black.

The conductive carbon source can include 4 wt % to 6 wt % carbon black.

The step of applying the voltage pulse can utilize DC voltage.

The step of applying the voltage pulse can utilize AC voltage.

The voltage pulse can be applied using a power source that uses three-phase electrical power.

In general, in another embodiment, the invention features a process that includes synthesizing graphene by applying a voltage pulse across conductive carbon sources that are substantially not graphene. When applying the voltage pulse across conductive carbon sources, there are heteroatoms present to afford a doped or heteroatom-containing graphene product.

Implementations of the invention can include one or more of the following features:

The heteroatoms can be selected from a group consisting of nitrogen, phosphorous, boron, and mixtures thereof.

The heteroatoms can be selected from a group consisting of metals, semimetals, and mixtures thereof.

The heteroatoms sources can be selected from a group consisting of melamine, aminoborane, melamine-formaldehyde resin, phosphines, phosphates, metal salts, metal oxides, and mixtures thereof.

In general, in another embodiment, the invention features an apparatus that includes a carbon feed stock. The carbon feed stock includes a conductive carbon source that is substantially not graphene. The apparatus further includes a non-conductive vessel operable for constraining the conductive carbon source. The apparatus further includes electrodes that are operable for applying a voltage pulse across the conductive carbon source within the non-conductive vessel to synthesize graphene.

Implementations of the invention can include one or more of the following features:

The apparatus can further include a conduit through which the conductive carbon source can be transported to the non-conductive vessel.

The apparatus can further include a chamber in which the non-conductive vessel can be position when the electrodes apply the voltage pulse.

The non-conductive vessel can include quartz or ceramic material.

The non-conductive vessel can include a quartz tube.

The apparatus can include a plurality of the non-conductive vessels. The apparatus can further include a belt or screw and a collection bin. The belt or screw can be operable to transport the vessels in the plurality of the non-conductive vessels into the chamber after the conductive carbon source is filled in the non-conductive vessel. The belt or screw can be further operable to transport the non-conductive vessels away from the chamber to a position in which the synthesized graphene can be collected in the collection bin.

The apparatus can include a plurality of capacitors operable for applying the voltage pulse.

The apparatus can include a controller and a mechanical relay operable for controlling the application of the voltage pulse.

The apparatus can include an inductor and diode operatively connected to controller and mechanical relay.

The apparatus can further include a kill switch.

The conductive carbon source can include a carbon source that has a conductivity of at least at least $10^{-5}$ S/cm.

The carbon source can have a conductivity of at least at least $10^{-3}$ S/cm.

The conductive carbon source can include a carbon source and a conductive carbon source additive.

The conductive carbon source can be a carbon powder.

The carbon source can have a conductivity of at least at most $10^{-6}$ S/cm. The conductive carbon source can have a conductivity of at least $10^{-5}$ S/cm.

The conductive carbon source can have a conductivity of at least at least $10^{-3}$ S/cm.

The apparatus can be operable for performing a continuous process for synthesizing the graphene from the conductive carbon source.

The apparatus can be operable for performing an automated process for synthesizing the graphene from the conductive carbon source.

In general, in another embodiment, the invention features a system that includes an above-described apparatus.

Implementations of the invention can include one or more of the following features:

The apparatus can be operably connected to a DC voltage source.

The apparatus can be operably connected to an AC voltage source.

The apparatus can be operably connected to a power source that uses three-phase electrical power.

The power source can use three-phase electrical power followed by full wave rectification.

The power sources can use zero-crossing relays to control duration of the voltage pulse.

The power source can further include a computer control. The computer control can be operable to select the duration of the voltage pulse based upon number of half cycles allowed to pass through the zero-crossing relays.

The power source can be operable to use one of 120, 208, 277, 480 volts AC (RMS) root-mean-square three phase.

The power source can include a three-phase generator operable to provide AC power.

The three-phase generator can be mechanically coupled to an AC motor.

The three-phase generator can include a rotor. The three-phase generator can be operable to provide the AC power by rapidly converting mechanical power to electric current due to the inertia of the rotor.

The three-phase generator can include a flywheel. The three-phase generator can be operable to provide the AC power using the flywheel to provide longer duration and steady voltage and current output.

The apparatus can include a plurality of capacitors operable for applying the voltage pulse. The apparatus can include a controller and a mechanical relay operable for controlling the application of the voltage pulse.

The apparatus can include an inductor and diode operatively connected to controller and mechanical relay.

The apparatus can further include a kill switch.

In general, in another embodiment, the invention features a method for forming a 2D material. The method includes selecting a precursor material that includes a precursor. The method further includes applying a voltage pulse across the material to form the 2D material.

Implementations of the invention can include one or more of the following features:

The precursor can have a conductivity that is greater than $10^{-6}$ S/cm.

The precursor can include a metal source.

The metal source can be selected from a group consisting of iron powder, molybdenum powder, tungsten metal, and copper metal.

The precursor can include a non-metal source.

The non-metal source can be selected from a group consisting of carbon black, calcined petroleum coke.

The precursor can have a conductivity that is less than $10^{-6}$ S/cm. The precursor material can further include a conductive source. The precursor material can have a conductivity that is more than $10^5$ S/cm.

The precursor can have a conductivity that is less than $10^{-7}$ S/cm.

The precursor can be selected from a group consisting of molybdenum disulfide ($MoS_2$), ammonium tetrathiomolybdate (($NH_4)_2MoS_4$), borane ammonia complex ($BH_3NH_3$), red phosphorous, and combinations thereof.

The conductive source can be selected from a group consisting of a carbon material, a metal powder, and combinations thereof.

The precursor can be selected from a group consisting of molybdenum disulfide ($MoS_2$), ammonium tetrathiomolybdate (($NH_4)_2MoS_4$), borane ammonia complex ($BH_3NH_3$), red phosphorous, and combinations thereof.

The precursor can include molybdenum disulfide ($MoS_2$) or ammonium tetrathiomolybdate (($NH_4)_2MoS_4$).

The 2D material can include 1T'-$MoS_2$ and 2H—$MoS_2$.

The precursor can include borane ammonia complex ($BH_3NH_3$).

The 2D material can include hexagonal boron nitride (h-BN).

The precursor can include red phosphorous.

The 2D material can include black phosphorous.

The step of applying a voltage pulse across the material to form the 2D material can include a number of voltage pulses applied across the material. The number of voltage pulses can be in a range between 1 pulse and 100 pulses. The step of applying a voltage pulse across the material to form the 2D material can include each of the voltage pulses have a duration length in a range between 1 microsecond and 5 seconds. The step of applying a voltage pulse across the material to form the 2D material can include current of each of the voltage pulses is in a range between 0.01 A/cm$^2$ and 10,000 A/cm$^2$. The step of applying a voltage pulse across the material to form the 2D material can include voltage of each of the voltage pulses is in the range between 10 V and 4,000 V.

The number of the voltage pulses can be in a range between 1 pulse and 10 pulses. The duration length of each of the voltage pulses can be in a range between 10 microseconds and 1,000 milliseconds. The current of each of the voltage pulses can be in a range between 0.1 A/cm$^2$ and 10,00 A/cm$^2$. The voltage of each of the voltage pulses can be in the range between 100 V and 400 V.

The step of applying the voltage pulse can utilize DC voltage.

The step of applying the voltage pulse can utilize AC voltage.

The voltage pulse can be applied using a power source that uses three-phase electrical power.

In general, in another embodiment, the invention features an apparatus that includes a precursor material that includes a precursor. The apparatus further includes a non-conductive vessel operable for constraining the precursor material. The apparatus further includes electrodes that are operable for applying a voltage pulse across the precursor material within the non-conductive vessel to prepare a 2D material.

Implementations of the invention can include one or more of the following features:

The apparatus can further include a conduit through which the precursor can be transported to the non-conductive vessel.

The apparatus can further include a chamber in which the non-conductive vessel can be position when the electrodes apply the voltage pulse.

The non-conductive vessel can include quartz or ceramic material.

The apparatus can include a plurality of the non-conductive vessels. The apparatus can further include a belt or screw and a collection bin. The belt or screw can be operable to transport the non-conductive vessels in the plurality of the non-conductive vessels into the chamber after the precursor material is filled in the non-conductive vessel. The belt or screw can further be operable to transport the non-conductive vessels away from the chamber to a position in which the prepared 2D material can be collected in the collection bin.

The apparatus can include a plurality of capacitors operable for applying the voltage pulse.

The apparatus can include a controller and a mechanical relay operable for controlling the application of the voltage pulse.

The apparatus can include an inductor and diode operatively connected to controller and mechanical relay.

The apparatus can further include a kill switch.

The precursor can have a conductivity of at least at least $10^{-5}$ S/cm.

The precursor can have a conductivity of at least at least $10^{-3}$ S/cm.

The precursor material can further include a conductive source.

The precursor can have a conductivity of at least at most $10^{-6}$ S/cm. The conductive source can have a conductivity of at least $10^{-5}$ S/cm.

The precursor material can have a conductivity of at least at least $10^{-3}$ S/cm.

The apparatus can be operable for performing a continuous process for generating the 2D material from the precursor material.

The apparatus can be operable for performing an automated process for generating the 2D material from the precursor material.

In general, in another embodiment, the invention features a system that includes an above-described apparatus.

Implementations of the invention can include one or more of the following features:

The apparatus can be operably connected to a DC voltage source.

The apparatus can be operably connected to an AC voltage source.

The apparatus can be operably connected to a power source that uses three-phase electrical power.

The power source can use three-phase electrical power followed by full wave rectification.

The power sources can use zero-crossing relays to control duration of the voltage pulse.

The power source can further include a computer control. The computer control can be operable to select the duration of the voltage pulse based upon number of half cycles allowed to pass through the zero-crossing relays.

The power source can be operable to use one of 120, 208, 277, 480 volts AC (RMS) root-mean-square three phase.

The power source can include a three-phase generator operable to provide AC power.

The three-phase generator can be mechanically coupled to an AC motor.

The three-phase generator can include a rotor. The three-phase generator can be operable to provide the AC power by rapidly converting mechanical power to electric current due to the inertia of the rotor.

The three-phase generator can include a flywheel. The three phase generator can be operable to provide the AC power using the flywheel to provide longer duration and steady voltage and current output.

The apparatus can include a plurality of capacitors operable for applying the voltage pulse. The apparatus can include a controller and a mechanical relay operable for controlling the application of the voltage pulse.

The apparatus can include an inductor and diode operatively connected to controller and mechanical relay.

The apparatus can further include a kill switch.

In general, in another embodiment, the invention features a process that includes synthesizing bulk amounts of turbostratic graphene.

Implementations of the invention can include one or more of the following features:

The process can include a flash graphene process to make the turbostratic graphene from a carbon-based material.

The turbostratic graphene can be a low-defect turbostratic graphene.

The process can further include making composites with the turbostratic graphene.

In general, in another embodiment, the invention features a process that includes synthesizing turbostratic graphene by applying a voltage pulse across a conductive carbon source that is substantially not graphene.

Implementations of the invention can include one or more of the following features:

The conductivity of the conductive carbon source can be greater than $10^5$ S/cm.

The conductivity of the conductive carbon source can be greater than $10^{-3}$ S/cm.

The duration of the voltage pulse can be between 1 microsecond and 5 seconds.

The duration of the voltage pulse can be between 100 milliseconds and 500 milliseconds.

The voltage pulse can be repeated between 2 times and 100 times.

The voltage pulse can be repeated between 2 times and 10 times.

The current across the sample can be between 0.01 A/cm$^2$ and 10000 A/cm$^2$.

The current across the sample can be between 0.1 A/cm$^2$ and 1000 A/cm$^2$.

The voltage across the sample can be between 10 V/cm and 4000 V/cm.

The voltage across the sample can be between 100 V/cm to 400 V/cm.

The conductive carbon source can be selected from a group consisting of anthracite coal, higher temperature-treated biochar, calcined petroleum coke, shungite, carbon nanotubes, asphaltenes, acetylene black, carbon black, and mixtures thereof.

The conductive carbon source can include a conductive carbon source additive that renders the conductive carbon source to have sufficient conductivity for the process.

The conductive carbon source additive can be selected from a group consisting of anthracite coal, higher temperature-treated biochar, calcined petroleum coke, carbon nanotubes, graphene quantum dots, acetylene black, carbon black, shungite, graphene, or mixtures thereof. The conductive carbon source can be a lower conductivity carbon material selected from a group consisting of feces, plastics, vinyl polymers, condensation polymers, step-growth polymers, chain-growth polymers, living polymers, rubbers, humic acid, carbohydrates, rice powder, food waste, food, coal, organic waste, organic material, bituminous coal, coke, petroleum coke, oil, petroleum products, carbon from the stripping of the non-carbon atoms off of natural gas or oil or carbon dioxide, wood, cellulose, leaves, branches, grass, biomass, animal carcasses, fish carcasses, proteins, and mixtures thereof. The conductive carbon source additive can be added to the lower conductivity carbon material to render the lower conductivity source to have the sufficient conductivity for the process.

The conductive carbon source can include a carbon source that has a conductivity of at most $10^{-7}$ S/cm. The conductive carbon source can further include a conductive carbon source additive intermixed with the carbon source. The conductive carbon source can have a conductivity of at least $10^{-5}$ S/cm.

The conductive carbon source can have a conductivity of at least $10^{-3}$ S/cm.

The conductive carbon source additive can be selected from a group consisting of carbon black, metal powder, and combinations thereof.

The process can be a continuous process.

The process can be an automated process.

The process can synthesize at least 1 gram of a bulk graphene material. The turbostratic graphene can be at least 90 wt % of the bulk graphene material.

In general, in another embodiment, the invention features a bulk graphene material. A majority of the bulk graphene material is turbostratic graphene. The bulk graphene material has a weight of at least 1 gram.

Implementations of the invention can include one or more of the following features:

At least 90 wt % of the graphene can be turbostratic graphene.

The bulk graphene material can be synthesized from a carbon source material that predominately includes a solid carbon source. The solid carbon source is a carbon source in a solid state.

The solid carbon source can include at least 90 wt % of the carbon source material.

The bulk graphene material can be synthesized from a carbon source material that predominately includes a liquid carbon source. The liquid carbon source is a carbon source in a liquid state.

The liquid carbon source can include at least 90 wt % of the carbon source material.

In general, in another embodiment, the invention features a composite material that includes turbostratic graphene and a second material.

Implementations of the invention can include one or more of the following features:

The second material can be selected from a group consisting of concrete, cement, plastics, paints, coatings, foam, polyurethane foam, flooring, roofing, wood, plywood, aluminum, steel, copper, metals, asphalt, metal oxides, carbon-carbon composites, fibers, films and combinations thereof.

The composite material can include between 0.001 wt % and 10 wt % of the turbostratic graphene.

The tensile strength of the composite material can be greater than tensile strength of the second material without the turbostratic graphene.

The tensile strength of the composite material can be at least 10% greater than the tensile strength of the second material without the turbostratic graphene.

The compressive strength of the composite material is greater than compressive strength of the second material without the turbostratic graphene.

The compressive strength of the composite material can be at least 10% greater than the compressive strength of the second material without the turbostratic graphene.

The Young's modulus of the composite material can be substantially different than the Young's modulus of the second material without the turbostratic graphene.

The Young's modulus of the composite material can be at least 10% different than the Young's modulus of the second material without the turbostratic graphene.

The yield strength of the composite material can be greater than yield strength of the second material without the turbostratic graphene.

The yield strength of the composite material can be at least 10% greater than the yield strength of the second material without the turbostratic graphene.

The electrical conductivity of the composite material can be greater than electrical conductivity of the second material without the turbostratic graphene.

The electrical conductivity of the composite material can be at least 10 Siemen per centimeter greater than the electrical conductivity of the second material without the turbostratic graphene.

The thermal conductivity of the composite material can be greater than thermal conductivity of the second material without the turbostratic graphene.

The thermal conductivity of the composite material can be at least 1 watt per meter-kelvin higher than the thermal conductivity of the second material without the turbostratic graphene.

The second material can be a liquid material.

The liquid material can be selected from a group consisting of cooling fluids, transmission fluids, lubricants, oils, and combinations thereof.

The liquid material can be selected from a group consisting of drilling fluids and fracking fluids.

The turbostratic graphene can be a fluid loss prevention additive for the liquid material.

The viscosity of the composite material can be at least 1 millipascal-second greater than viscosity of the liquid materials without the turbostratic graphene.

The second material can be a dry lubricant.

In general, in another embodiment, the invention features a dry lubricant that includes turbostratic graphene.

Implementations of the invention can include one or more of the following features:

The dry lubricant can be the turbostratic graphene.

In general, in another embodiment, the invention features a composition of low-defect turbostratic graphene.

Implementations of the invention can include one or more of the following features:

The turbostratic graphene includes a plurality of graphene sheets. The graphene sheets include predominately $sp^2$-hybridized carbon atoms.

The graphene sheets can include at least 70 atom % $sp^2$-hybridized carbon atoms.

In general, in another embodiment, the invention features a method that includes chemical covalent functionalization of turbostratic graphene. The functionalization atom is selected from a group consisting of oxygen, carbon, metals, sulfur, phosphorous, non-metals, metalloids, and combinations thereof.

In general, in another embodiment, the invention features a method that includes chemical non-covalent functionalization of turbostratic graphene by one or more of surfactants, DNA, proteins, polymers, aromatics, small organic molecules, gases, groundwater contaminants, biological cells, microorganisms, polychlorinated biphenyls, perchlorates, and borates.

In general, in another embodiment, the invention features a method that includes selecting a material that includes turbostratic graphene. The method further includes utilizing the material as a scale inhibitor or as a corrosion inhibitor.

Implementations of the invention can include one or more of the following features:

The material can be the turbostratic graphene.

In general, in another embodiment, the invention features a sensor device that includes turbostratic graphene. The turbostratic graphene can be operable in the sensor device to change an electrical property based upon the adsorption of an analyte.

Implementations of the invention can include one or more of the following features:

The electrical property can be selected from a group consisting of mobility, resistance, conductance, and combinations thereof.

The analyte can be selected from a group consisting of gasses, biological agents, nerve agents, and combinations thereof.

In general, in another embodiment, the invention features a device that includes turbostratic graphene. The device is selected from a group consisting of optical devices, optoelectronic devices, and devices operable for field emission of electrons or photons.

BRIEF DESCRIPTION OF THE DRAWINGS

FIG. 1A-1F show FG synthesized from various carbon sources. FIG. 1A is a schematic of the FJH process. FIGS. 1B-1D are HR-TEM image of carbon black-derived FG on top of a single layer of coffee-derived FG, with scales bar of 2 nm, 5 Å and 5 Å, respectively. FIG. 1E are characterizations that include Raman spectra (showing the best obtained spectra and the representative), XRD spectra, and TEM images for FG derived from various carbon sources. Each pixel in the Raman mapping is 2 μm using a 50× magnification. The scale bars in the TEM images from top to bottom are 5, 200, 5 and 100 nm, respectively. FIG. 1F is a graph showing the temperature rise versus time during flashing.

FIG. 2A is an electrical schematic of the FJH system. FIG. 2B is a photograph of a FJH system set up on a plastic cart. FIG. 2C is a sample holder that was made from a small commercial vise (Amazon) and laser cut wooden parts. FIG. 2D shows a capacitor used in the FJH system of FIG. 2A.

FIGS. 5A-5G show FJH critical parameters. FIG. 5A is a Raman spectra of CB-FG with increasing flashing voltage. FIG. 5B is a summary of CB-FG $I_{2D/G}$ and $I_{D/G}$ ratio at different flashing voltages. FIG. 5C is a time-temperature graph of CB-FG reacted under different conditions. FIG. 5D is a time-temperature graph of CB-FG reacted under different flashing durations. FIG. 5E is a Raman spectra of CB-FG with different compression ratios. FIG. 5F is a Raman spectra of CB-FG at different flashing temperatures in FIG. 5C. FIG. 5G is Raman spectra of CB-FG at different flashing durations in FIG. 5D.

FIG. 6A is a schematic of a temperature measurement set up. FIG. 6B shows black body radiation from a sample is collected by an optical fiber through a customized grating black box. FIG. 6C is a graph showing black body radiation fitting.

FIGS. 7A-7F are XPS of calcined petroleum coke, pretreated coffee and carbon black before and after the FJH process.

FIGS. 8A-8D are TGA in air of: (FIG. 8A) raw CB (Black Pearls 2000, Cabot) and CB-FG; (FIG. 8B) raw anthracite coal and anthracite-FG; (FIG. 8C) raw calcined coke and CC-FG; and (FIG. 8D) pre-treated coffee and coffee-FG.

FIGS. 9A-9G show molecular dynamics (MD) simulations of structures with various characteristics (such as micro-porosity, misalignment, and size of graphitic domains) kept at a given temperature range (1500 to 5000 K) for a prolonged time (up to $5 \times 10^{-9}$ s, with NVT thermostat). Scale bars are 1.5 nm.

FIGS. 13A-13E show CB-FG scale-up and applications. FIG. 13A shows FJH quartz tubes of different sizes and shapes afforded FG. FIG. 13B is a graph showing FG dispersion in water/Pluronic (F-127) (1%). FIG. 13C shows FG dispersion in various organic solvents at 5 g·L$^{-1}$. FIG. 13D is a graph of mechanical performance of cement compounded with FG. FIG. 13E is a photo of 4 g·L$^{-1}$ of CB-FG (of FIG. 13B) after centrifugation vs. a commercial sample at 10 g L$^{-1}$ after centrifugation. Scale bar of FIGS. 13A, 13C, and 13E is 1 cm.

DETAILED DESCRIPTION

This present invention is a new process to the synthesis of very high quality graphene in bulk with a low-cost processing set up and materials and with no solvent by flash Joule heating (FJH). The FJH can take less than 1 second. This can be scaled through repetitive graphene pellet formation wherein there are hundreds of piston-like domains, each one being ~0.2 to 100-cm-diameter and 4 cm to 1-m-long, for example, and compressed and FJH then ejection of the graphene pellet. Akin to making nails in bulk where each nail has a plunger impacting its top for head formation. Sources as inexpensive as renewable biochar and coke and anthracitic coal can be used for the synthesis.

For heating, ground conductive carbon such as biochar (conductive biochar can be treated at higher temperature, namely greater than 800° C.), calcined petroleum coke, asphaltenes, or anthracitic coal are used as conductive carbon material, but others can also be used. If the carbon source are used and they have lower than needed conductivity (e.g., dog feces, roaches, humic acid, bituminous coal, plastics, organic waste, cellulose, proteins, animal or fish carcasses), the conductivity can be raised by adding fillers such as conductive biochar, calcined coke, anthracitic coal, asphaltenes, carbon black, or FG from a previous run, to increase the conductivity. Of course other carbon types such as carbon nanotubes, carbon black, acetylene black, activated carbon, organic waste, plastics, rubbers, and polymers can be used. The presence of non-carbon atoms does not inhibit the formation, but it can result in a heteroatom doped graphene product depending on the percentage of heteroatoms, added, their boiling or sublimation point, and the flashing conditions.

Indeed, the conductive carbon source can be directly derived from fossil fuels (methane, natural gas, oil, etc.) or other carbon in which non-carbon atoms (such as hydrogen atoms) are stripped from the carbon. For example, fossil fuels can be used for energy with no $CO_2$ emissions involved by the catalytic stripping of hydrogen atoms from the fossil fuels to generate solid carbon and $H_2$ gas. The resulting $H_2$ can then be used in a fuel cell to generate electricity. Solid carbon is therefore formed by this catalytic stripping process in very large amounts, which can be then be used in the FJH process by taking the hydrogen-denuded solid carbon and converting it into FG.

The conductive carbon sources used in the present invention preferably have a conductivity greater than $10^{-3}$ S/cm, but even those with $10^{-5}$ S/cm can work. For example, calcined petroleum coke (CPC), biochar, charcoal, bituminous coal, humic acid are successfully converted to graphene as shown below.

Voltage range: 100-400 V/cm.
Current range: 0.1-1000 A/cm$^2$.
Yield of the FJH product range: 10%-90%.
Graphene yield in FJH product greater than 70%.

Flash Joule Heating Process

Figure 1C:
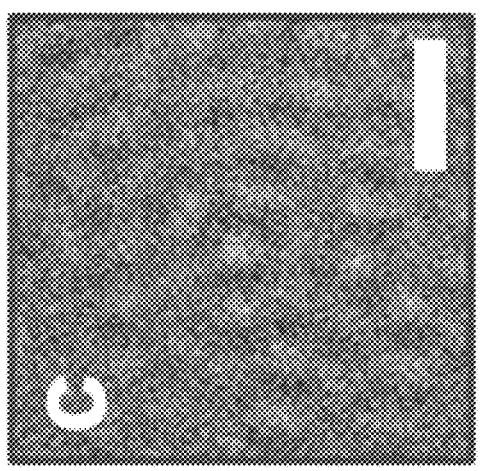
Figure 1D:
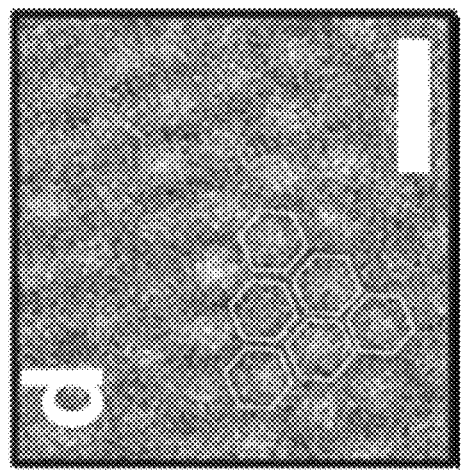
Figure 1F:
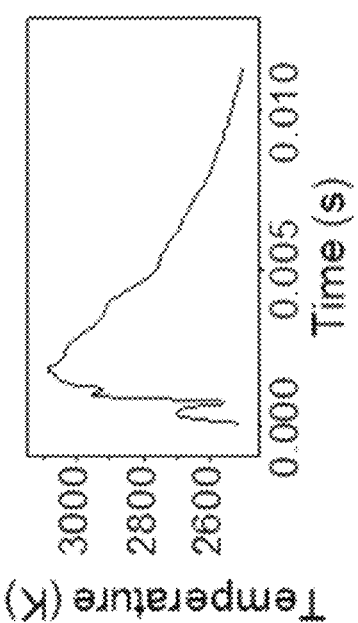
Figures 2A, 2D:
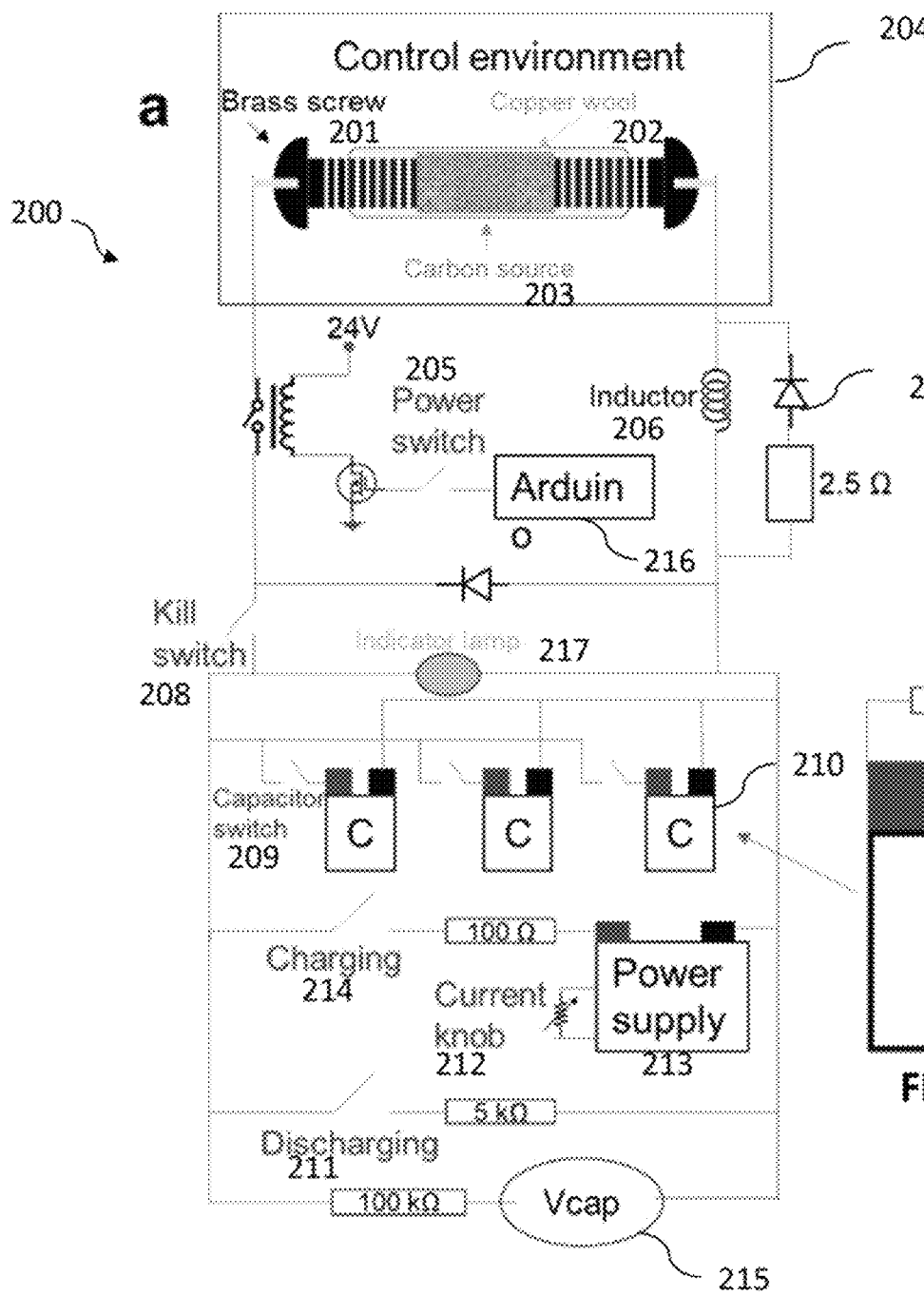
FIGS. 2A-2D show an FJH system.
Figure 2B:
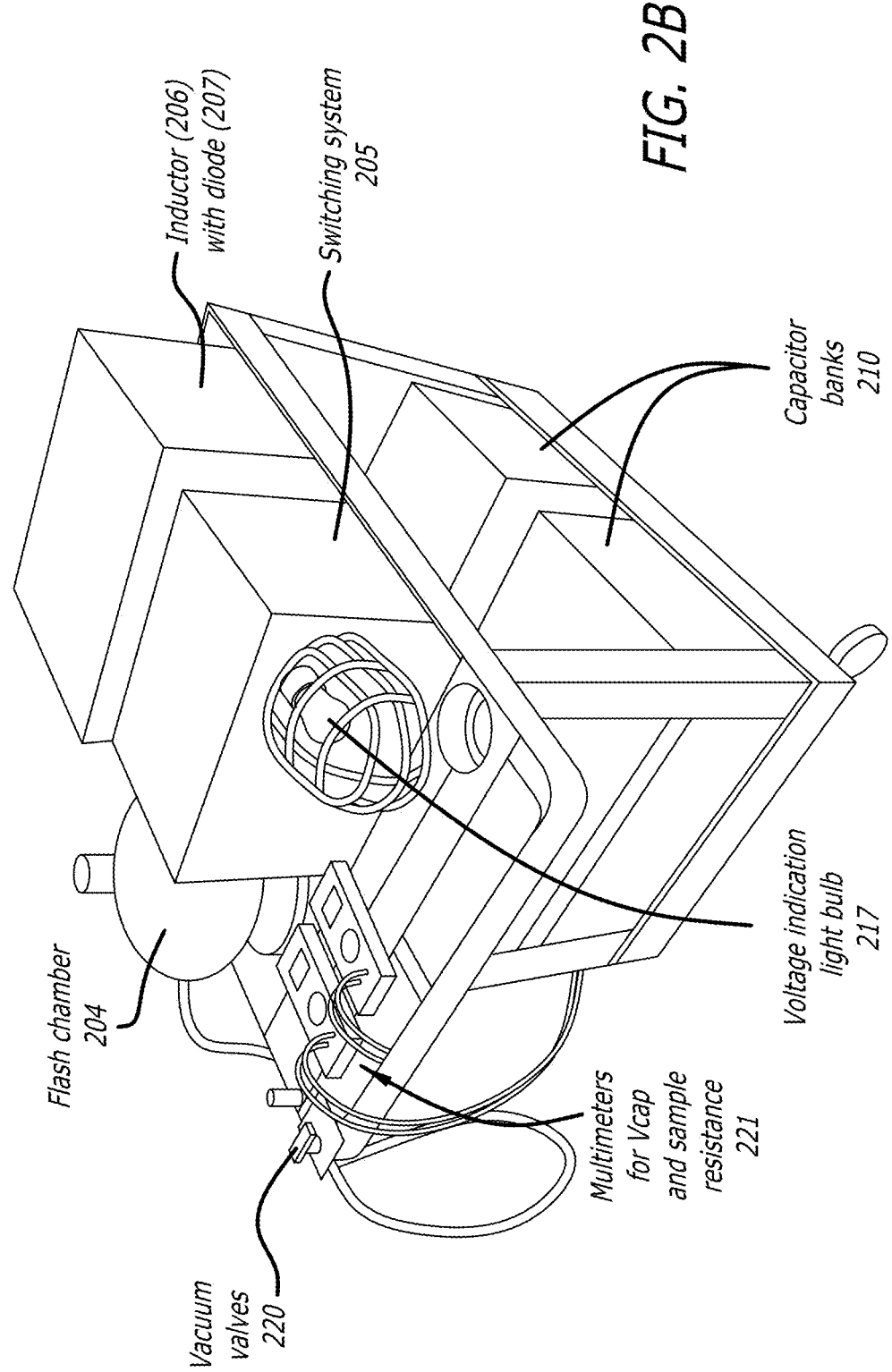
Figure 2C:
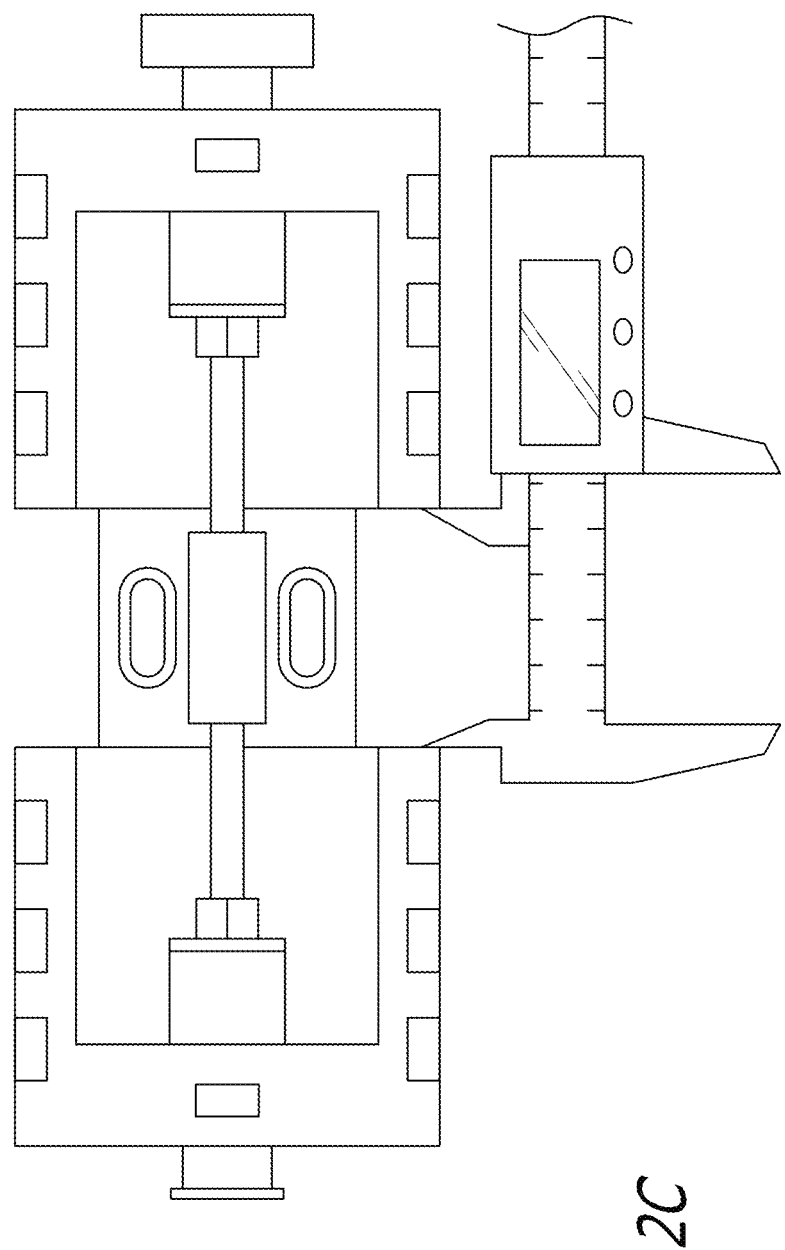

In the FJH process, amorphous conductive carbon powder 103 is compressed inside a quartz or ceramic tube 101 between two electrodes 102 and 104. See FIG. 1A. (FIG. 1F is a graph showing the temperature rise versus time during flashing). FIGS. 2A-2C show an FJH system 200, which includes a control environment 204 (also called the flash chamber) having a brass screw 201, copper wool 202, and a carbon source 203. The control environment 204 can be at atmospheric pressure or under a mild vacuum (~10 mm Hg) to facilitate outgassing.

The components inside the control environment 204 is connected to components that include:

Capacitors 210, such as 10× of 450 V, 6 mF aluminum electrolytic capacitors (Mouser #80-PEH200YX460BQU2). This capacitor bank can be used for FG synthesis with batch sizes less than or equal to 0.5 g. Alternative, the capacitors 210 can be 10× of 400 V, 18 mF aluminum electrolytic capacitors (Mouser #80-ALS70A183QS400). This additional capacitor bank can be used for FG synthesis with batch sizes greater 0.5 g and up to 1.0 g. FIG. 2D shows an individual capacitor in FJH system 200.

Mechanical relay 205, such as 900 V, 500 A (TE Connectivity LEV200A5ANA).

Power supply 213: LED Power Supplies 299.6 W 214-428V 700 mA (Mouser #709-HLG320H-C700B). Current knob 212 can have a 10 kf potentiometer.

$V_{cap}$ 215, which can be measured by a multimeter Fluke 189.

Discharging and charging switch breakers 211 and 214, respectively, such as 400 V, 6A (ABB S 282 K 6A).

Capacitor switch breaker 209, such as 277 V, 10 A (ABB S201P-C10).

Kill switch breaker 208, such as 440 V, 63 A (AAB S283 UC Z 63A).

Controller 216, such as an Arduino Uno with LCD display.

Inductor 206, such as a 24 mH (Mouser #553-C-80U).

Diode 207, such as 1200 V, 560 A (Mouser #747-MD0500-12N1).

For safety reasons, circuit breakers can be used as switches. Circuit breakers have built-in arc suppression that can interrupt 1000 amps or more. Conventional switches do not have such a high level of arc suppression, and can burn out or weld closed due to the high current pulses. For safety reason, circuit breakers rated for DC voltage can be used. Most AC circuit breakers have a DC rating ½ the voltage or less, since DC arcs are much more difficult to suppress. Circuit breakers designed for DC solar power systems can be used. For safety reasons, circuit breakers can be chosen by the time curves typical for 0.1 s, rather than the steady state current rating. K-type DC circuit breakers will have ~10× higher trip current at 0.1 s compared to their rated current, and Z-type breakers will have ~4× higher trip current at 0.1 s. This "delayed trip" designed into most circuit breakers will allow much higher pulse currents than the steady state rating of the breaker. For safety reasons, a small amount of inductance can be included in the discharge circuit to limit the rise time to a millisecond or more. Extremely fast discharges can damage components and cause RF interference with other lab apparatus. It should also be kept in mind that the system can discharge many thousands of Joules in milliseconds, which can cause components such as relays or even capacitors to explode. These components can be enclosed to protect against both high voltage and possible flying debris.

Further, for safety reasons, control wires can have opto-isolators rated for high voltage. For safety reasons, the FJH system 201 can include a visible charge indicator (i.e., indicator lamp 217). A 230 V clear glass incandescent light bulb can be utilized as the glow on the filament also provides an approximate indicator of the amount of charge on the capacitor bank. (I.e., Bright light means danger). For safety reasons, do not use toggle switches with metal toggles. If an arc develops, the metal toggle could become charged.

FJH system 200 can be at atmospheric pressure or under a mild vacuum (~10 mm Hg) to facilitate outgassing. The electrodes can be copper, graphite or any conductive refractory material. High voltage electrical discharge from the capacitor bank (of capacitors 210) brings the carbon source to temperatures greater than 3000 K in less than 100 ms, effectively converting the amorphous carbon into FG. As shown in FIG. 2B, the FJH system can further include vacuum valves 220 (for controlling the environment in the control environment 204) and multimeters 221 for $V_{cap}$ and sample resistance. FIG. 2C is a sample holder that was made from a small commercial vise (Amazon) and laser cut wooden parts. The loosely fitting (to permit gas escape during flashing) brass screws acted as two electrodes that contacted the copper wool plugs (or graphite disks) that touch the desired carbon source. Rubber stoppers provides gradual compressing of the sample while the vice was compressed to increase the conductivity of the sample. Caliper width was 5 cm.

Flash Graphene

FG produced using the FJH system 200 can have a turbostratic structure. FIGS. 1B-1D are HR-TEM image of carbon black-derived FG on top of a single layer of coffee-derived FG. (The coffee-derived FG is from used coffee grounds; the smaller graphene particles within large graphene sheets come from the carbon black conductive additive.) By high-resolution transmission electron microscopic (HR-TEM) analysis (FIG. 1B and area 105 magnified in FIG. 1C), the mis-oriented layers of FG are seen with their Moiré patterns. However, as shown in FIG. 1D (magnified area 106 of FIG. 1B), FG derived from spent coffee ground affords hexagonal single layer graphene.

Various materials can be used in the FJH system. TABLE I below reflects the FJH parameters for various materials utilized.

TABLE I

| Starting material | Wt (mg) | Tube (mm) | Cap (mF) | R (Ω) | V Pre | V Flash | Dur (ms) | Result material |
|---|---|---|---|---|---|---|---|---|
| Carbon black | 30 | 4 | 60 | 1.5 | 35 V × 5 | 110 V | 500 50 | CB-FG (highest I2D/G) |
| (Black Pearls 2000, Cabot) | 120 | 8 | 60 | 1 | 60 V × 5 | 200 V | 500 500 | CB-FG (plastic compounding) |
| (Black Pearls 2000, Cabot) | 1200 | 15 | 220 | 1.5 | 100 V × 5 | 250 V | 500 500 | CB-FG (1.1 g batch) |
| (Black Pearls 2000, Cabot) | 1000 | 10 | 220 | 1000-3000 | 150 V × 3 | | 10000 | Charred coffee grounds |
| Used coffee grounds/ CB (5%) | 50 | 4 | 60 | 5-10 | 40 V × 5 | 130 V | 50 | C-FG |
| (Starbucks and Folgers) | 80 | 4 | 60 | 2000-3000 | | 150 V | 10000 | Anthracite-derived FG |
| Charred coffee grounds | 80 | 4 | 60 | 0.8 | 80 V × 5 | 175 V | 100 500 | Calcined coke-derived FG |

In TABLE I, "Dur" is the duration of the switch opening time, not the real flash duration; "V Pre" is voltage pretreatment, i.e., pre-treatment without a flash; and "V Flash" is voltage flash, which is actual flash for the FG synthesis. The voltage pre-treatment is to partially char the material to reduce the volatile material and increase the conductivity. The charring process affords only amorphous material by Raman analysis. This voltage pre-treatment can be important for starting materials with low carbon content. This pre-charring can be obviated with a benefication material wherein there is a pre-heat cycle since industrial heating is less expensive than using electricity when heating below certain temperatures.

High quality graphene can be quickly identified by Raman spectroscopy. [Ferrari 2006; Ferrari 2007; Malard 2009; Ni 2009]. FG from carbon black (CB-FG) has an intense 2D peak. As seen in Raman mapping of CB-FG in FIG. 1E, $I_{2D/G}$ is greater than 10 in many locations. The extremely low D band indicated the low defect concentration of these FG products, contributing to the amplification of 2D band. Thus, the unusually high $I_{2D/G}$ of 17 (FIG. 1E) in the CB-FG is the highest reported value to date in any form of graphene and is likely an outcome of the extreme temperature reached in the flash process which outgasses non-carbon elements from the system.

Figure 1E:
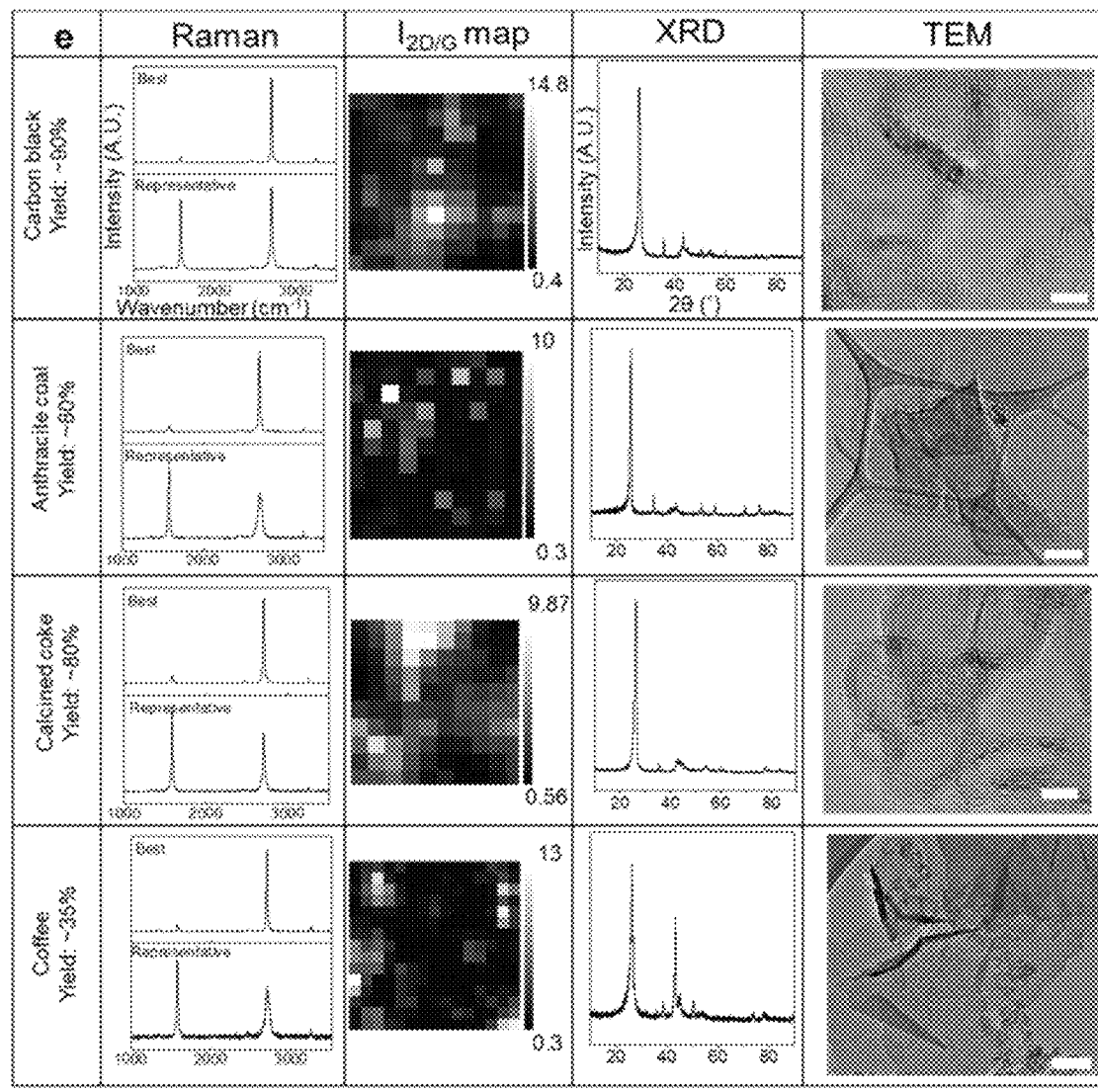
Figure 3A:
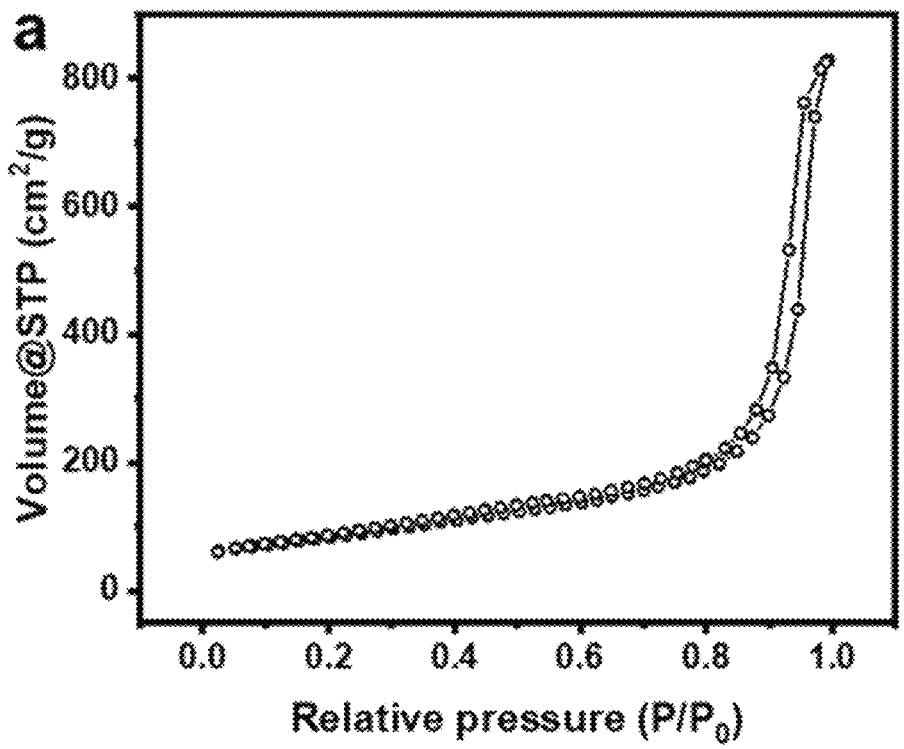
FIGS. 3A-3D are graphs of BET surface area analysis of CB-FG.
Figure 3B:
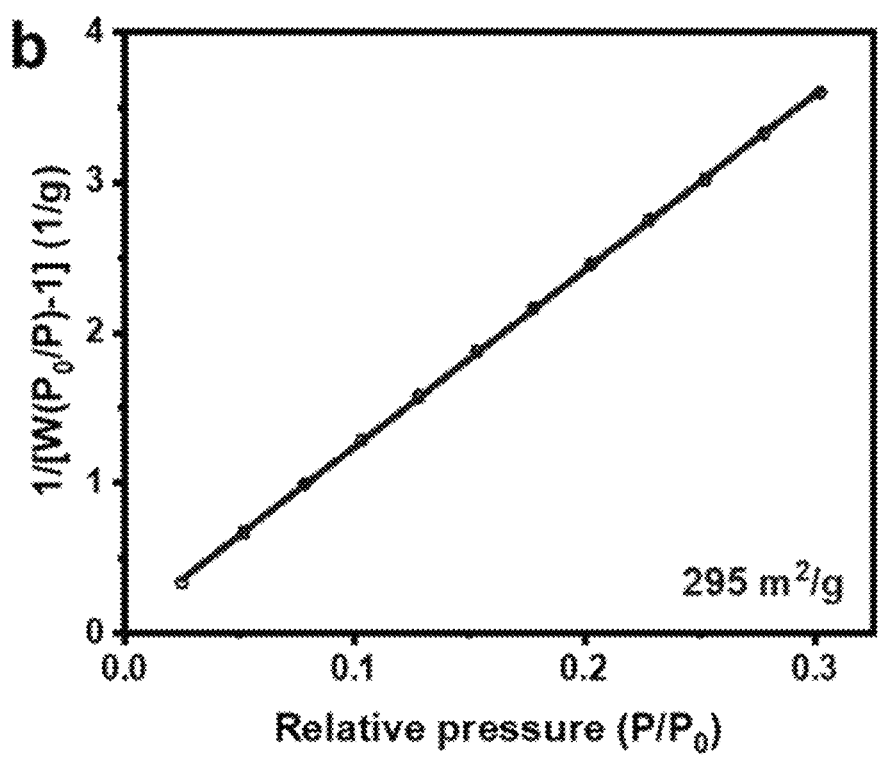
Figure 3C:
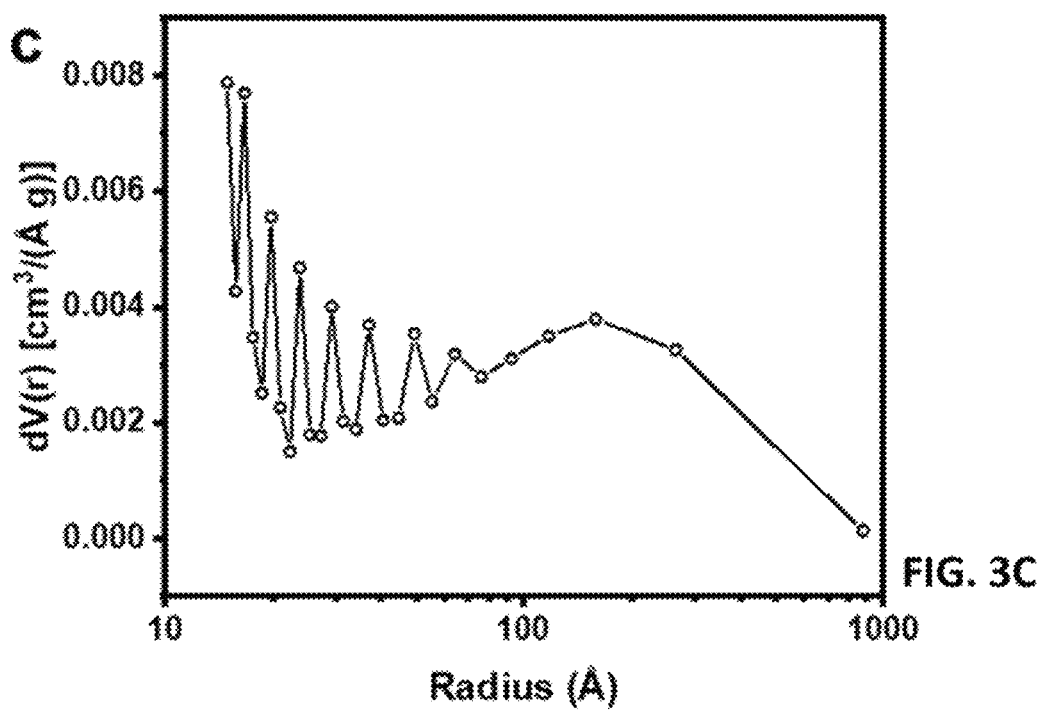
Figure 3D:
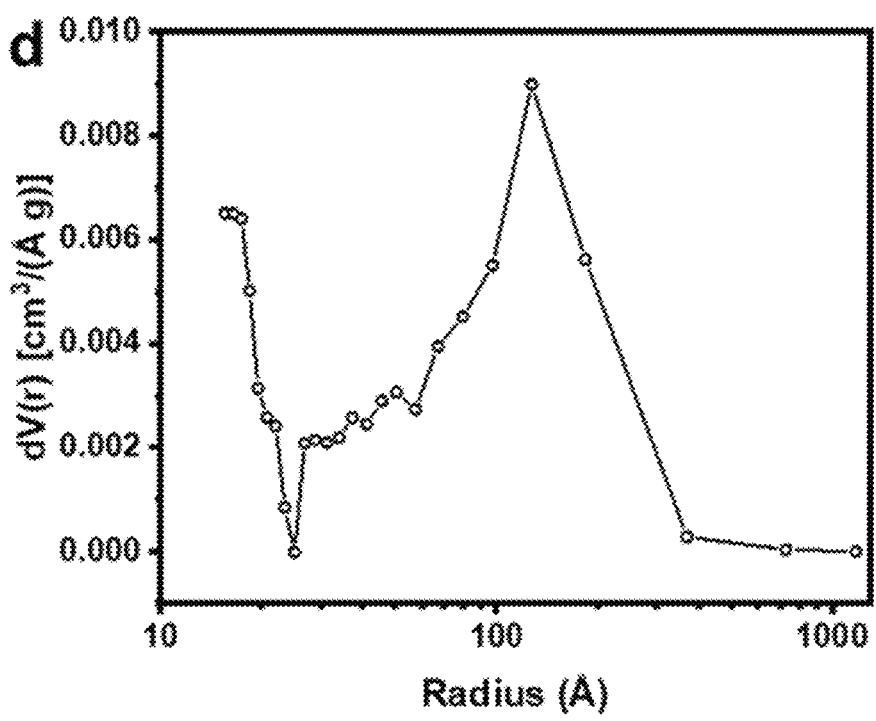

The XRD pattern of FG shows a well-defined (002) peak indicating successful graphitization of the amorphous carbon. The (002) peak of FG occurs at 2θ=27.8°, which corresponds to an interlayer spacing ($I_c$) of 3.45 Å. This spacing is larger than that in a typical Bernal graphite of 3.37 Å, indicating the expanded and turbostratic structure of FG. The (002) peak was found to be unsymmetrical with a tail at small angles, which further suggest the turbostratic nature of FG. [Li 2007]. The flash process is fast enough to prevent AB-ordered layering. CB-FG has a surface area of ~295 $m^2 \cdot g^{-1}$ with pore size <9 nm as measured by Brunauer-Emmett-Teller (BET) analysis. See FIG. 3A-3D. FIGS. 3A-3D show BET surface area analysis of CB-FG, with FIG. 3A isotherm, FIG. 3B BET surface area fitting, and FIGS. 3C-3D absorption and desorption pore size distribution. Anthracite coal and calcined petroleum coke also work well for conversion to FG (FIG. 1E and TABLE I). The yield of the FJH process is as high as 80 to 90% from the high carbon sources such as carbon black, calcine coke or anthracite coal and the electrical energy needed for their conversion is ~7.2 $kJ \cdot g^{-1}$.

In comparison to the other FG, the coffee-derived FG (C-FG) produces larger graphene sheets. Before the FJH process, a mixture of used coffee grounds and 5 wt % CB was prepared since coffee alone is nonconductive. Instead of using CB, 2 to 5 wt % of FG from a previous run can serve as the conductive additive for the coffee grounds. By XRD, in addition to the dominant (002) peak at 26.0°, the sharp (001) peak was observed at 2θ=42.5°, which is associated with in-plane structure. Using HR-TEM, we observed folded graphene sheets in C-FG (FIG. 1E) of 0.5 to 1 μm in size, similar to the graphene sheet size obtained by exfoliation of graphite.[3, 12, 13] [Hernandez 2008; Stankovich 2007; Cai 2012].

Other carbons that are abundant, renewable or waste sources can be used including charcoal, biochar, humic acid, keratin (human hair), lignin, sucrose, starch, pine bark, olive oil soot, cabbage, coconut, pistachio shells, potato skins, or mixed plastic including polyethylene terephthalate (PET or PETE), high- or low-density polyethylene (HDPE, LDPE), polyvinyl chloride (PVC), polypropylene (PP), polyacrylonitrile (PAN), or mixed plastics are also converted into FG. See FIG. 4, which shows representative Raman spectra of FG derived from other carbon sources.

Figure 4:
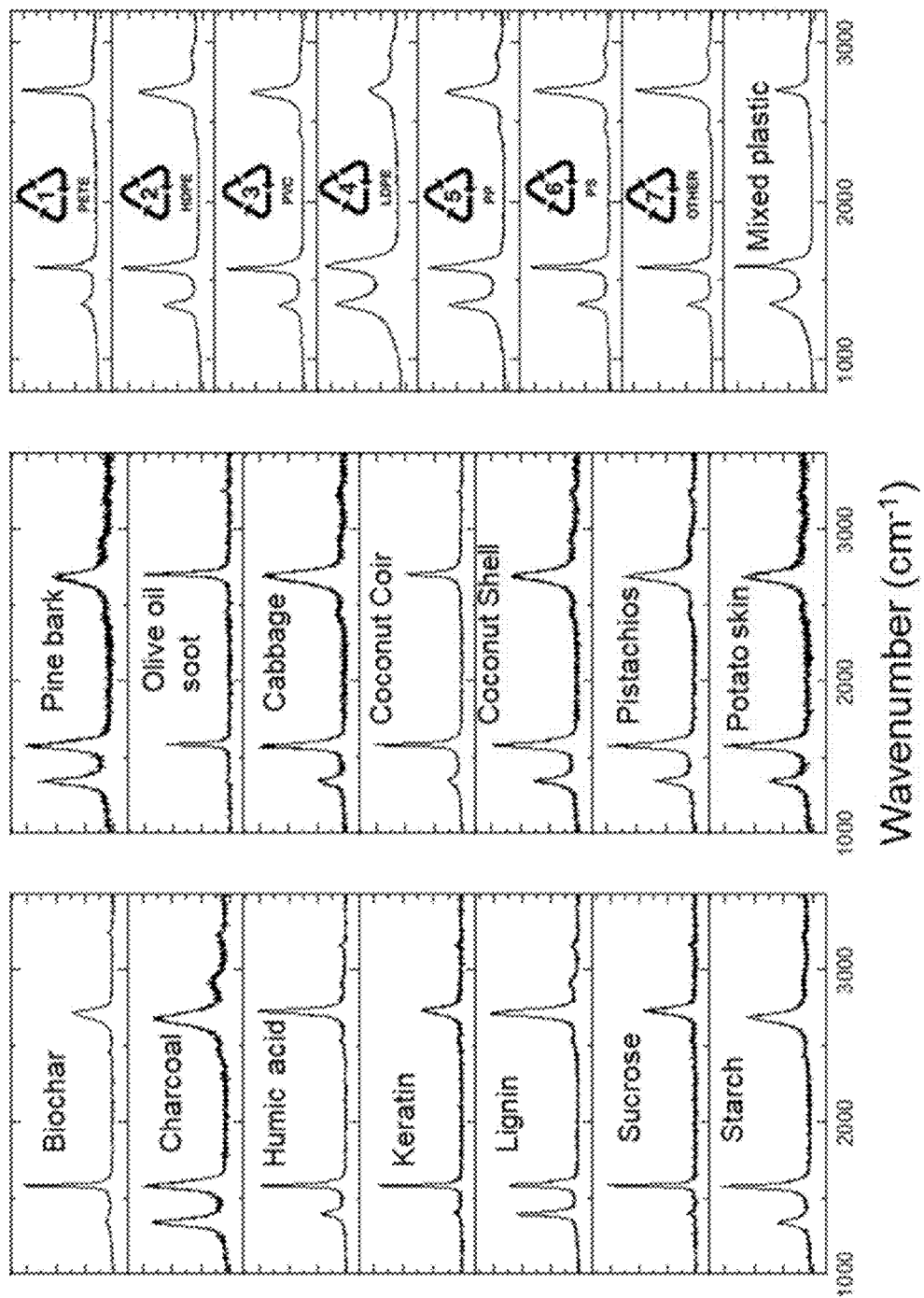
FIG. 4 shows Raman spectra of FG derived from other carbon sources.

The precursors sources for FIG. 4 are shown in TABLE II (with the pine bark, olive oil soot, cabbage, keratin from human hair, coconut, pistachio shells, potato skins, PETE, HDPE, PVC, LDPE, PP, and PS collected as waste products). Biochar was sufficiently conductive; it needed no additive. All other non-plastic samples had 5 to 10 wt % CB added to increase their conductivities. It was also shown that 2 to 5 wt % of FG from a previous run can be used to substitute the CB as the conductive additive. #7 plastic "OTHER" is polyacrylonitrile (PAN). Mixed plastic was made from the following wt % of polymers: HDPE 40%, PETE 40%, PP 10%, PVC 10%. All plastic samples had 5 wt % CB added to increase their conductivities.

The FJH process can provide a facile route for these worldwide waste products to be converted into FG, a potential high value building composite additive. [Parfitt 2010; Gustavsson 2011; Jambeck 2015]. This will fix these carbon sources and prevent their conversions to carbon dioxide, methane or deleterious micro- or nano-plastic waste. The ability to convert mixed plastics into a single FG product is particularly attractive for waste reuse.

TABLE II

| | |
|---|---|
| Biochar | Neroval LLC, from mixed Tennessee hardwoods, commercially prepared at 1100° C. |
| Charcoal | Sigma CAS: 7440-44-0 |
| Humic acid | Sigma CAS: 1415-93-6 |
| Lignin | Sigma CAS: 8068-05-1 |
| Sucrose | Sigma CAS: 57-50-1 |
| Starch | Argo gluten free |
| PAN | Sigma CAS: 25014-41-9 |

Figure 5B:
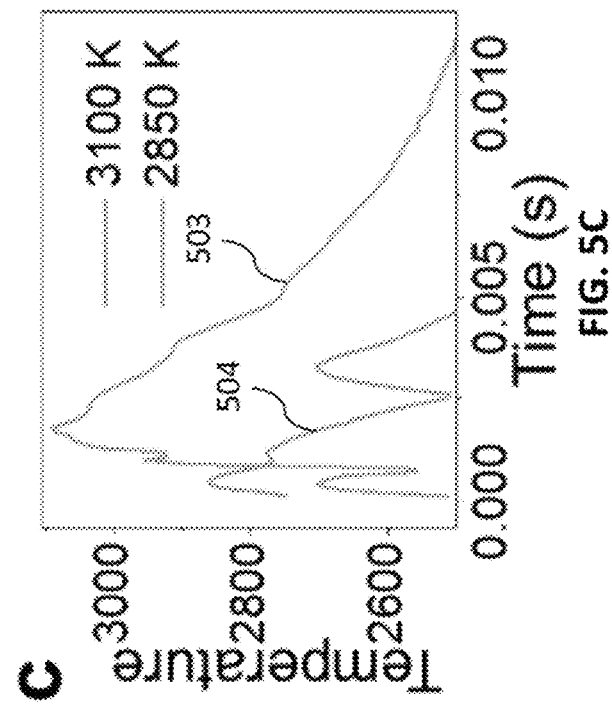
Figure 5C:
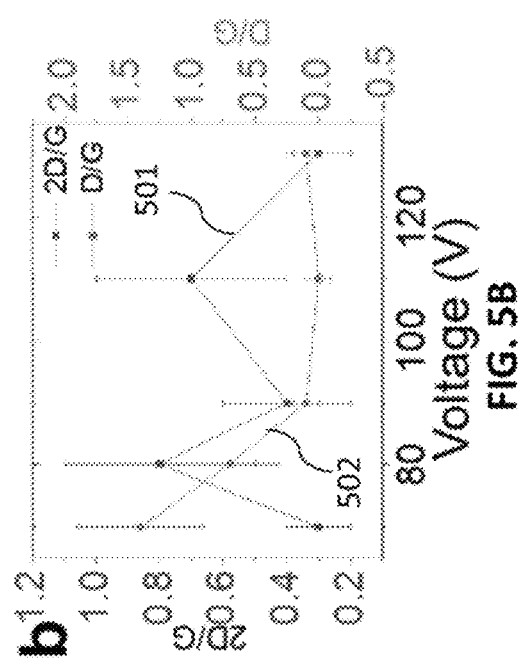
Figure 5D:
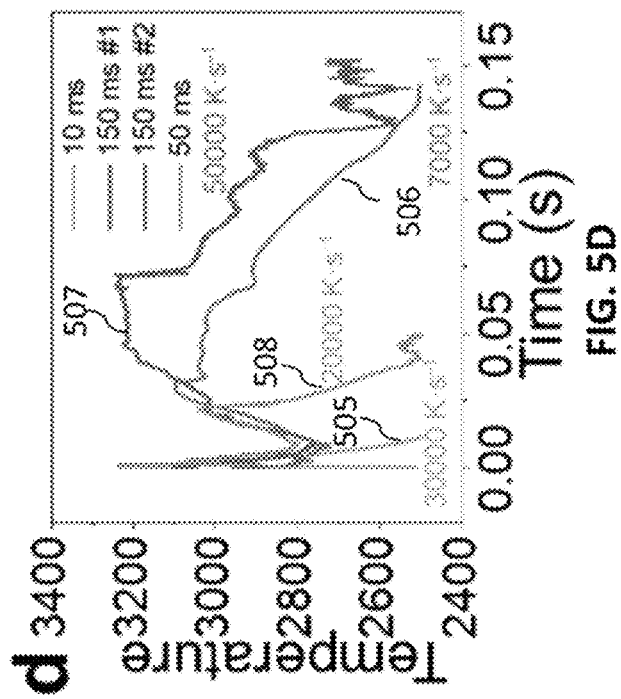

The graphene $I_{2D/G}$ is optimized by sample compression between the electrodes (which affects sample conductivity), capacitor voltage and switching duration in order to control the temperature and duration of the flash. FIGS. 5A-5G. FIGS. 5A-5G show FJH critical parameters. FIG. 5A is a Raman spectra of CB-FG with increasing flashing voltage. FIG. 5B is a summary of CB-FG $I_{2D/G}$ and $I_{D/G}$ ratio at different flashing voltages (with plots 501-502 for 2D/G and D/G, respectively). The bars represent standard deviation over 10 points. FIG. 5C is a time-temperature graph of CB-FG reacted under different conditions ((with plots 503-504 for 3100 K and 2850 K, respectively). The temperature was regulated by the flashing voltage. FIG. 5D is a time-temperature graph of CB-FG reacted under different flashing durations (with plots 505-508 for 10 ms, 150 ms #1, 150 ms #2, and 50 ms, respectively).

Figure 5G:
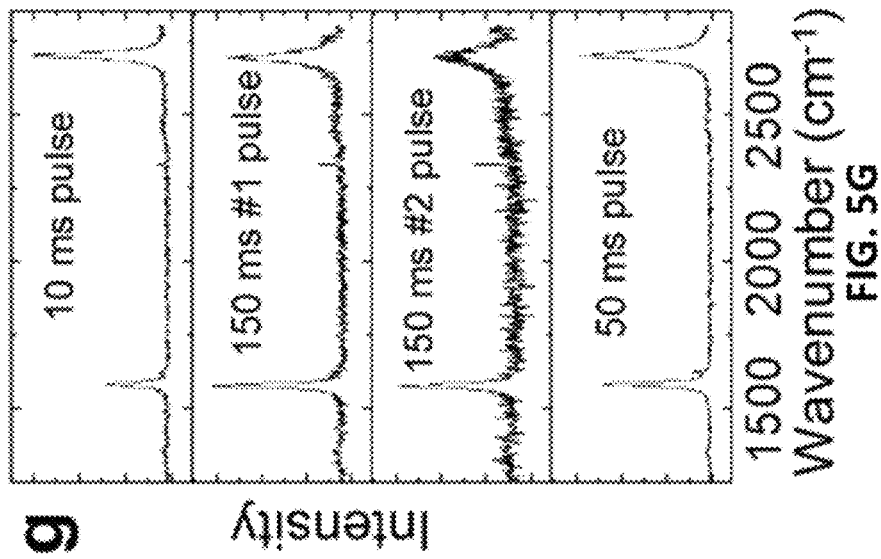
Figure 5F:
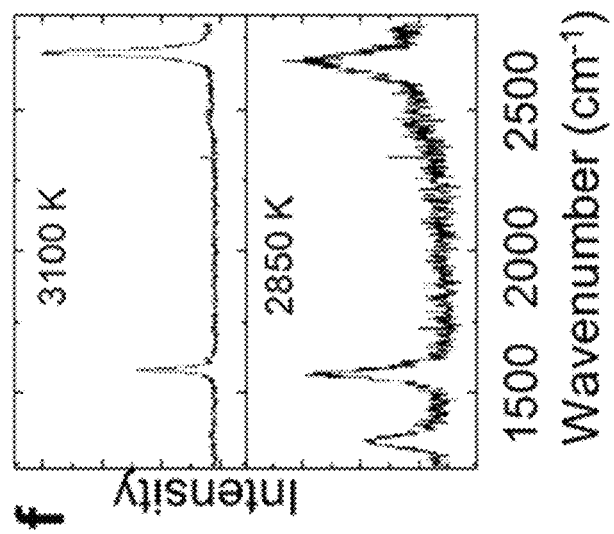

Flashing duration was regulated by the sample compression between the electrodes, which affected the sample conductivity. The numbers within the plots represent the cooling rate in each process (which were 30000 K s$^{-1}$, 7000 K s$^{-1}$, 50000 K s$^{-1}$, and 20000 K s$^{-1}$, corresponding to plots 505-508, respectively). FIG. 5E is a Raman spectra of CB-FG with different compression ratios. A higher compression afforded a lower resistance to the sample. FIG. 5F is a Raman spectra of CB-FG at different flashing temperatures in FIG. 5C. FIG. 5G is Raman spectra of CB-FG at different flashing durations in FIG. 5D. The 150 ms #1 and #2 flashes have similar duration but different cooling rates as shown in FIG. 5D. All Raman spectra in FIGS. 5A and 5E-5G were taken at low magnification (5×) to give an average spectrum of the sample.

Figure 6A:
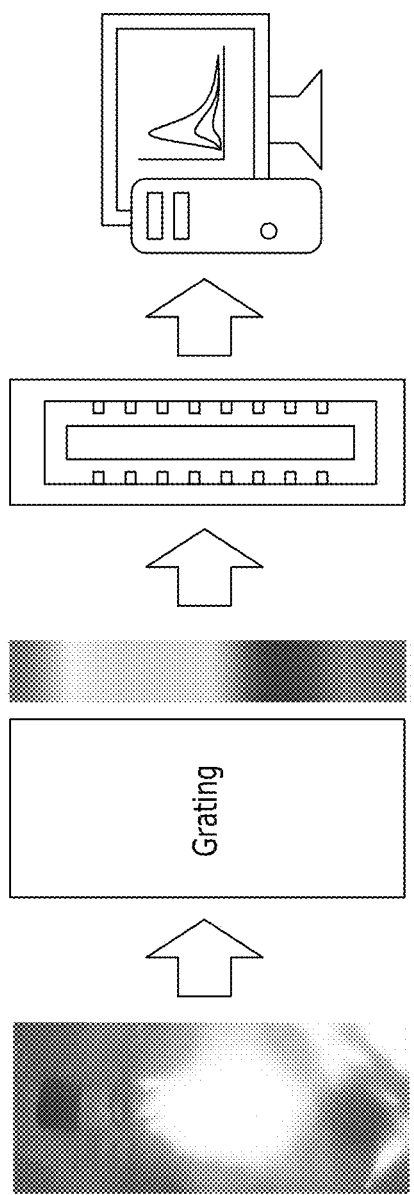
FIGS. 6A-6C show ultrafast temperature measurement.
Figure 6B:
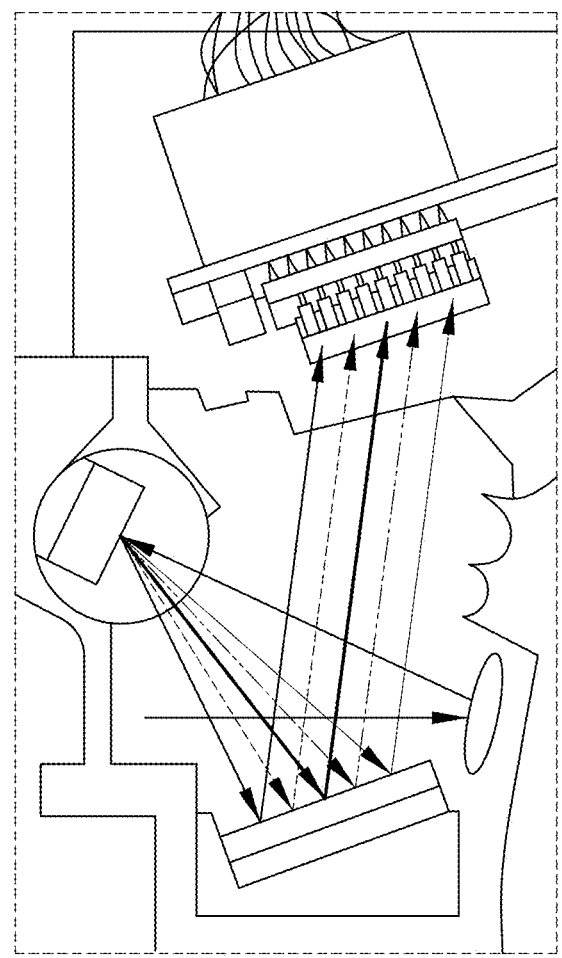
Figure 6C:
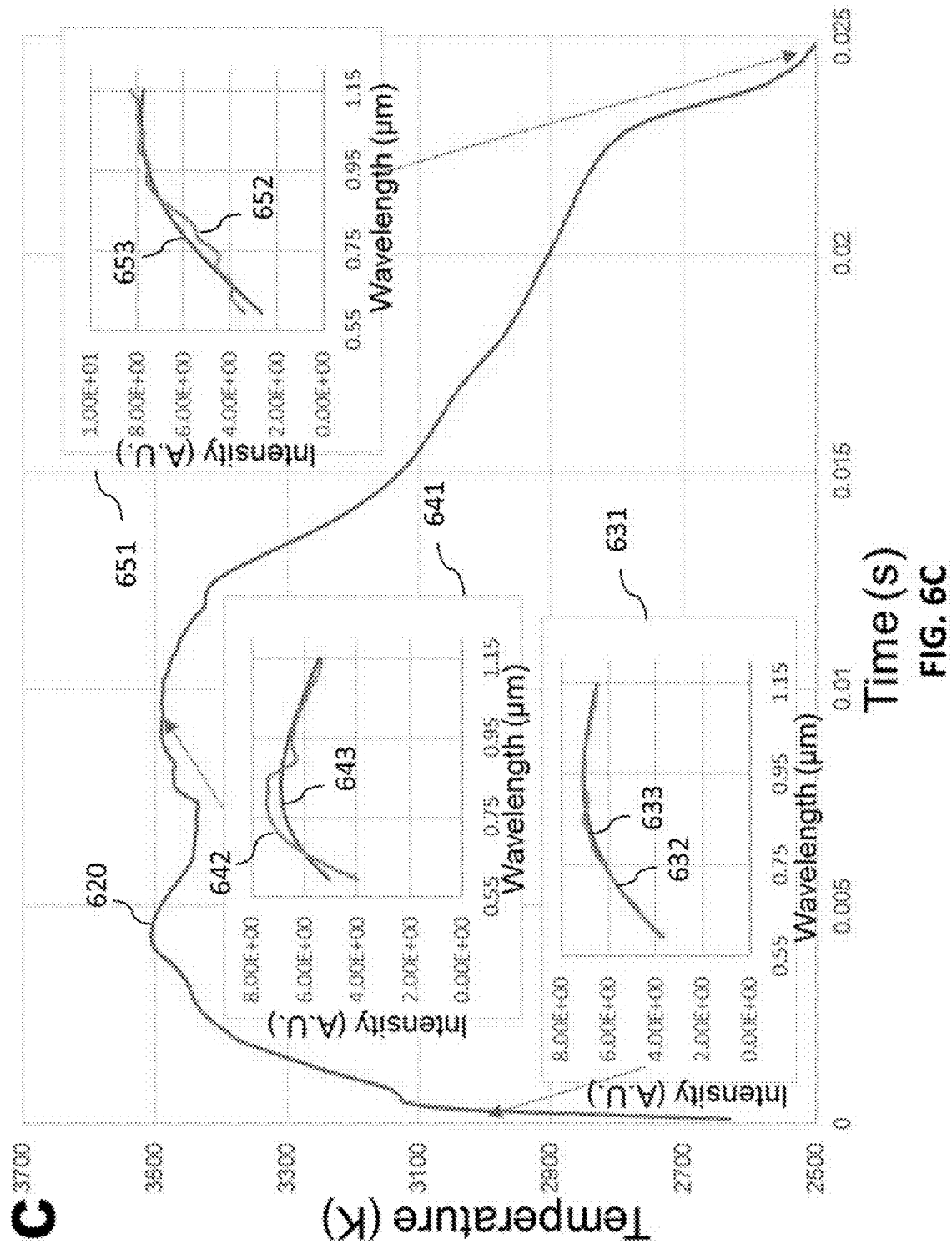

Increasing the voltage increased the temperature of the process. Temperature was estimated by fitting the black body radiation spectrum in the 600-1100 nm emission. FIGS. 6A-6C. FIG. 6A is a schematic of a temperature measurement set up. FIG. 6B shows black body radiation from a sample was collected by an optical fiber through a customized grating black box. The spectrum of the radiation populated a 16 pixel photodiode arrays (Hamamatsu S4111-16R) at 600 nm to 1100 nm. Light paths are illustrated in FIG. 6B. The reversed bias voltages (9 V) from the photodiode arrays were collected by the National Instrument multifunction I/O device PCIe-6320. FIG. 6C is a graph showing black body radiation fitting. The temperature from each point of the temperature vs time graph is determined by the black body radiation fitting of the spectrum from 0.6-1.1 µm emission. The insets 631, 641, and 651 are spectrum fitting for 3000 K, 3500 K and 2500 K, with plots 632, 642, and 652 for real data and plots 633, 643, and 653 are fitted curves.

The CB-FG quality was determined using Raman spectroscopy at low magnification by varying time and temperature. At less than 90 V and less than 3000 K, FG had high a D peak, indicating a defective structure. See FIGS. 5A-5C and FIG. 5F. By increasing the voltage output, CB-FG was formed at 3100 K and it had low defects with almost no D band in the Raman spectrum. Therefore, 3000 K is a critical temperature to reach for higher quality graphene with a larger $I_{2D/G}$ value.

By increasing the compression on the sample between two electrodes, the conductivity of the carbon source increases, thus decreasing the discharge time. See FIGS. 5D-5E and FIG. 5G. At the same 3200 K, a short 10 ms flash duration results in a higher 2D band while a 50 to 150 ms flash results in a lower 2D band product. See FIG. 5G. This indicated that given more time, the graphene flakes stack, orient and form more layers which lowers the 2D band of the resulting FG. A slow cooling rate increased the flash duration and decreased the 2D band. [Yao 2018]. Therefore, in order to have high $I_{2D/G}$, a thin quartz tube can be utilized to accelerate the radiative cooling rate. Interestingly, although the internal temperatures exceed 3000 K, the external walls of the quartz tubes are only warm to the touch (less than 60° C.) after the flash process. Most of the heat exits as black body radiation.

FIGS. 7A-7F are X-ray photoelectron spectroscopy (XPS) of calcined petroleum coke, pre-treated coffee and carbon black before and after the FJH process. Significant reduction in contaminants is seen with FG from carbon black, i.e., there is a significant reduction of elements other than carbon in FG. Carbon has a high sublimation temperature of around 3900 K. Other elements, such as aluminum or silicon, volatilize out at less than 3000 K.

Figure 8A:
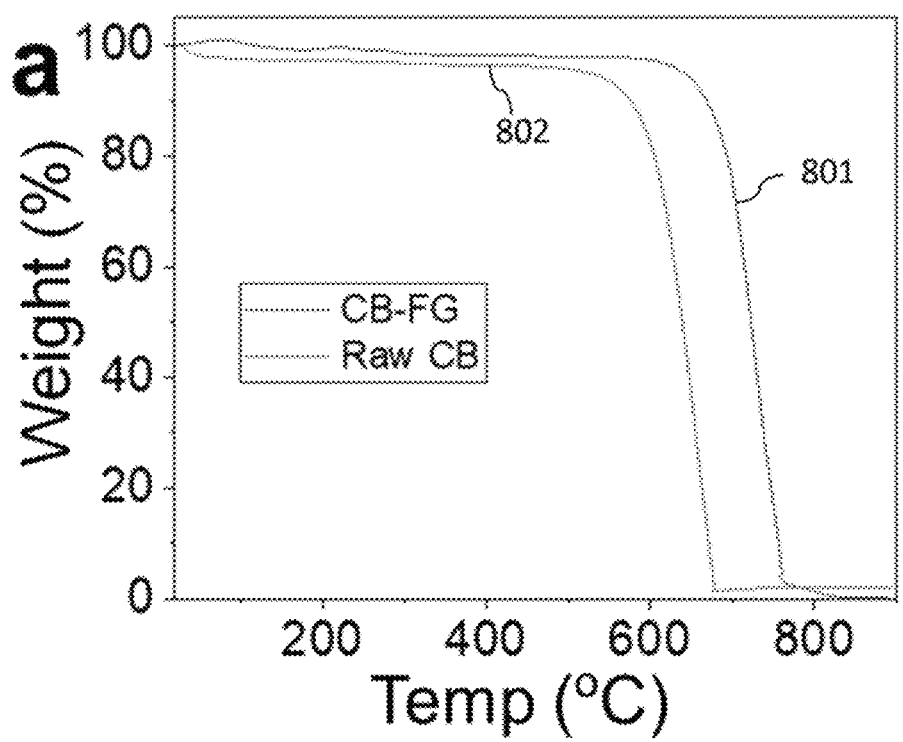
Figure 8B:
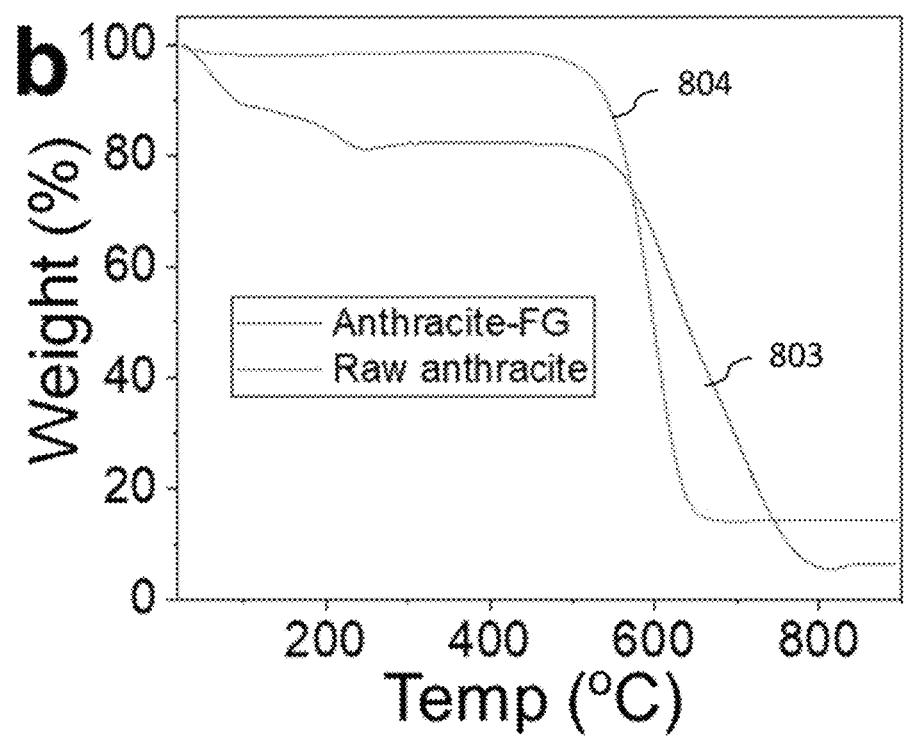
Figure 8C:
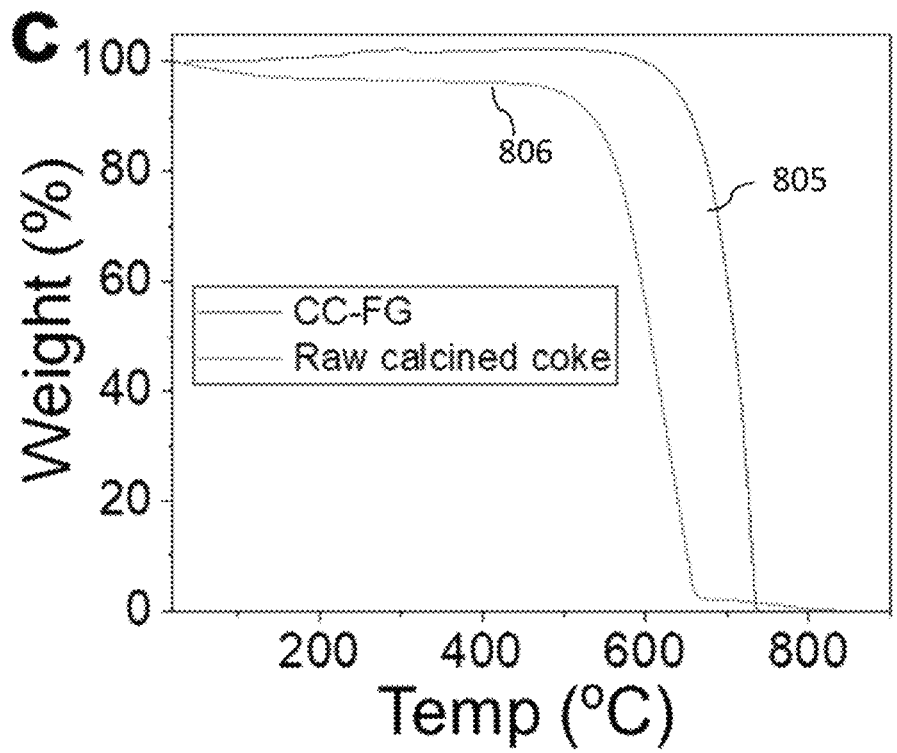
Figure 8D:
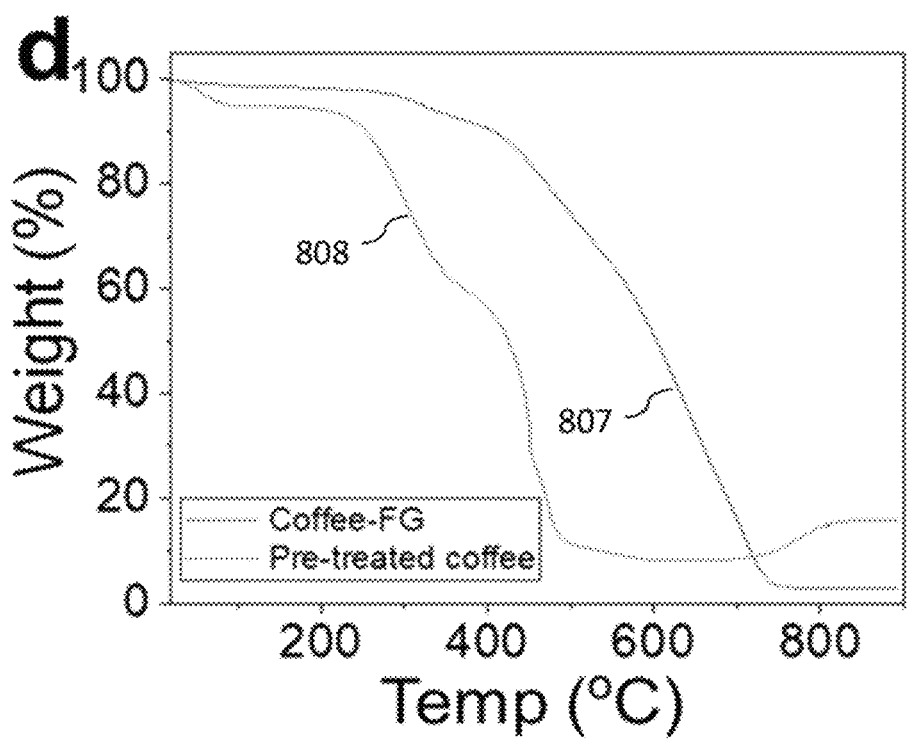

Thermogravimetric analysis (TGA) in air showed that the FG products were more oxidatively stable than the materials from which they were derived (FIGS. 8A-8D) and they are more stable than reduced graphene oxide (RGO) made from the Hummer's method. [Advincula 2018]. In FIG. 8A, TGA curves 801-802 are for CB-FG and raw CB, respectively. In FIG. 8B, TGA curves 803-804 are for anthracite-FG and raw anthracite-FG, respectively. In FIG. 8C, TGA curves 805-806 are for CC-FG and raw calcined coke, respectively. In FIG. 8D, TGA curves 807-808 are for coffee-FG and pre-treated coffee, respectively.

Figure 8E:
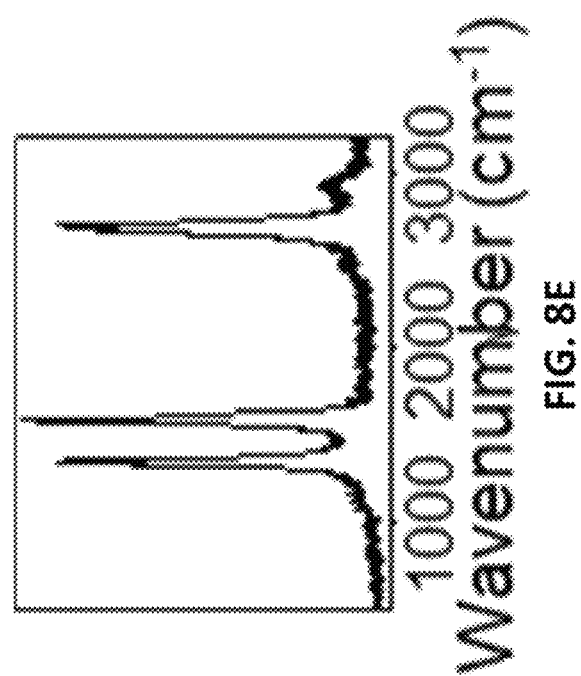
FIG. 8E is a Raman spectroscopy of the TGA-residue from the coffee-FG of FIG. 8D.

With carbon black, anthracite coal and coffee, there was significant decrease in the final weight between the precursor material and the derived FG. XPS of the TGA residue shows that the TGA-residue from anthracite-FG contains of C (15%), O 62%, Si (11%) and Al (12.6%); and residue from coffee-FG contains of C (65%), O (25%), S (2.9%) and P (2%). In some cases, silicon oxide residues were detected that came from over-worn quartz tubes after multiples uses. As shown in FIG. 8E, the TGA-residue from coffee-FG was analyzed by Raman spectroscopy, which showed that it is significantly graphene. It was believed that degassing of hydrogen, nitrogen and oxygen during the FJH process might have contributed to the formation of large and thin graphene sheets in coffee-derived FG since it could prevent stacking of graphene layers thereby permitting further growth. [Harris 2017; Lin 2014; Luong 2018].

Mechanism of FG Growth

To assess the mechanism of the rapid flash graphene growth, large-scale simulations were employed with the AIREBO [Stuart 2000; Brenner 2002] interatomic potential as implemented in the LAMMPS package. [Plimpton 1995]. An FJH system as shown in FIGS. 2A-2D (discussed above) was employed. Inside the quartz tube, two loosely fitting electrodes compressed the carbon source using two copper wool plugs or graphite spacers to contact with the carbon sources to allow degassing of volatile materials. The compressing force was controllable by a modified small vise so as to minimize sample resistance to 1 to 1000Ω and was an important factor for obtaining a good flash reaction (0.004 to 4 S·cm$^{-1}$). To control the discharge time, a mechanical relay with millisecond programmable delaying time was used. The entire sample reaction chamber was placed inside a low-pressure container (plastic vacuum desiccator) for safety and to facilitate degassing. (However, the FJH process works equally well at 1 atm.) The capacitor bank consisted of 20 capacitors with total capacitance of 0.22 F. Each capacitor had its own switch that was enabled. The capacitor bank was charged by a DC supply capable of reaching 400 V. Using a large quartz tube 15 mm in diameter, a 1 gram per batch FG synthesis was achieved using the FJH process.

All switches were circuit breakers that matched the voltage and current rating. The maximum charging and bleeding voltages used were around 400 V while the maximum currents were 0.7 A and 0.1 A, respectively. The pulse discharging voltage to the sample was around 400 V and current could be reached up to 1000 A in less than 10 ms. A 24 mH inductor was used to avoid current spikes while using the mechanical relay. Without the inductor, the mechanical relay could be prone to high current arcing during the intermittent closing of the circuit. To protect the inductor from the spike voltage when shutting off the current, a diode and low Ohm resistor with appropriate ratings were connected parallel to the inductor. Additionally, to protect the capacitor from reverse polarity in case of oscillatory decay that can occur in a fast discharge, an appropriate diode was placed parallel to the capacitor bank.

Figure 9B:
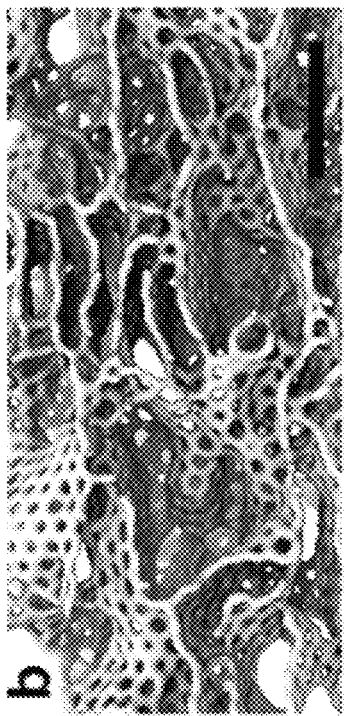
Figure 9G:
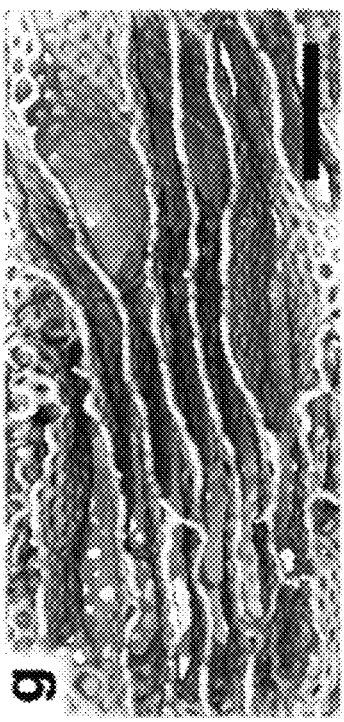
Figure 9A:
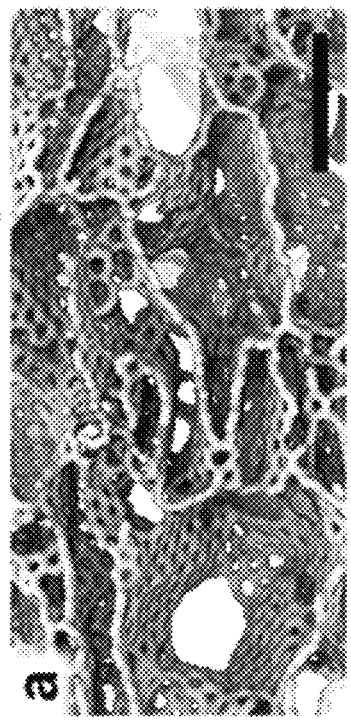
Figure 9C:
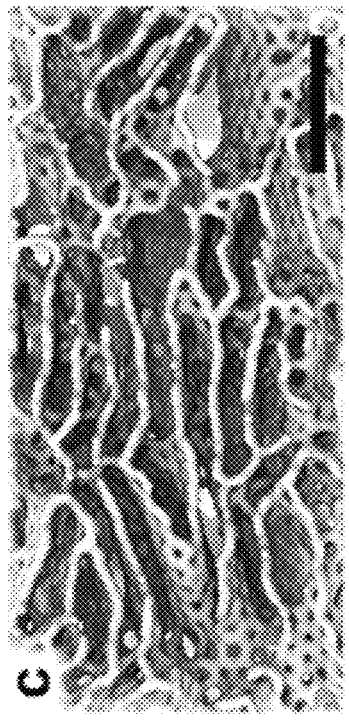

Some of the acquired structures are shown in FIGS. 9A-9D. In FIGS. 9A-9D, sample structure after annealing at 3000 K for carbon materials of various densities: FIG. 9A is a 0.8 g·cm$^{-3}$, sponge-like structure; FIG. 9B 1.1 g·cm$^{-3}$; FIG. 9C is a 1.5 g·cm$^{-3}$, high degree of graphitization. FIG. 9D shows carbon black with 0.8 g·cm$^{-3}$ density and large macro-porosity after prolonged (5×10$^{-9}$ s) annealing at 3600 K, polygonal fringes are apparent.

The low-density materials yielded a sponge-like structure (FIG. 9A) during annealing, while increased density leads to a high level of graphitization (FIG. 9C). There was a high level of graphitization in the low density CB sample where the significantly increased local density was combined with high macro-porosity (FIG. 9D). FIG. 9G shows 1.5 g·cm$^{-3}$ structure after annealing at 5000 K, initial structure being the same as for FIG. 9C.

Additionally, the annealing process was quantified by the $sp^2/sp^3$ ratio during simulation. FIGS. 9E-9F show change of structural composition of materials during annealing with different densities and temperatures. It was found that the graphene formation process was strongly impaired at lower temperatures (less than 2000 K) but greatly accelerated by higher temperature (5000 K). (FIG. 9G shows 1.5 g·cm$^{-3}$ structure after annealing at 5000 K, initial structure being the same as for FIG. 9C.) Continuous defect healing during FJH, in case of the carbon back, results in the gradual conversion of initially roughly spherical centroid particles into polyhedral shapes (FIG. 9D) that in TEM images of the experimental material could manifest as fringes at clearly defined angles (see FIGS. 1B and 1E), further confirming the low-defect nature of produced materials.

Graphene

2D-Material

While graphene is often depicted as a single sheet of carbon, it occurs as a single isolated sheet generally only in specialized laboratory conditions. In any substantial production method such disclosed and taught herein, graphene can appear in the form of aggregates. The field of the present invention have defined graphene as a 2-dimensional (D) material, in contrast to carbon nanotubes as a 1-D material and graphite as a 3-D material. [Novoselov 2004; Allen 2009; Partoens 2006; Malard 2009]. When the $sp^2$ carbon sheets within these aggregates retain the electronic structure of a 2-D rather than 3-D material, then a descriptive adjective is used as a prefix, such as bilayer graphene, few-layer graphene, N-layer graphene; and if the adjacent sheets are randomly oriented rather than AB-stacked, several different adjectives are used with the same meaning, such as: mis-oriented [Partoens 2006], twisted [Yan 2013], rotated [Kim 2012], rotationally faulted [Kato 2019; Niilisk 2016], weakly coupled [Kiselov 2014], and turbostratic [Garlow 2016]. In spite of the varied terminology, there is agreement in the art that, in all cases, the individual layers retain their 2-D properties when randomly stacked. Hence, the use of the term "graphene" herein for such stacking is supported in the scientific literature by the leading scientists in the field, even when there are many layers.

Figure 10B:
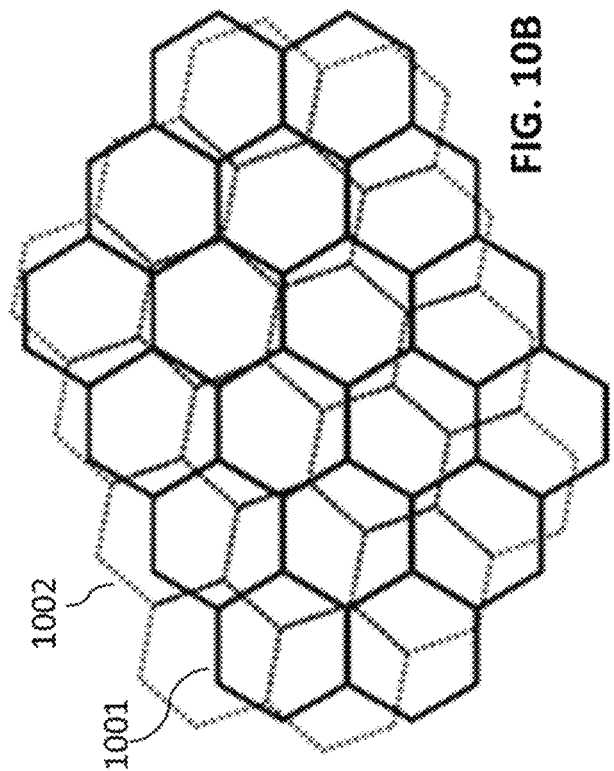
FIGS. 10A-10B are, respectively, illustrations of (FIG. 10A) AB stacking order and (FIG. 10B) non-AB stacking or turbostratic of a pair of graphene lattices.
Figure 10A:
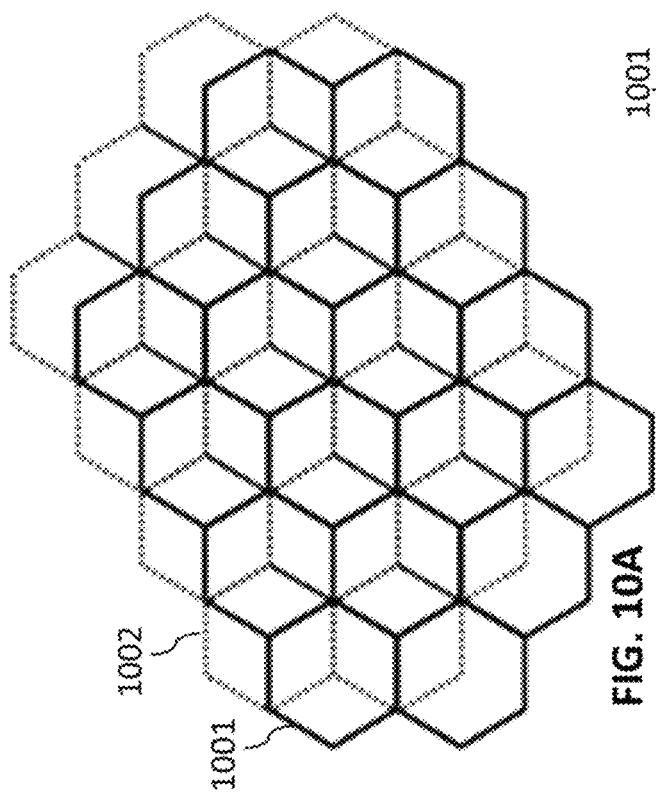

FIG. 10A is an illustration of graphene lattices 1001-1002 in an AB stacking order. FIG. 10B is an illustration of graphene lattices 1001-1002 that are non-AB-stacked or trubostratic. These illustrations were reproduced from Hao 1990.

Raman spectrum, provides a direct monitor for the electronic structure and is also completely unambiguous in identifying the 2-D nature of these aggregates. Raman spectroscopy is the "gold standard" as a diagnostic of graphene that appears in experimental studies. [Malard 2009; Kim 2012; Kato 2019; Niilisk 2016; Ferrari 2006; Ferrari 2007; Kudin 2008; Ni 2009; Ferrari 2013]. That is because it is a direct probe of the electronic band structure of the graphene, which in turn plays a central role in the unique character of this 2-D material.

It is not the physical dimensions or the number of atomic layers but rather the properties, especially electronic properties that constitute a 2-D material. Graphene is characterized by a 2-D gas of Dirac fermions. [Novoselov 2005]. A 2-D material is that which is highly anisotropic in electron mobility, just as carbon nanotubes are a 1-D material because high mobility in one direction. For graphene, the mobilities are ballistic in the x-y plane, but when stacked, the c-axis mobility is very much smaller. And turbostratic graphene has the greatest anisotropy of all, and even for multiple layers, remains fully 2D with ballistic mobility in two dimensions, and many orders of magnitude lower conductivity in the third dimension.

Experimental measurements by Kim et al. demonstrated that the extremely large anisotropy between ballistic electrons in plane and those trying to cross between layers is retained when the graphene sheets are stacked in a twisted manner. [Kim 2012]. They reported about $10^{-3}$ ohm-meter resistivity for HOPG which is ~5 orders of magnitude higher resistivity than copper and the interlayer resistivity is again 4 orders of magnitude larger. Yet the in-plane transport for turbostratic graphene remains ballistic for the electrons.

It has also been previously reported that, for AB (also called aligned or Bernal) stacked graphene, the 2-D properties of single layer graphene (SLG) or few layer graphene (FLG) gradually transition to 3-D material with the Raman spectra evolving into that characteristic of HOPG for about 10 layers. [Partoens 2006; Novoselov 2005]. However, this rule of thumb does not apply to turbostratic graphene. Because the individual layers are weakly coupled, they retain the 2-D character independent of the number of stacked layers. [Kim 2012; Niilisk 2016]. The 2D peak retains its narrow Lorentzian lineshape, and no additional states are introduced to the Dirac cone at the K-point. Hence the Raman scattering for the 2D peak remains a single peak that is doubly resonance enhanced, giving rise to its strong enhancement. And it remains a zero band gap semiconductor. In contrast, when two layers are AB-stacked, the strong coupling creates additional states with a parabolic shape around the K-point, which allows for more transitions. The 2D peak becomes a sum of four Lorentizians, two strong and two weak, and it substantially broadens while losing its Lorentzian line shape. Studies have reported rotationally misoriented graphene, some by the ingenious method of folding a single sheet, which guarantees misalignment. As a result of the poor overlap of the 2p atomic orbitals, the two sheets retain their SLG characteristics. [Kim 2012; Niilisk 2016; Garlow 2016].

The presence or absence of certain relative weak Raman combination bands are positive indicators for the occurrence of turbostratic graphene:

Combination Raman modes of as-grown graphene within the frequency range of 1650 $cm^{-1}$ to 2300 $cm^{-1}$, along with features of the Raman 2D mode, were employed as signatures of turbostratic graphene.

The combination of in-plane transverse acoustic (iTA) and the longitudinal optic (LO), iTA and longitudinal acoustic (LA) and LO+LA modes. The iTALO-mode is designated as $TS_1$ and the iTOLA/LOLA-modes are designated as $TS_2$.

$TS_1$ and $TS_2$ can be used as positive indicators. The designations of $TS_1$ and $TS_2$ are used herein to indicate these two features that are Raman active only for SLG and turbostratic graphene. $TS_1$ is a single Lorentzian that occurs in the vicinity of 1880 $cm^{-1}$ and $TS_2$ consists of two closely space Lorentzians that occurs in the vicinity of 2030 $cm^{-1}$. It must be kept in mind that these lines exhibit dispersion, like many Raman features in graphene. The excitation wavelength must always be noted, and dispersion corrections must be applied when comparing the peak frequencies. In addition, the "M" band occurs about 1750 $cm^{-1}$ but this combination band becomes silent for turbostratic graphene. Hence the presence of the M band is a negative indicator for turbostratic graphene, and a positive indicator for AB-stacked graphene as well as HOPG.

Turbostratic Graphene

Turbostratic graphene, even with many layers, is truly a 2-D material whereby electrons move with complete freedom like a massless Fermi gas in two dimensions but are in effect, unable to move perpendicular to it. It will be most difficult to find any other material that is so purely 2D as multilayer turbostratic graphene. The turbostratic property of FG renders it far easier to exfoliate in composites and solvents, and gives it different electronic, optical and structural properties as described herein below, and hence is a key quality of this bulk synthesized turbostratic FG.

The D-peak of turbostratic graphite is much larger than both the G-peak and the 2D peak, which is entirely the opposite of our turbostratic graphene samples which have a D-peak that is very much smaller than the G-peak, which in turn is smaller than the 2D peak. [Kumar 2013]. Raman spectroscopy is a probe of the vibrational motions of the atomic structure, hence the huge D-peak proves that the individual graphene lattice is much disrupted in turbostratic graphite. It is profoundly disordered on the nanoscale. And that is why researchers lament that the slow development of the field of research into the very promising area of turbostratic graphene has been due to the difficulty of obtaining the material. [Kato 2019; Garlow 2016]I.e., turbostratic graphene can only be produced in tiny amounts by CVD or epitaxial growth. See also Tour '821 Patent Application, in which laser-induced graphene was produced that was turbostratic, which method was not a bulk synthesis method in that a laser could only make a 20-micron-thick surface of it, and after an entire day of lasing, less than 1 gram could be produced.

And even growth under such careful conditions does not assure that the material will be turbostratic. One group that was able to try for a thickness of 10 layers of graphene using CVD on nickel foil obtained varying results, sometimes AB-stacked, sometimes turbostratic, and sometimes a mixture of the two. [Niilisk 2016].

Figure 11:
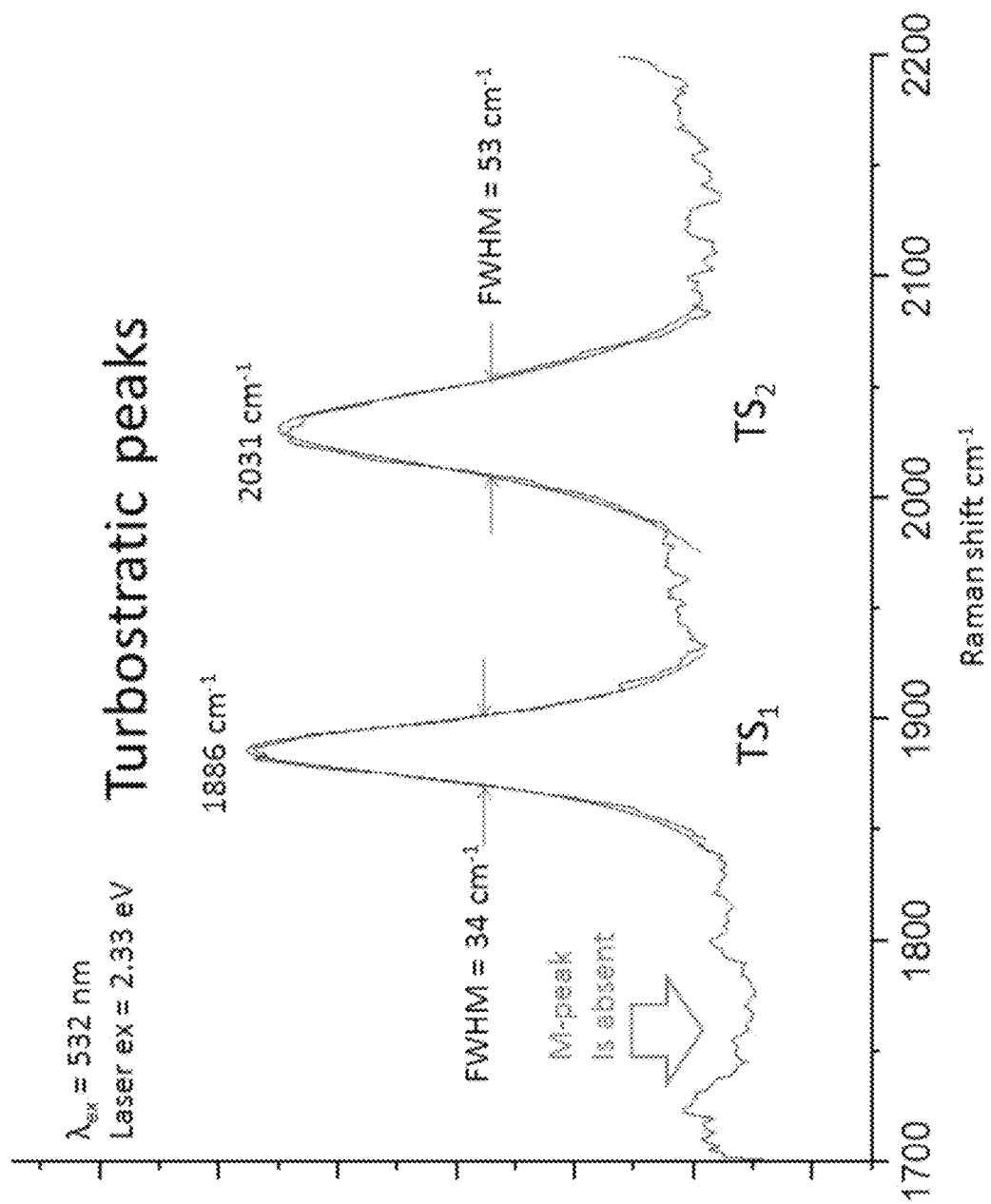
FIG. 11 is graph of the Raman spectrum of carbon black (CB) derived flash graphene showing turbostratic peaks.

Raman spectrum confirms that the FG process of the present invention can produce large amounts of turbostratic graphene. FIG. 11 shows the turbostratic peaks in a Raman spectrum of carbon black-derived flash graphene In FIG. 11, $I_{G/TS1}$ is ~30 and the Lorentzian fit is shown as a superimposed smooth line. The R-squared is 0.994 for $TS_1$ and 0.99 for $TS_2$. These excellent fits indicated the high quality of the material and unmistakable presence of the Raman lines for turbostratic graphene. FIG. 11 also shows that the M-peak is absent, which is a further indicator for turbostratic graphene.

Figure 12A:
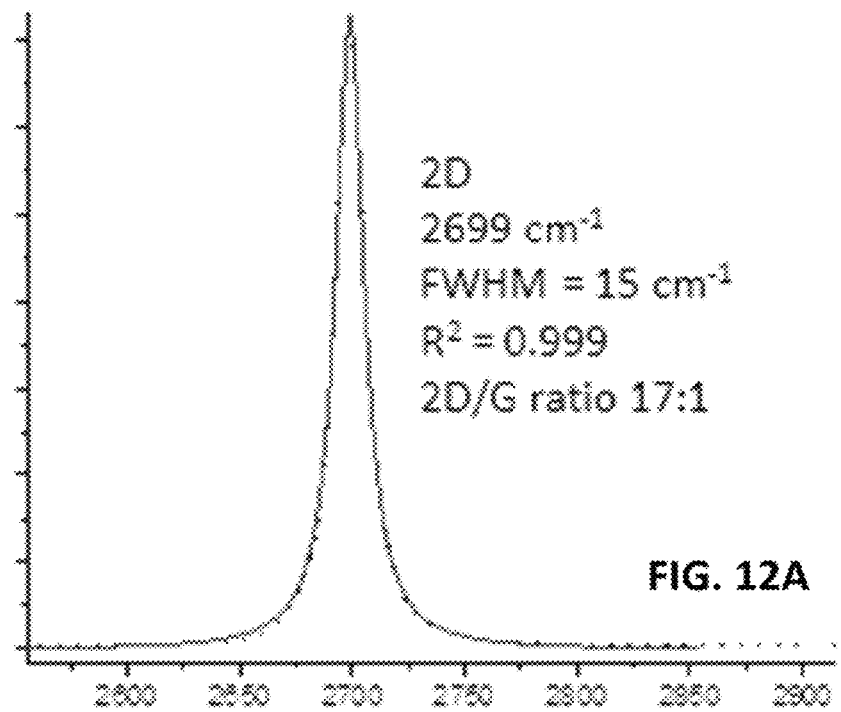
FIGS. 12A-12B are graphs of 2D peak in the Raman spectrum of carbon black (CB) derived flash graphene.
Figure 12B:
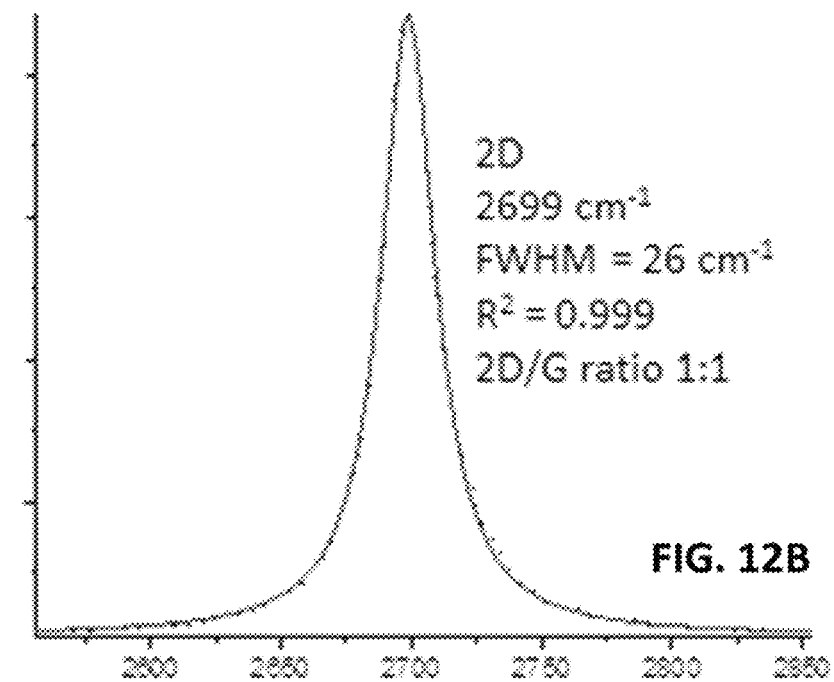

FIGS. 12A-12B show the 2D peak in the Raman spectrum of carbon black-derived flash graphene. FIG. 12A shows the best point in CB-FG, and FIG. 12B shows representative point CB-FG. Both peaks exhibit essentially a perfect Lorentzian lineshape. The dots in FIGS. 12A-12B are the theoretical lineshape. The $R^2$ for the correlation is 0.999 for both peaks. This is indicative of a fully conical Dirac cone at the K-point.

The narrow, single Lorentzian 2D peak can occur only for either SLG or turbostratic graphene whereby the adjacent layers are decoupled and do not give rise to additional electronic states. This in turn means that the FG remained perfectly 2-dimensional, even though there are many layers of graphene stacked up. For FIG. 12A, the Lorentzian full-width-at-half maximum (FWHM) has actually become narrower than for the perfect SLG. This narrowing is a unique feature of rotationally misaligned graphene that is stacked and only occurs for turbostratic graphene.

TABLE III is a comparison of 2D, $TS_1$ and $TS_2$ peak of the FG made by the present FG process disclosed herein with trubostatic graphene made in previous studies [Niilisk 2016; Garlow 2016]. The peak position from previous studies that used 514 nm excitation laser are corrected to match the 532 nm excitation laser in this study.

TABLE III

|  | 2D | | $TS_1$ | | $TS_2$ | |
| --- | --- | --- | --- | --- | --- | --- |
|  | Position | FWHM | Position | FWHM | Position | FWHM |
| Niilisk 2016 | 2697 | 36 | 1886 | 34 | 2030 | 54 |
| Garlow 2016 | 2702 | 27 | 1884 | 38 | 2031 | 51 |
| FG process | 2699 | 15-26 | 1886 | 34 | 2031 | 53 |

Comparing FG spectra with data from two different references [Niilisk 2016; Garlow 2016], the locations and FWHM of the two TS (turbostratic) peaks were essentially identical in both cases. The location of the 2D peak was also the same, with FG wider Lorentzian matching the FWHM of that from Garlow 2016. Compared to Niilisk 2016, which has about 10 layers of turbostratic graphene, again there was an identical match with the $TS_1$ and $TS_2$ peaks both in frequency and width. The 2D also matches the frequency, although the peak is somewhat broader for Niilisk. And for both references [Niilisk 2016; Garlow 2016], the M-peak that was characteristic of both AB-stacked graphene and highly ordered pyrolytic graphite (HOPG) was absent. And the M-peak was absent from FG spectra as well. Therefore, there were several precise and redundant correlations between FG turbostratic Raman data and two references [Niilisk 2016; Garlow 2016] that have obtained Raman spectra from proven turbostratic graphene. In addition, the narrowing of the 2D Lorentzian FWHM was further support of the turbostratic stacking as a 2-dimensional material.

Moreover, the process for detonating carbon containing-material disclosed and taught in the Sorensen '857 Patent (for the high yield production of graphene) neither mentions nor reveals the formation of turbostratic graphene. Indeed, the Sorensen '857 Patent does not show TEM of few layers graphene; does not show SAED of misaligned few layers; and does not show $TS_1$ and $TS_2$ peaks from turbostratic graphene. Rather, the 2D band of the Raman spectrum in FIG. 14 of Sorensen '857 Patent is much broader than that for monolayer graphene and increases to 43 $cm^{-1}$ to 63 $cm^{-1}$. This is characteristic of either AB-stacked crystalline graphene or turbostratic graphite, whereas turbostratic graphene demonstrates a FWHM similar or narrower bandwidth compared to single layer graphene and will be significantly less than 43 $cm^{-1}$. All of this supports that the Sorensen '857 Patent is not producing turbostratic graphene, as compared to the low defect turbostratic graphene produced by the FG process of the present invention. By low defect we mean that the individual graphene sheets are predominantly $sp^2$-hybridized carbon atoms. And then those individual sheets are stacked in a predominantly turbostratic fashion with respect to each other with little AB-stacking observed in the sample.

As described above, other researchers have made very small samples of turbostratic graphene by growing individual sheets of graphene through a CVD method or through graphite exfoliation, and placing one sheet of graphene upon another is a misoriented (turbostratic) fashion. Or by taking a single sheet of CVD grown graphene or graphite-exfoliated graphene, and folding it over on itself in a misoriented (turbostratic) fashion. But there have not been bulk syntheses of misoriented or turbostratic graphene where the majority of the graphene in the bulk sample is turbostratic.

Continuous/Automated Synthesis Systems

Scaling up the FJH process can be done by increasing the quartz tube size. With 4 mm, 8 mm and 15 mm diameter quartz tubes, 30 mg, 120 mg and 1 gram of FG were synthesized per batch. FIG. 13A shows the amount of CB-FG from the three tube sizes (with tubes 1301-1303 having diameters 4 mm, 8, mm, and 15 mm, respectively) and also a flat tube 1304 having a dimension of 3×6 mm). Two separate syntheses were conducted for each; one synthesis left in the tubes (tubes 1301-1304) and another synthesis transferred to plastic dishes (dishes 1305-1308, respectively). The amounts synthesized per batch were 0.003 grams, 0.1 gram, 1 gram, and 0.1 gram for tubes 1301-1304, respectively. The shorter flash from the smaller tube results in FG with a higher $I_{2D/G}$. To increase the batch size while maintaining the FG quality, flat tubes were helpful to allow a faster cooling rate.

Figure 14:
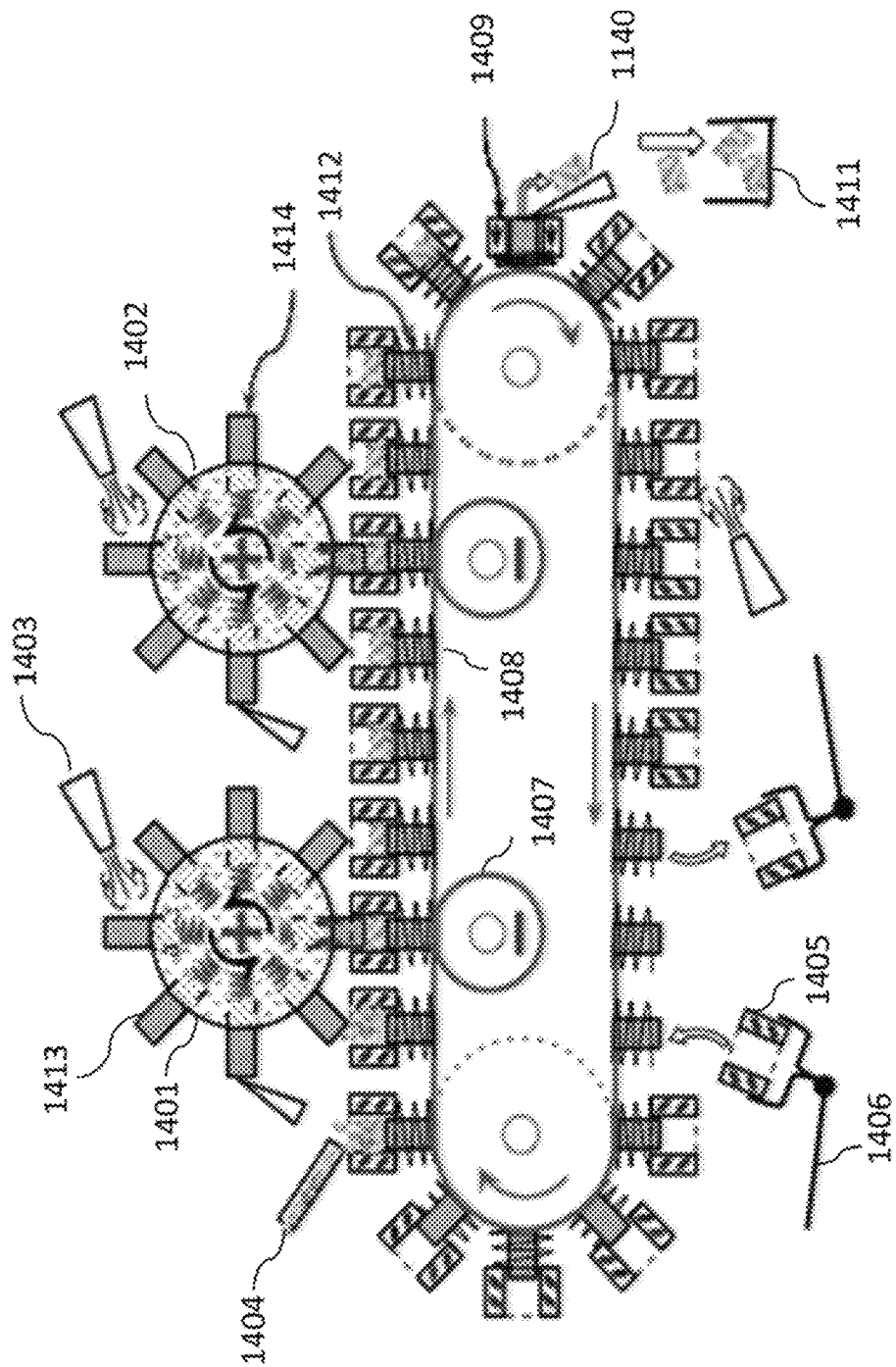
FIG. 14 is an embodiment for automation of the FG process.

For industrial production, the process can be automated for continuous FG synthesis. FIG. 14 is an embodiment for automation of the FG process. FIG. 14 is a continuous belt FG process that has a belt 1408 and gears (first gear 1401 and second gear 1402) for high throughput in the FJH system. The rotary motion of gears 1401-1402 are synchronized to the movement of belt 1408, and has separate gears for preheat and flash. I.e., first gear 1401 has electrodes 1413 for compression and preheat, and second gear 1402 has electrodes 1414 for FJH pulse. It is believe that the rate can be at least 60 pps.

The belt 1408 has quartz (or ceramic) tubes 1405 that can be plucked and replaced. As shown in FIG. 14, the quartz tubes 1405 can be mounted away from gears 1401-1402 on a spring with a weak friction fit and protruding beyond the cylindrical electrode. This forms a cup with an electrode 1412 at the bottom of quartz tubes 1405, and a powder feed 1404 of the precursor is measured into the quartz cup 1405. The measured feed could be an auger screw, meshing gears, or a piston feed, and is typically straightforward, as there are a variety of powder feeds available.

The belt 1408 can be moved by rollers 1407, which can be metallic. When an electrode 1413 in first gear 1401 engage, it projects into the top of the quartz cup 1405, compressing the precursor powder. When an electrode 1414 in the second gear 1402 engages, an electrical pulse converts the sample to FG. The system includes a series of gas jets 1403 that can blast cool gas on the various electrodes (electrodes 1412-1414). The blast of air from gas jets 1403 can also be used to clean the quartz cups 1405, and remove particles. (Water spray is also optional). To remove the FG from the quartz cups, the quartz cup can be depressed (which is shown by quartz cup 1409 in FIG. 14), and, using a stream of gas from nozzle 1140, the FG is removed from the quartz cup 1409 and collected in collection bin 1411.

Because the hot carbon atoms are strongly reducing and corrosive, the quartz cups 1405 can be damaged. A wheel or robotic arm 1406 could pluck off, for example, every tenth quartz cup to be cleaned or replaced, with a fresh supply of clean cups added further along as belt 1128 is rotated. With such a simple replacement scheme, low expansion borosilicate (Pyrex) may be suitable (Pyrex has been tested and it works well), and much less costly than a quartz tube/cup. Since damage tends to be cumulative, frequent cleaning of the quartz cup may allow many cycles of reuse.

Three-Phase AC Power Systems

Scaling up flash graphene can involve high power pulses. Commercial and industrial power in the United States is three phase, 60 Hz with each sine wave shifted by 120 degrees. This has the advantage of providing uniform power when all three phases are used. For high power systems, it is preferable to avoid having an unbalanced load whereby one or two of the three phases is used and the other not used.

Single phase power can be used, and with a 60 Hz sine wave, each half cycle is $1/120$ second duration. The power passes through zero 120 times per second, and the heating is not temporally uniform. Adding half cycles also adds increments of 8.33 ms, which is a larger change in pulse energy compared to three phase power. If single phase is obtained from a single wire and common, then this is either 120 volts or 277 volts. If two of the three circuits are used, then it is still a single sine wave, with the RMS voltage larger by the square root of 3=1.732. This may not necessarily be desirable for larger systems because of the unbalanced load on the incoming power supply.

Figure 15:
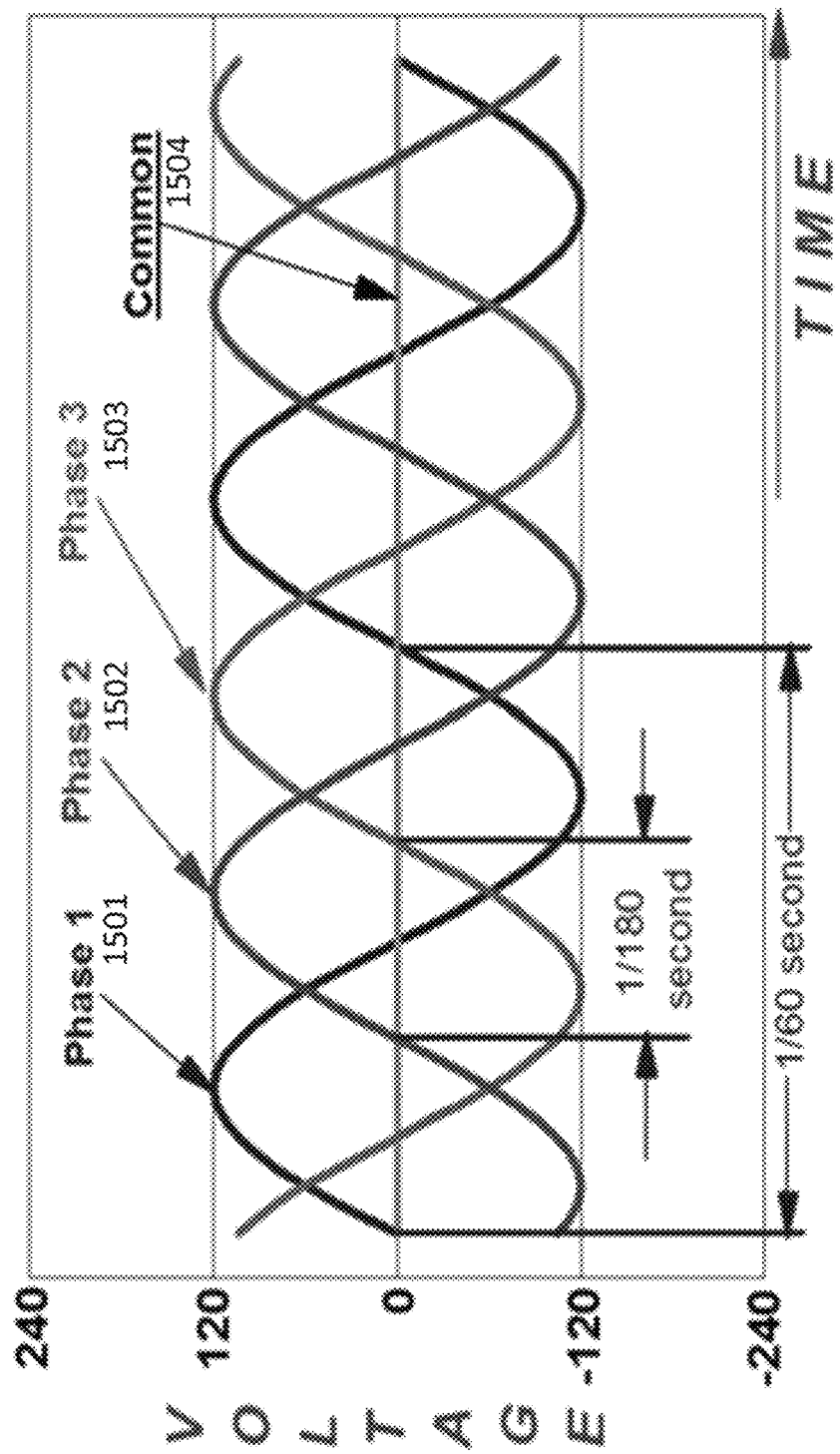
FIG. 15 is an illustration of the three sine waves of three-phase power that can be used in an embodiment of the present invention.

FIG. 15 is an illustration of the three sine waves of three-phase power that can be used in an embodiment of the present invention (i.e., curves 1501-1503 show Phase 1, Phase 2, and Phase 3 (at 60 Hz), respectively, with curve 1504 showing the common (or neutral)). Three phase power uses three circuits or wires. Phases 1-3 are shifted by 120° and are separated by $1/180$ second. For laboratory power it can be 120 volts (RMS) to ground and 208 volts (RMS) between phases (live wires). Unlike single phase which goes to zero 120 times per second, three phase power is uniform.

Three phase power is available for several voltages. For higher power industrial systems 480 volts (RMS) between phases can be used, which is also 277 volts (RMS) relative to the common (or neutral). Also, 575 volts (RMS) is also used industrially. Distribution transmission lines typically use 5 kV or 12 kV (RMS) between phases.

To produce flash graphene, a pulse duration is selected, which is then subjected to full-wave rectification to provide DC power to the sample.

Figure 16:
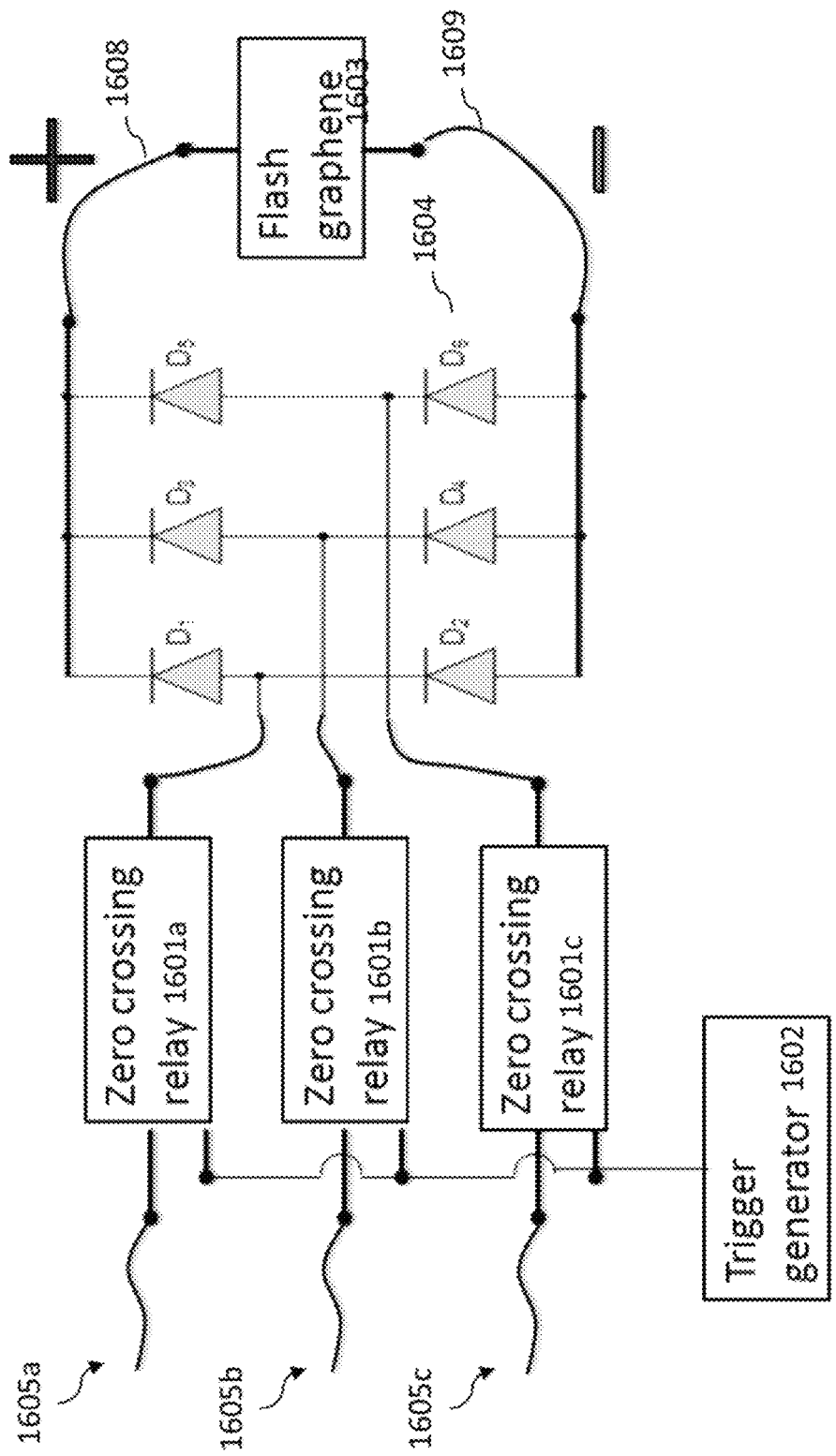
FIG. 16 is an illustration showing three-phase for FG scale-up.

FIG. 16 is an illustration showing three-phase for FG scale-up, which is an apparatus for controlling the pulse duration followed by rectification for the FG process to make FG 1603. The apparatus has three zero crossing relays (relays 1601a-1601c) that do not need (or require) precision timing. Relays 1601a-1601c have, respectively, phase inputs 1605a-1605c, which are three-phase input that can have 208 volts between phases. One trigger generator 1602 is needed. Diodes 1604 are utilized for full rectification. Rectification to DC is needed to have two leads (positive lead 1608 and negated lead 1609).

Zero crossing relays 1601a-1601c are used to turn on each phase. These solid state relays 1601a-1601c are designed to turn on when the voltage for the phase to pass through zero, so that the current is approximately zero when the relay closes or opens. The relay does not switch when there is high current flow. The pulse from the trigger generator 1602 may precede the zero crossing. The relays 1601a-1601c may be referenced to common or ground when they switch on or off. The trigger generator switches 1602 off to end the flash graphene pulse, and the relays 1601a-1601c disconnect when the voltage passes through zero. The six power diodes 1604 convert the three AC sine waves into a continuous DC current for the flash graphene 1603.

Figure 17:
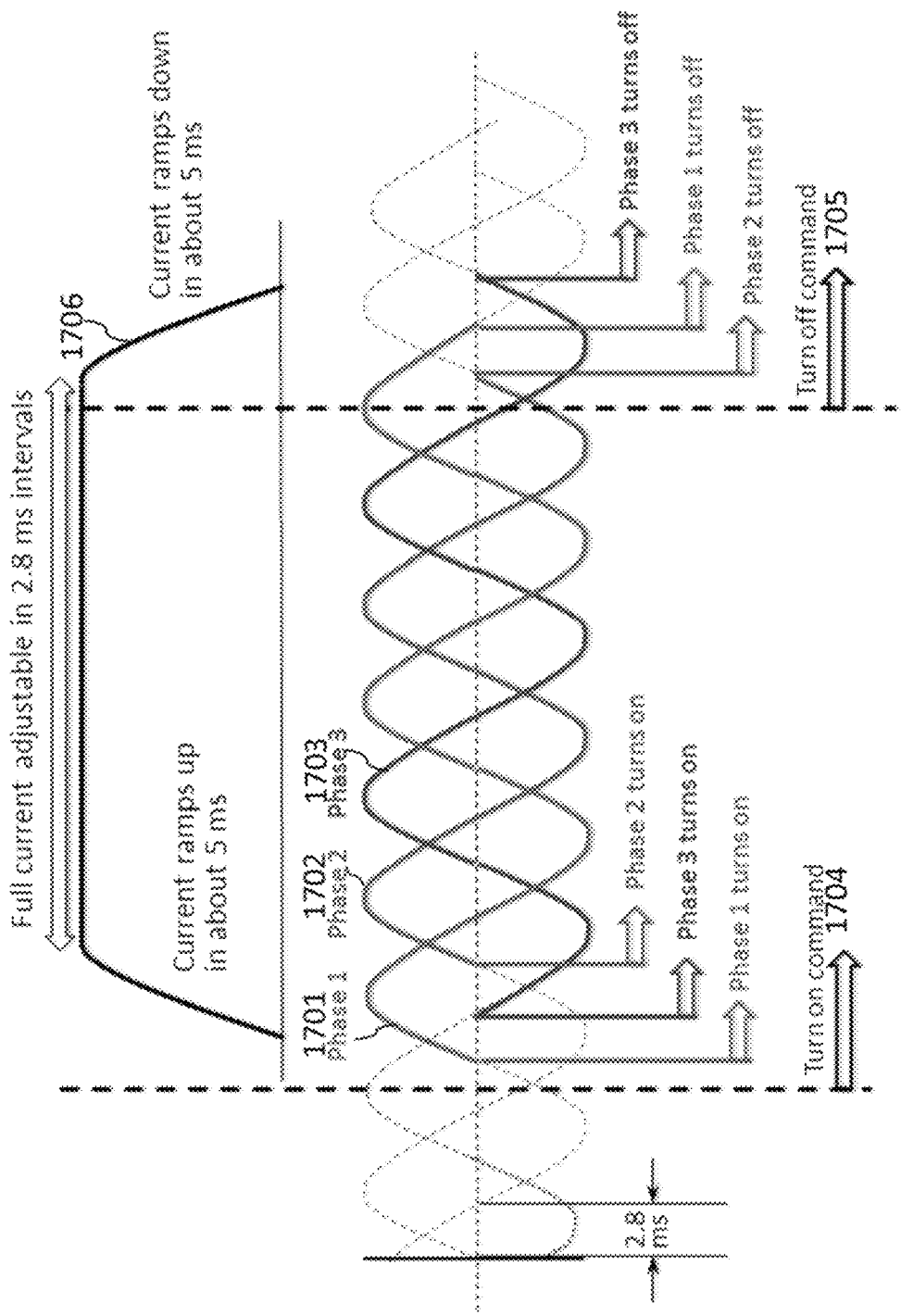
FIG. 17 is an illustration of forming the flash graphene pulse from three phase power.

FIG. 17 is an illustration of forming the flash graphene pulse 1706 from three phase power (pulses for Phases 1-3 are shown in wave curves 1701-1703). Three phase power uses three wires, each sine wave (shown by curves 1701-1703) is shifted by 120°. The average power is uniform. Each relay waits after the trigger signal for the next zero crossing to turn on or off as the case may be. By this manner, one a single on/off command is needed.

For each of the wave curves 1701-1703, the dotted lines show the available voltage. When each relay switches on (due to a turn on command 1704), curves 1701-1703 then solid lines represent power flowing. Each phase is turned on separately when the AC sine wave passes through zero volts relative to the common or neutral. Each is turned off separately in a similar manner due to a turn off command 1705 (with again, the phases turning off when the AC sine wave passes through zero volts relative to the common or neutral.

As shown in plot 1706, the rise time follows the shape of the sine wave, hence it takes milliseconds to turn on, providing a smooth increase and smooth decrease when the relays are turned off. When all three phases are switched on, then the power output is constant. This is subsequently rectified in order to provide two wires to connect to the flash graphene sample.

The total energy delivered is adjusted by the number of cycles that pass through the relays. Since the sine waves are offset by $1/360$ second (2.78 ms), this then corresponds to the incremental change in total pulse energy.

Figure 18:
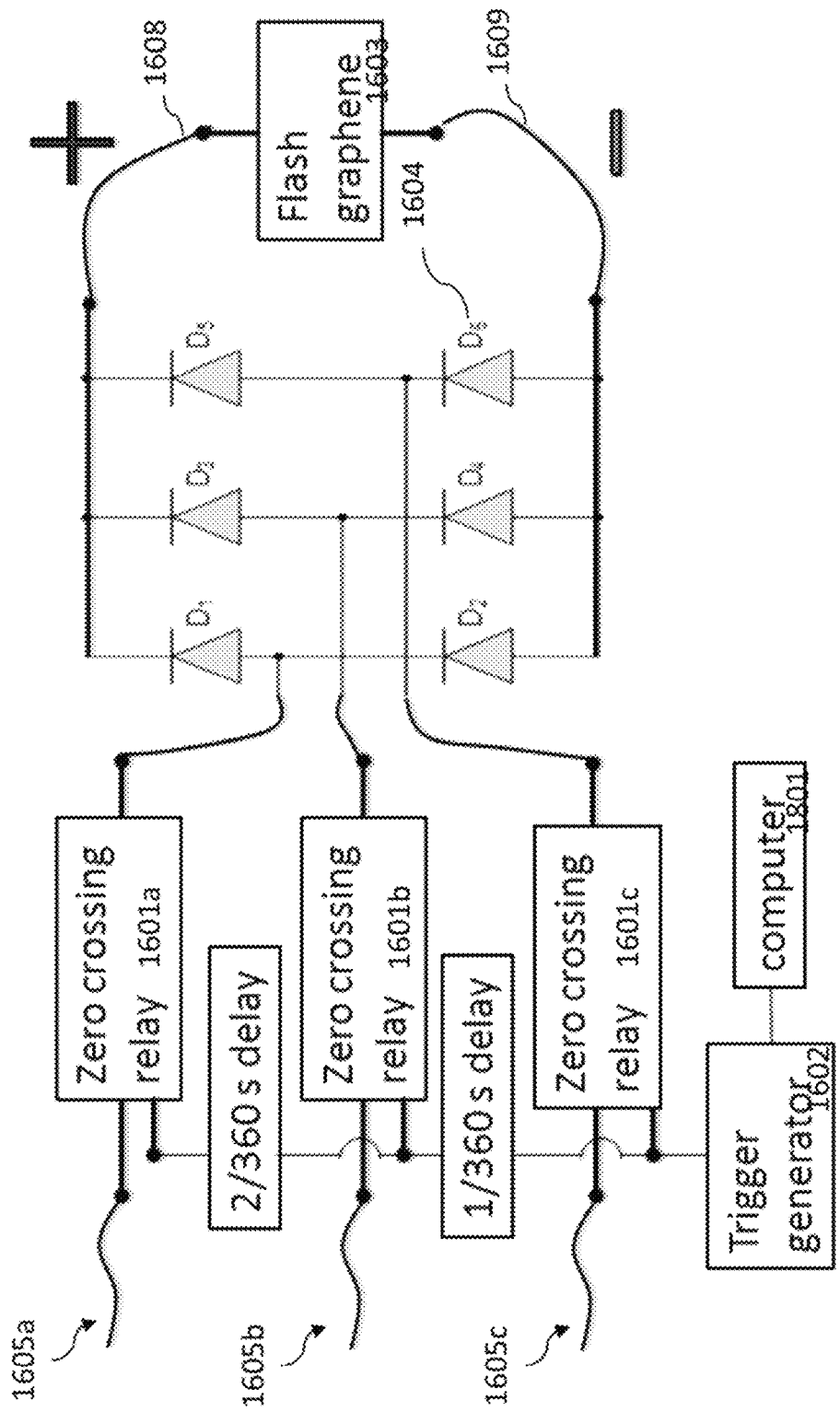
FIG. 18 is illustration of an embodiment showing three-phase for FG scale-up that has direct control of all three zero-crossing relays.

FIG. 18 is an illustration showing three-phase for FG scale-up, which is an apparatus for controlling the pulse duration followed by rectification for the FG process to make FG 1603, which process has direct control of all three zero-crossing relays. This apparatus is similar to the apparatus of FIG. 16, and includes a computer 1801 for precision phase detection.

In the alternative embodiment shown in FIG. 18, using computer 1801, the trigger generator 1602 can be synchronized to line frequency, and can be provided the turn-on command just as the sine wave is passing through zero. Since all three sine waves are synchronized relative to each other, then two delay circuits can be used to provide the trigger signals for the other two relays. The same system can be used to turn the relays off.

For three-phase AC power for flash graphene, a generator has the advantage of decoupling the high current need for large samples from the AC mains. A generator rotor can have a large amount of rotational inertia. It can convert stored mechanical energy into electrical energy very quickly. The generator could be accelerated with a much smaller electric motor that would spread out the power draw over several seconds to minutes, which is much less strain on the power transmission lines. The output voltage can be varied by reducing the RPM, or decreasing the voltage on the field coil, depending on the design of the generator. A flywheel may be added to provide a longer duration pulse. However, for a short 100 ms pulse, the inertia of the armature will likely be sufficient. Large commercial generators provide 3 phase AC power of 208 or 480 volts. Large industrial generators provide 5 kV and 13 kV. The generator can likely tolerate a momentary current overload that is five to ten times its rated continuous current, to provide a more powerful pulse.

In some embodiments, a motor can be used as a generator. A three-phase motor can act as a generator and push current back into the AC power line if it is driven with an external mechanical source. To use the motor as a stand-alone generator, it may be necessary to provide a weak current in the field coils to energize the magnetic field. For instance, a three series of resistors can be used to energize the coils. Three-phase motors of all sizes are readily available and known in the art.

In some embodiments, DC generators can be used, however a DC generator can be more limited in current output due to the carbon brushes connected to the commutator to the coils on the armature and this may not be able to handle the high current surge as well. In addition, the current will need to be switched with an IGBT or similar control module.

In some embodiments, single-phase generators can be used.

In some embodiments, 400 Hz generators can be used. Aircraft, some ships and the military uses 400 Hz generators, which are physically much smaller for the same amount of power output. However, 400 Hz generators will have less rotational inertial and may increase the need for a flywheel.

Uses of FG

While the laser induction process yields a defective laser-induced graphene [Lin 2014], the CVD is able to synthesize large domain single-crystal graphene [Yan 2012]. The FJH will bridge the time formation gap between two graphene synthesis protocols: laser-induction and chemical vaporization deposition (CVD).

Figure 19:
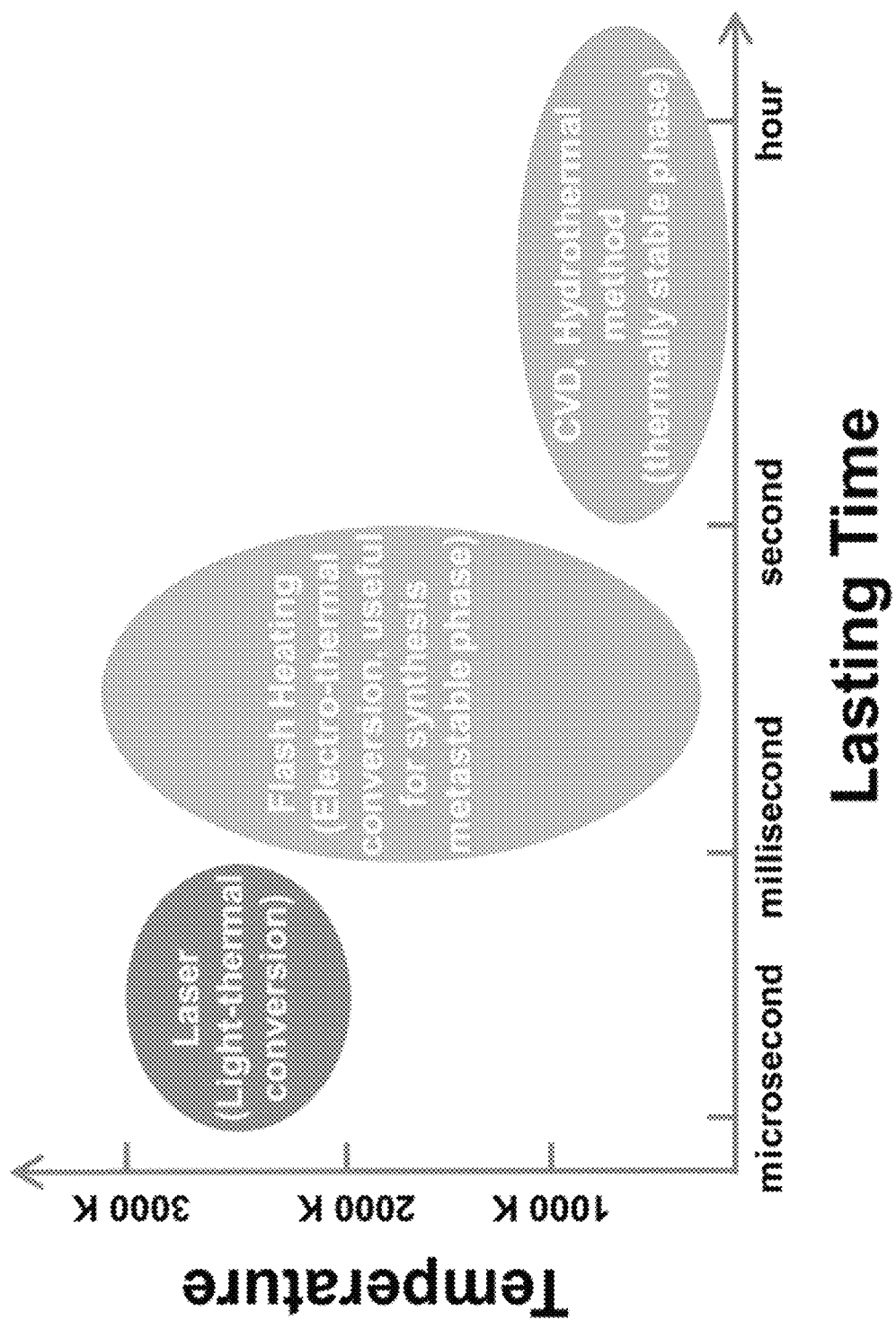
FIG. 19 is a graph showing time-temperature of various graphene synthesis processes.

FIG. 19 is a graph showing time-temperature of various graphene synthesis processes. As shown in FIG. 19, the laser induction process always happens within milliseconds by utilizing light-thermal conversion, which is promising to yield defective laser-induced materials. The CVD and hydrothermal method allow the slow atomic rearrangement and gradual growth of thermodynamically stable materials. However in flash heating method, a wider temperature range can be achieved within seconds. This limited lasting time makes it possible to synthesize the metastable forms of materials, which are very hard to directly synthesize by CVD or hydrothermal methods, and here without any additional reagents.

Advantages and improvements include that, for the first time, graphene with high quality can be synthesized in large scale with a very low-cost solvent free and scalable process. Moreover, the process also shows the synthesis of graphene from carbon sources without a catalyst. Still further, by studying the FJH process, graphene time-temperature phase transition from defective into order graphene can be mapped.

In some embodiments, inhomogeneous heating can cause different graphene quality in one batch. This can be addressed and overcome by using large but thin samples. Also by multiple pulses, such as 3-5 pulses in succession, can increase the graphene quality.

The present invention can be commercialized by the pellet feeding process that flash heat the low-cost starting material into high quality graphene and the material is forced out by the electrode-piston, and then re-fed to do the process again. Much larger capacitor banks can be used to increase the speed of the process since their charging time can be reduced. One can add heteroatoms, such as nitrogen in the form of melamine or melamine formaldehyde resin to afford nitrogen-doped graphene, or phosphines to afford phosphorus doped graphene. One can add metal salts to afford metal nanoparticle doped graphene or single-metal atom doped graphene. The two process, such as nitrogen doping and metal atom doping often work in concert to afford more stable metal- or metal-atom-doped graphene. [Han 2018; Ye 2018; J. Zhang 2018; J. Zhang 2017; C. Zhang 2017].

Variations of the present invention include: improving the homogeneity of the product; utilizing high surface area carbon material with KOH activation; utilizing other carbon sources; and increasing the yield through multiple flashes. A "carbon source" is a source that contains at least 10% carbon content by weight. Preferably, a carbon source has at least 80% carbon by weight. Further, rather than using DC (direct current) systems for the flash, AC (alternating current) electrical systems have also been made and they work equally well.

Dispersions

FG was dispersed in water/Pluronic (F-127) solution (1%) at concentrations from 1 to 10 g·L$^{-1}$. This dispersion is readily accomplished due to the turbostratic nature of the FG, wherein the layers are not as strongly coupled to each other by van der Waals interactions as are seen in AB-stacked graphene, and particularly the AB-stacked graphene or graphite nanoplatelets obtained from graphite exfoliation methods. The mixture was sonicated in an ultrasonic bath for 40 min to obtain a dark dispersion. The dispersion was centrifuged using Beckman Coulter Allegra X-12 centrifuge at 1500 rpm for 30 min to remove aggregates. The supernatant was analyzed via UV-VIS (Shimadzu). The dispersions were diluted 500 times and the absorbance was recorded at 660 nm. An extinction coefficient of $\alpha_{660}$=6600 L·g$^{-1}$·m$^{-1}$ was used to calculate the concentration of graphene in solution. As shown in FIG. 13B, FG was found to be dispersible in water/surfactant (Pluronic F-127) to give highly concentrated dispersions reaching 4 g·L$^{-1}$. FIG. 13E is a photo of 4 g·L$^{-1}$ of CB-FG (of FIG. 13B) after centrifugation (vial 1309) vs. a commercial sample at 10 g·L$^{-1}$ after centrifugation (vial 1310). The commercial graphene would not disperse.

Figure 13C:
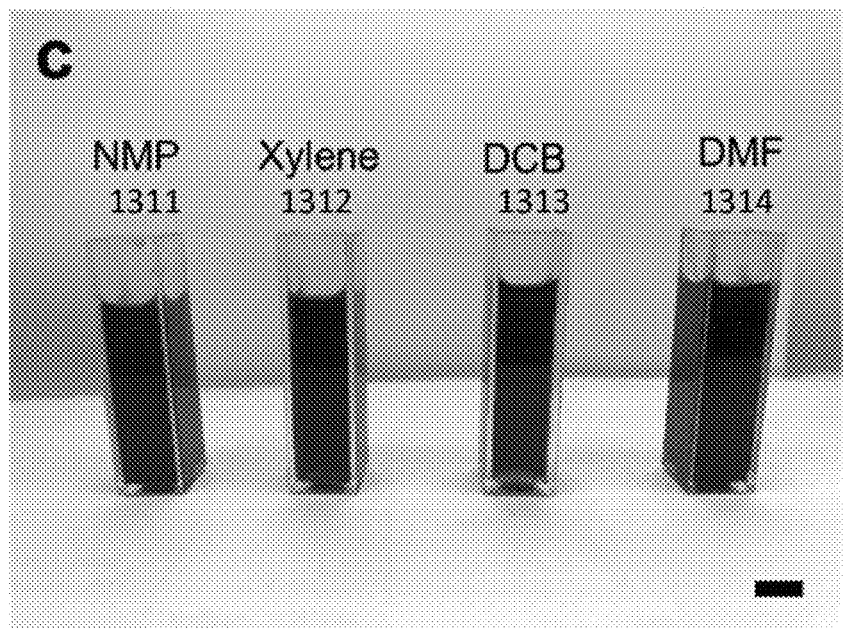

As shown in FIG. 13C, due to its turbostratic nature, FG demonstrates a high degree of dispersibility in a wide range of organic solvents (NMP 1311, Xylene 1312, DCB 1313, and DMF 1314). FG dispersions are 4× higher in concentration than the most concentrated graphene dispersions produced by conventional liquid phase exfoliation of graphite, and greater than 10 times higher concentrations than many reported values of what were likely graphene nanoplatelets.

FG Composites

Figure 13D:
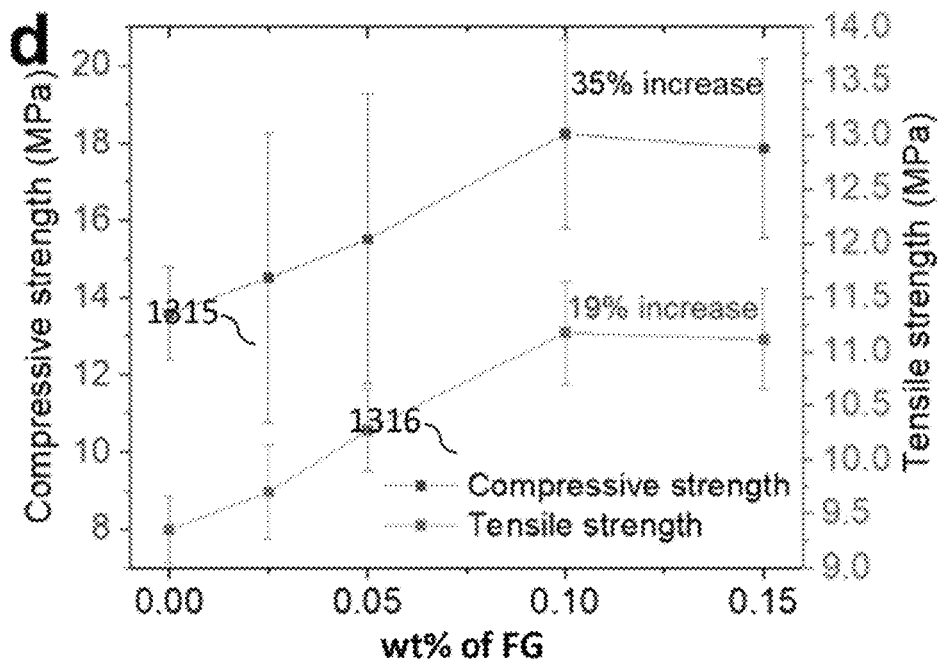

FG composites showed that small FG loadings significantly enhance the physical properties of composites, again suggesting that its turbostratic properties permit exfoliation far more easily than seen in other forms of stacked graphenes. The FG at various concentration was dispersed in 1% water-Pluronic (F-127) solution. The dispersion was agitated using a shear mixer (Silverson L5MA) for 15 min at 5000 rpm. The graphene suspension) in water was mixed with Portland cement with a water to cement ratio of 0.40. The slurry was casted in 5×5×5 cm$^3$ PTFE cube molds (for compressive strength) and in 2.5 cm×3.8 cm cylindered molds (for tensile strength). All cubes and cylinders were taken out the molds after 24 h and placed in water for curing for another 24 h. The compressive and tensile mechanical strength were measured after 7 days. As shown in FIG. 13D, CB-FG/cement composites with 0.1% FG have approximately 35% higher compressive strength (plot 1315) and 19% higher tensile strength (plot 1316) than the FG-free control sample. These enhanced values in the compressive and tensile strength are almost 3 times higher than the enhancement values reported for other graphene/cement composites with the same graphene loading.

Figure 20A:
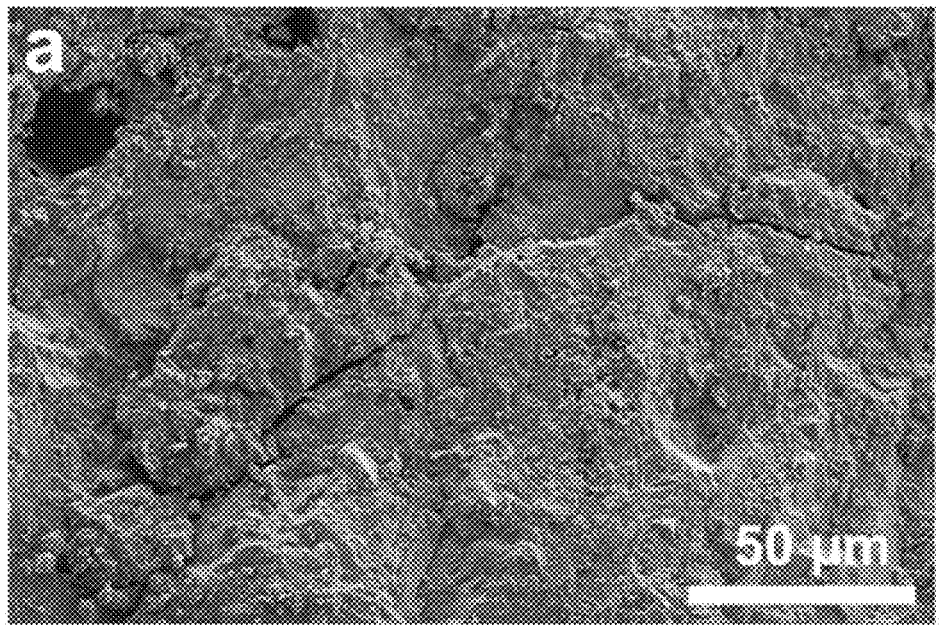
FIGS. 20A-20B are SEM images of cement and CB-FG composite.
Figure 20B:
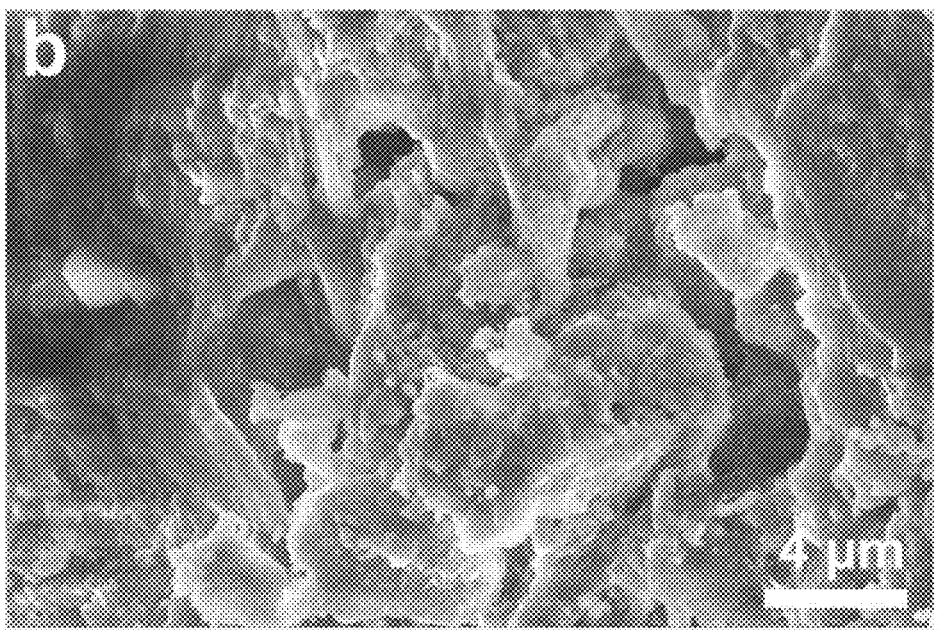

FIGS. 20A-20B are SEM images of CB-FG/cement composites, which show homogenous distribution of FG in the cement matrix. The large enhancement in the properties of CB-FG/cement composites is again believed to be caused by the high dispersibility of the turbostratic CB-FG, which results in homogenous and stable composites. The homogenously distributed sheet-like FG can act as templates to promote congruent growth of cement hydrate products.[29] [Moghaddam 2017]. Additionally, there is literature evidence that covalent C—O bonds/networks between graphene and cement hydrate products can change the hybridization of graphene from $sp^2$ to $sp^3$ upon covalent bond formation, greatly enhancing the mechanical properties of the composite. [Hosseini 2019]. This change, along with electron release in the vicinity of their interfacial region, [Hosseini 2019], can lead to homogenous, inter-mixed and intercalated composites with improved properties.

Figure 21:
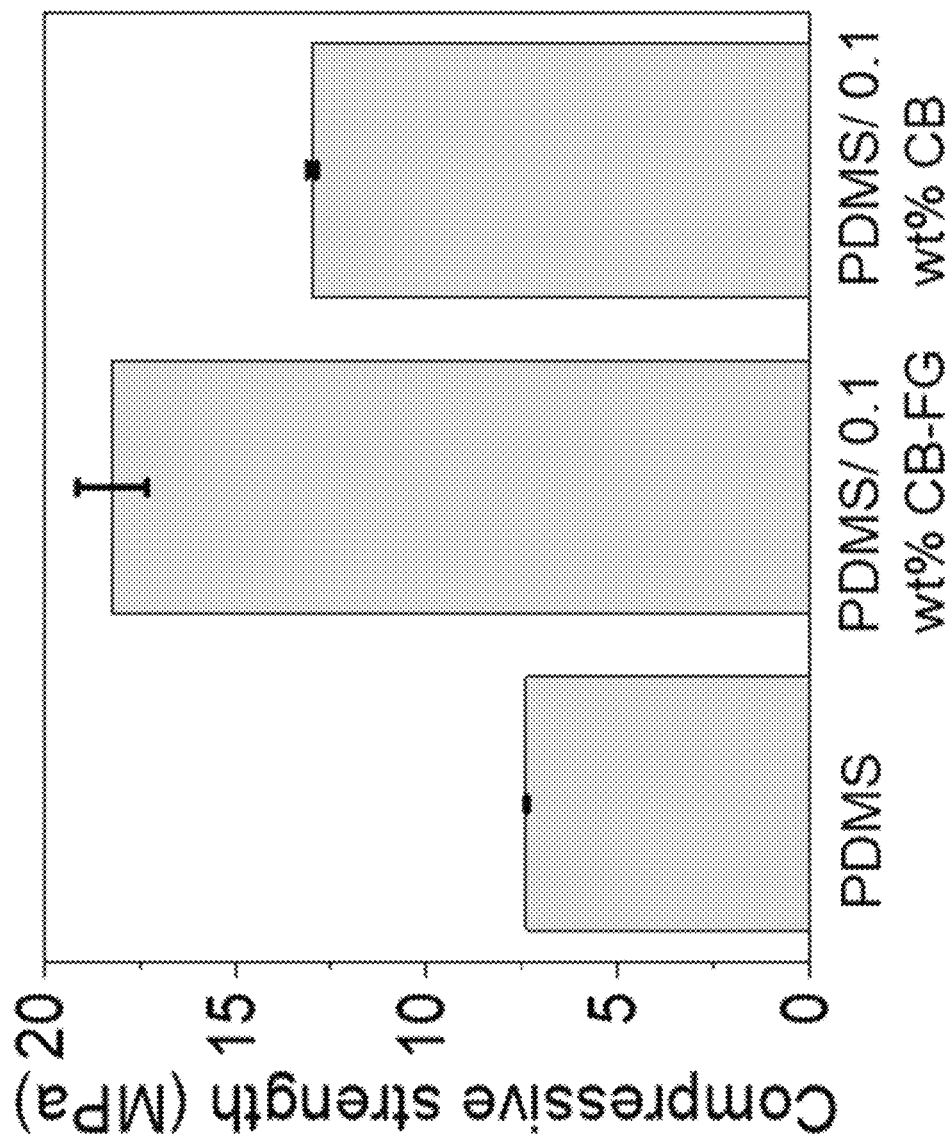
FIG. 21 is a graph showing compressive strength of PDMS, CB-FG/PDMS composite and CB/PDMS composite.

In addition, CB-FG is an effective enhancer of polymer properties; further suggesting the enhancement seen from the ease with which turbostratic graphene can exfoliate relative to other stacking arrangements, such as AB-stacking. As shown in FIG. 21, 0.1 wt % CB-FG/polydimethylsiloxane (PDMS) composite showed approximately 250% increase in compressive strength compared to the PDMS without graphene.

The C-FG and calcined coke-derived FG are also used as electrode materials in a Li-ion capacitor and a Li-ion battery.

Cells

The electrochemical performance of FG was tested in CR2032 cells. All the cells were assembled in a glove box under argon atmosphere. The CR2032 lithium-ion cell included lithium foil as the counter electrode, Celgard K2045 as the separator, 1 M lithium hexafluorphosphate (LiPF6) dissolved in 1:1:1 ethylene carbonate:dimethylcarbonate: diethylcarbonate (EC:DMC:DEC) (MTI corporation) as the electrolyte, and FG (C-FG and CC-FG) as cathode/anode. The cathode/anode were prepared by casting slurry which had 80 wt % active material, 10 wt % (Super P, TIMCAL) and 10 wt % polyvinylidene difluoride (PVDF; Alfa Aesar) in N-methyl-2-pyrrolidone (NMP) on a piece of Al/Cu foil. The galvanostatic discharge/charge tests were carried out in voltage range of 0.01 to 3.0 V (vs Li+/Li) for anode and 1.0 to 3.5 V (vs Li+/Li) for cathode, respectively. The full capacitor performance of flashed graphene in the Li-ion capacitor was tested in CR2032 cells. In order to assemble the FG Li-ion capacitor, the anode and cathode of the Li-ion battery half-cells were cycled several times with the anode rested at the discharge state and cathode rested at the charge state. The two cells were opened inside a glovebox, re-assembled as a FG Li-ion capacitor, and tested in the voltage range of 0.1 to 3.5 V. The capacity of Li-ion capacitor was calculated based on the total mass of the anode plus cathode that had come from the Li-ion battery.

Figure 22A:
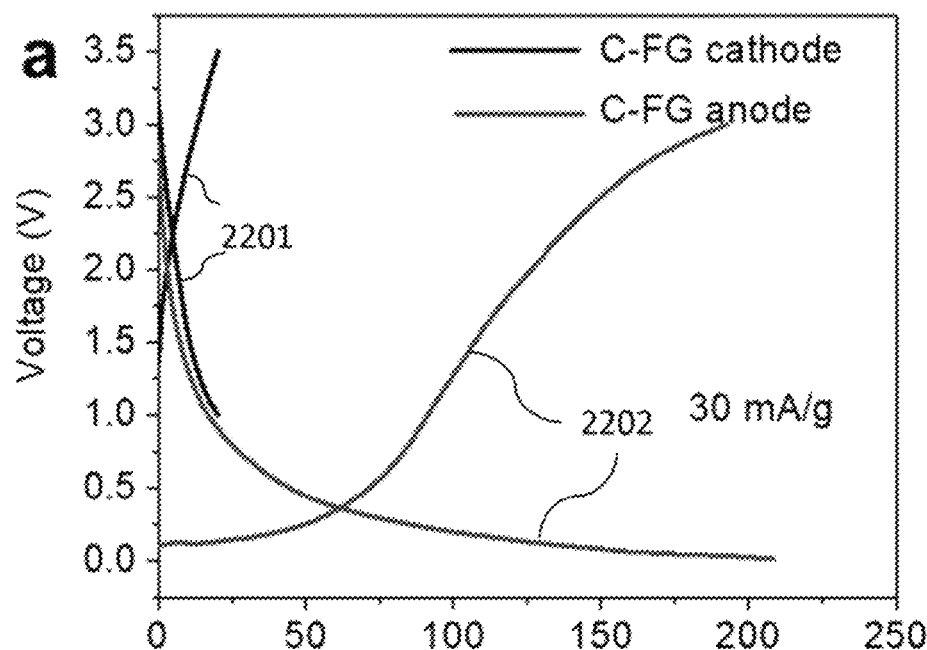
FIGS. 22A-22H are graphs showing FG in a Li-ion capacitor and a Li-ion battery. A Li-ion battery was made and cycled, then the battery was opened and the anode and cathode were used to make the Li-ion capacitor.
Figure 22B:
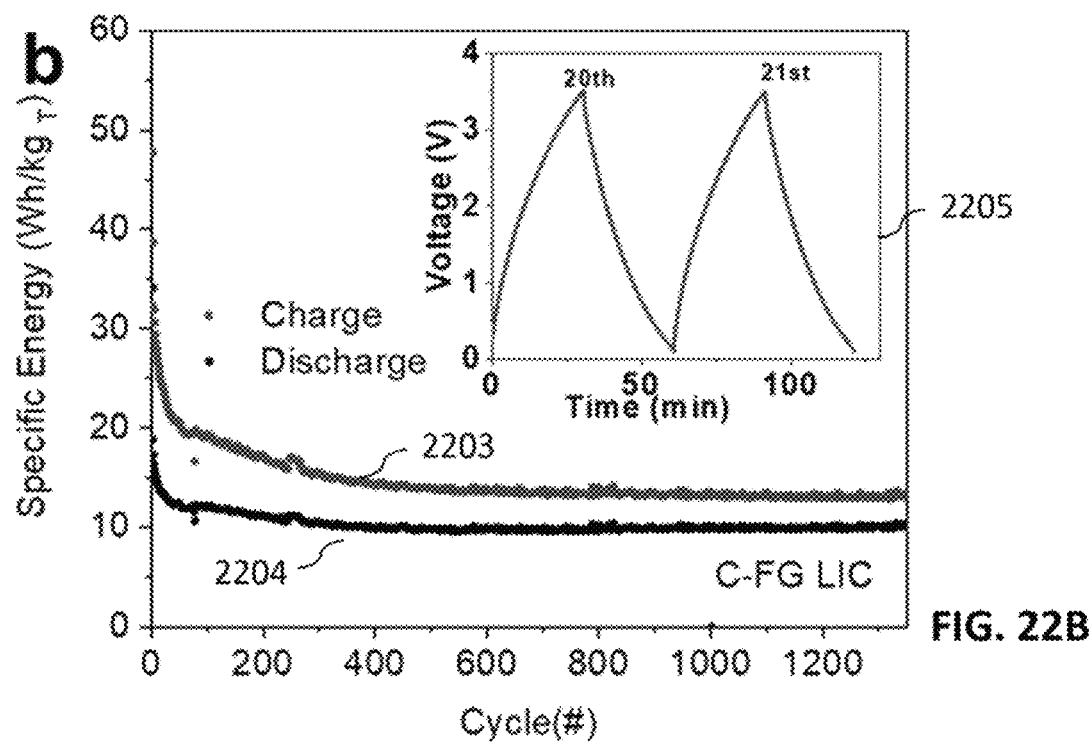
Figure 22C:
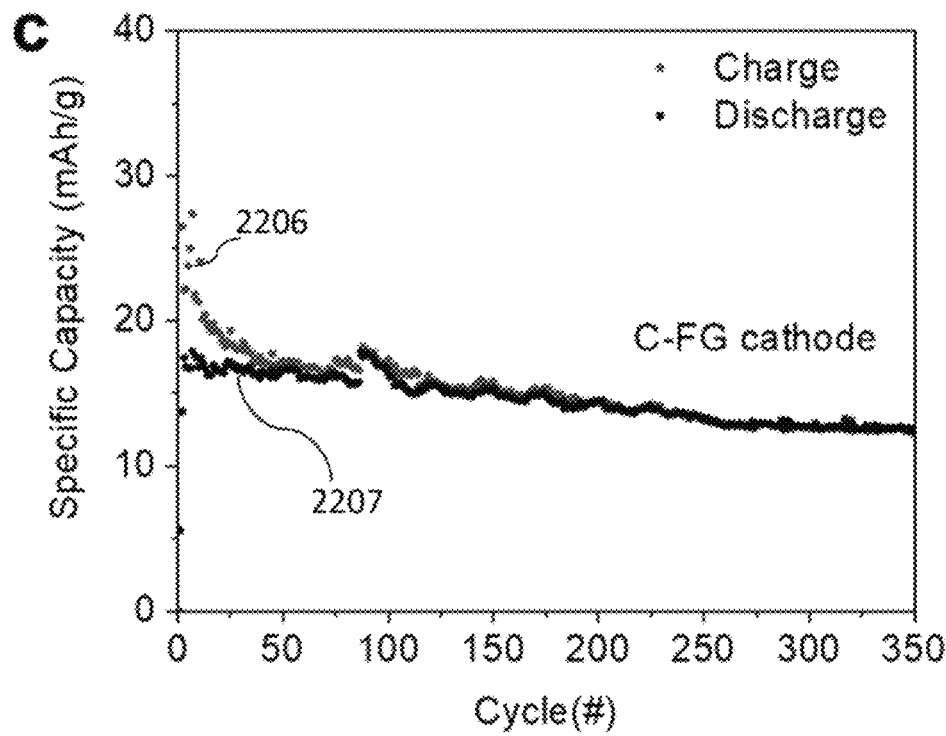
Figure 22D:
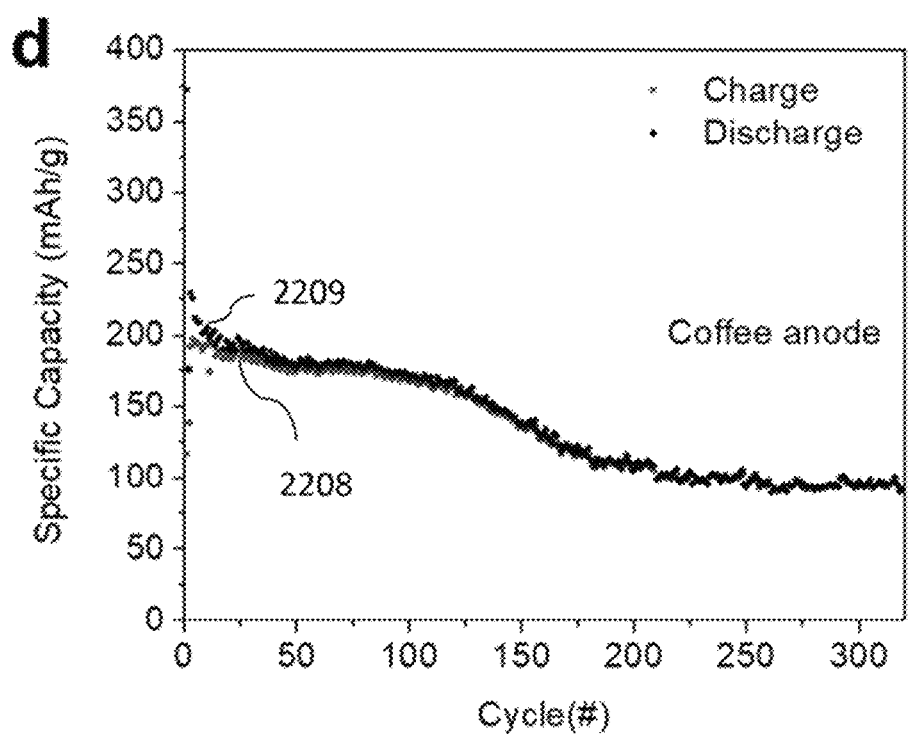

FIG. 22A-22H are graphs showing FG in a Li-ion capacitor and a Li-ion battery. A Li-ion battery was made and cycled, then the battery was opened and the anode and cathode were used to make the Li-ion capacitor. FIG. 22A shows charge/discharge curves of the Li-ion battery with C-FG anodes (0.01-3.0 V) (curve 2202) and cathodes (1-3.5 V) (curve 2201) in half-cells with Li foil as the counter and reference electrode. FIG. 22B shows long-range stability of C-FG Li-ion capacitor at 20 mA·g$^{-1}$. Plots 2203-2204 are for charge and discharge, respectively. Inset 2205 shows the change of voltage over time during the $20^{th}$ and $21^{st}$ cycles. FIG. 22C shows cycling performance of the Li-ion battery with the C-FG cathode half-cell at 30 mA·g$^{-1}$. Plots 2206-2207 are for charge and discharge, respectively. FIG. 22D shows cycling performance of the Li-ion battery with CC-FG as the anode half-cell at 50 mA·g$^{-1}$. Plots 2208-2209 are for charge and discharge, respectively.

Figure 22E:
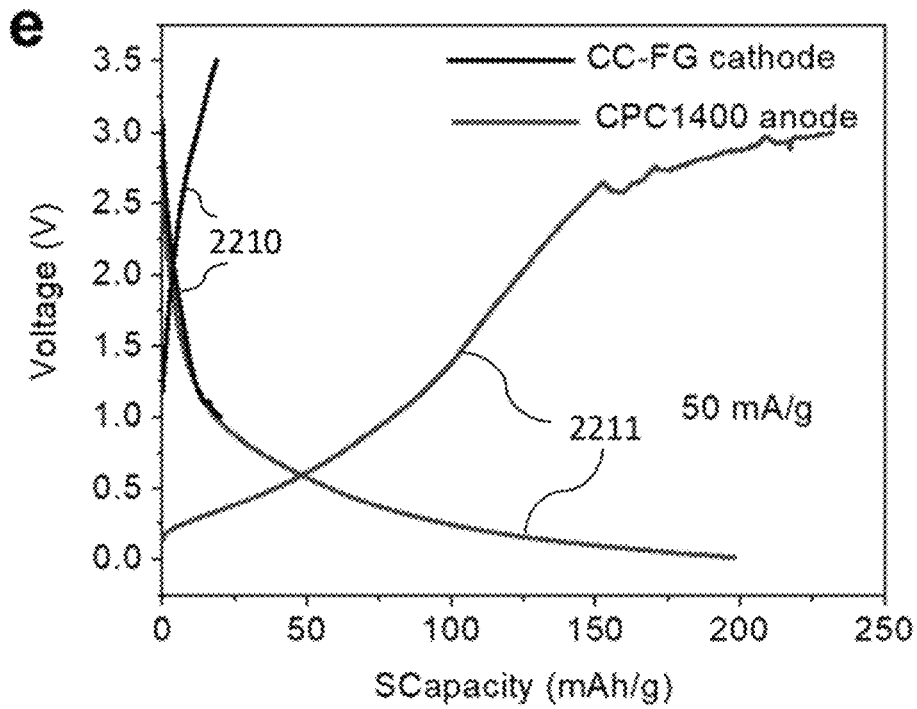
Figure 22F:
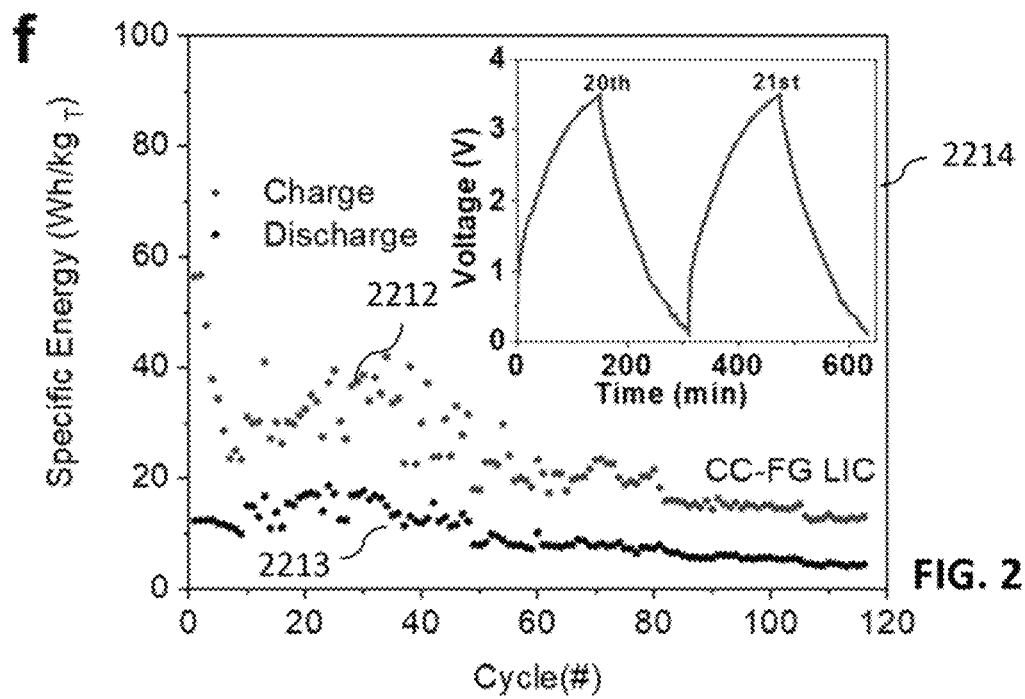
Figure 22G:
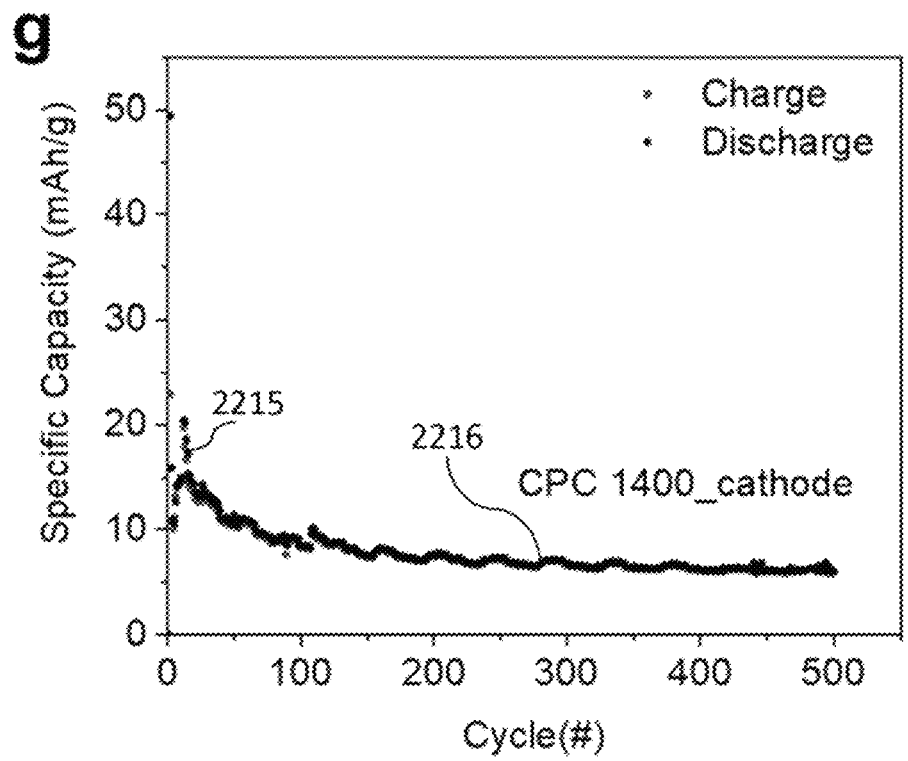
Figure 22H:
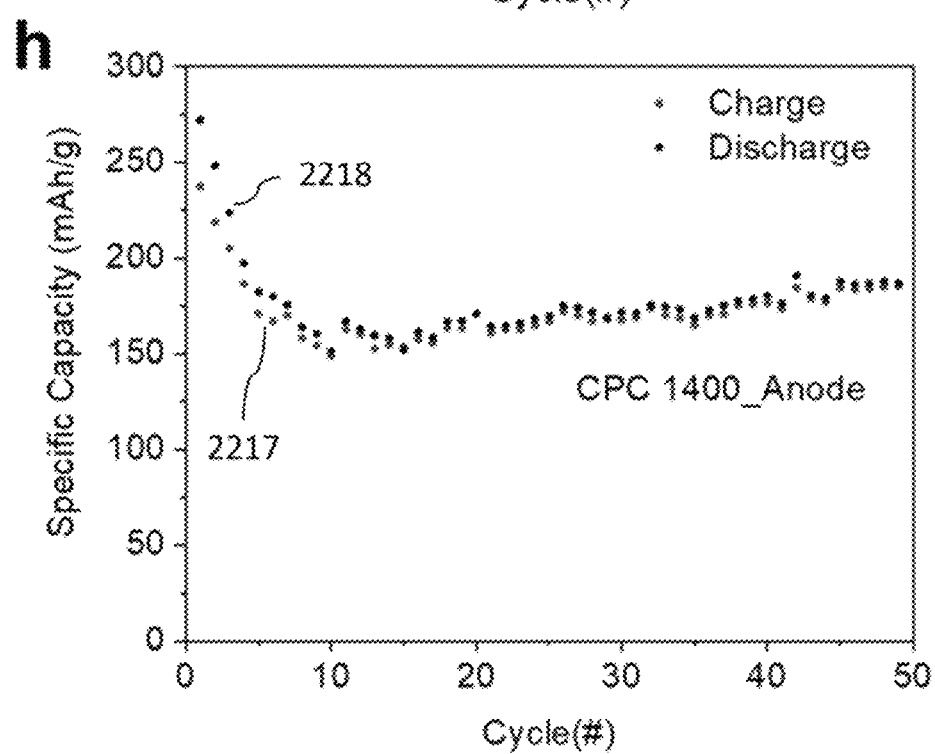

FIG. 22E shows charge/discharge curves of the Li-ion battery with calcined coke-FG (CC-FG) anode (0.01-3.0 V) (curve 2211) and cathode (1-3.5 V) (curve 2210) in half-cells with Li foil as the counter and reference electrode. FIG. 22F shows long-range stability of the CC-FG Li-ion capacitor at 5 mA·g$^{-1}$. Plots 2212-2213 are for charge and discharge, respectively. Inset 2214 shows the change of voltage over time during the $20^{th}$ and $21^{st}$ cycles. FIG. 22G shows cycling performance of the Li-ion battery with CC-FG as cathode at 25 mA·g$^{-1}$. Plots 2215-2216 are for charge and discharge, respectively. FIG. 22H shows cycling performance of the Li-ion battery with CC-FG as the anode half-cell at 100 mA·g$^{-1}$. Plots 2217-2218 are for charge and discharge, respectively.

The Li-ion battery from both FGs have gravimetric capacities of approximately 200 mAh·g$^{-1}$ while they show a cathode gravimetric capacities of approximately 15 mAh·g$^{-1}$ and approximately 10 mAh·g$^{-1}$ for C-FG and calcined coke-derived FG, respectively. Even though the Li-ion capacitor energy density was only approximately 10 Wh·kg$^{-1}$, the result shows the uses of FG, made from abundant and waste resources, in advanced energy applications.

Carbon Black-Rubber FG

A blend of 5% carbon black combined with shredded tires was converted into flash graphene using the protocols described above for conversion of waste plastic feedstocks. TABLE IV below reflects the FJH parameters.

TABLE IV

| Starting material | Init. Mass (g) | Init. Res. (Ω) | V Pre | New Res. (Ω) | V Flash | Dur (ms) | New Res. (Ω) | Fin. Mass (g) | Result material |
| --- | --- | --- | --- | --- | --- | --- | --- | --- | --- |
| 5% Carbon black-Rubber | 0.2 | 33.7 | 50, 70, 90, 100, 100 | 1.0 | 200 V | 500 | 380 | 0.108 | CB-Rubber FG |

Figure 23A:
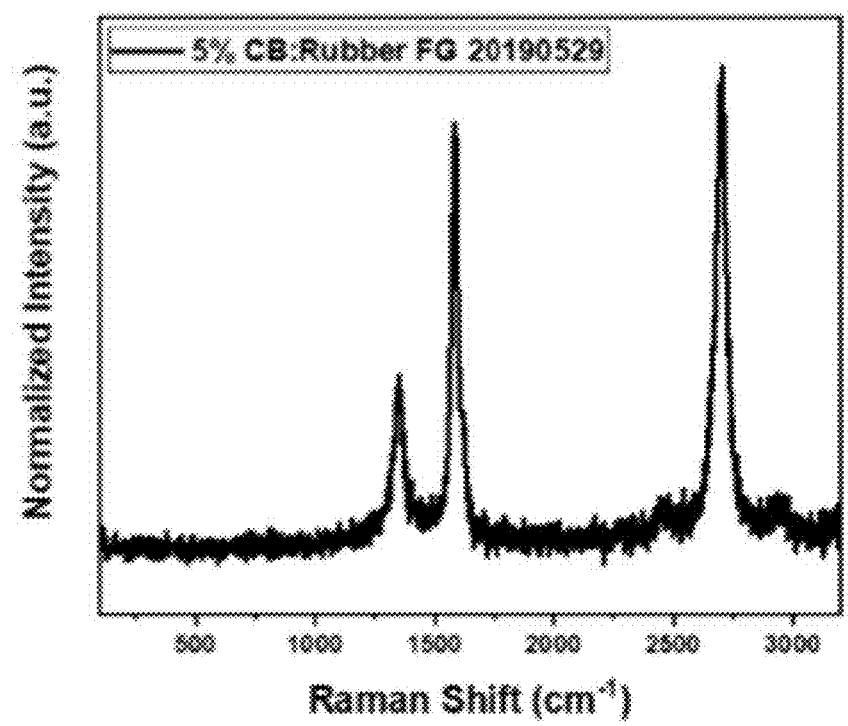
FIG. 23A is a Raman spectrum of CB-rubber FG.
Figure 23B:
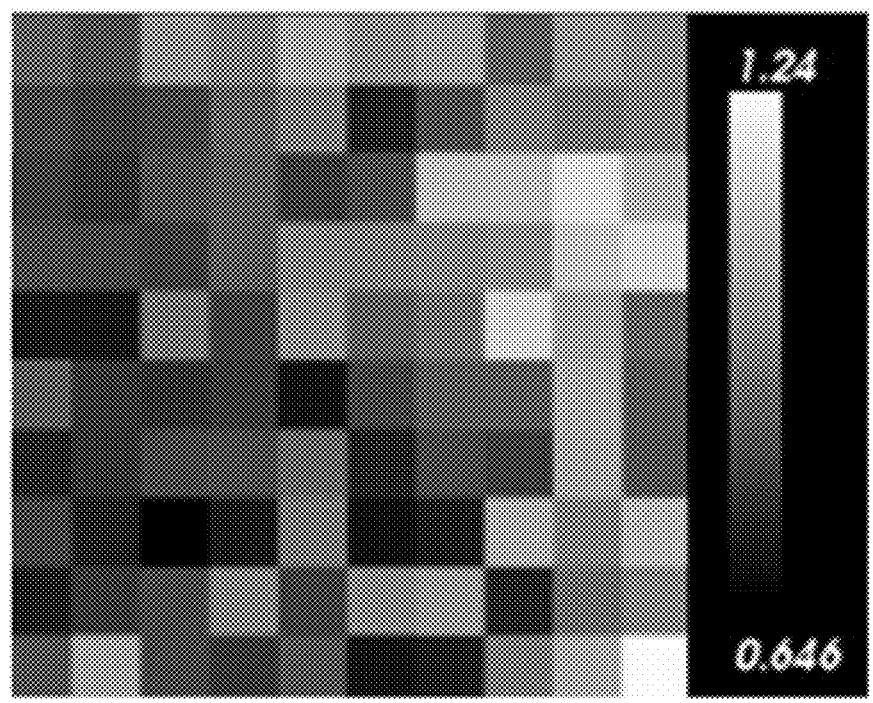
FIG. 23B is a Raman mapping of CB-rubber FG.

FIGS. 23A-23B are, respectively, the Raman spectrum and Raman mapping of the CB-rubber FG.

Figure 24A:
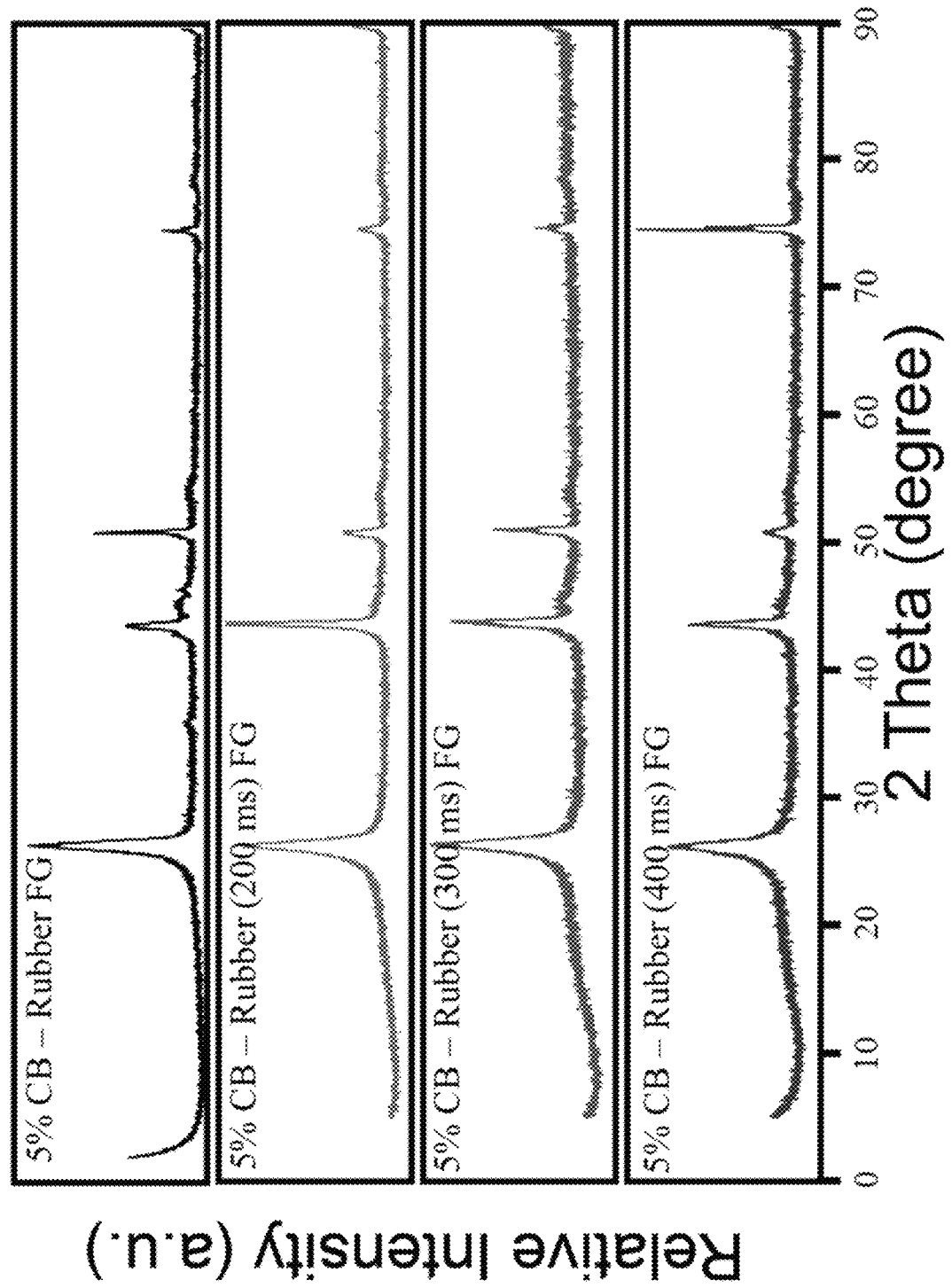
FIG. 24A is the 3 XRD of 5% CB-rubber FG, 5% CB-rubber (200 ms) FG, 5% CB-rubber (300 ms) FG, and 5% CB-rubber (400 ms) FG.
Figure 24B:
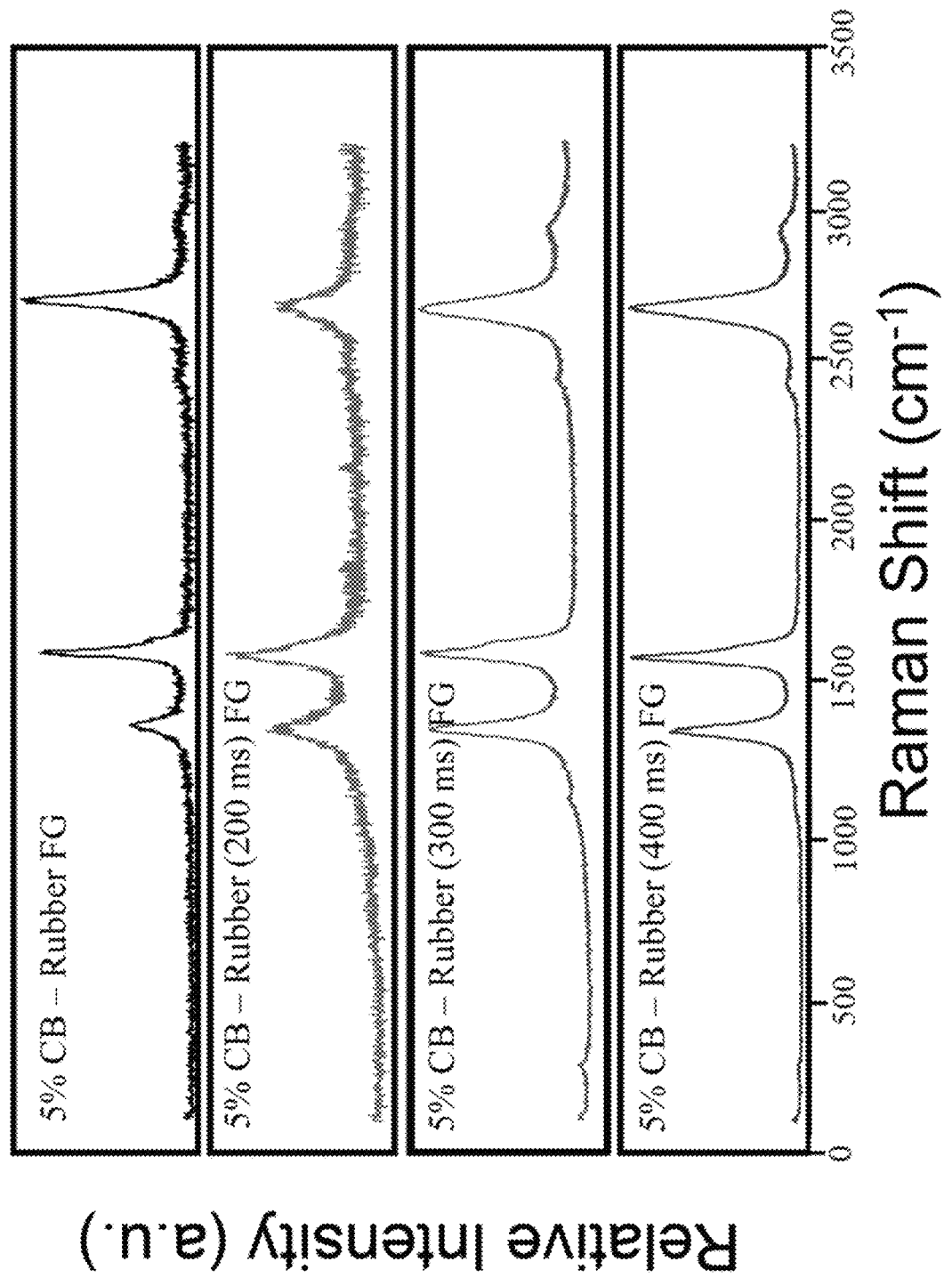
FIG. 24B is the Raman spectrum of 5% CB-rubber FG, 5% CB-rubber (200 ms) FG, 5% CB-rubber (300 ms) FG, and 5% CB-rubber (400 ms) FG.

FIGS. 24A-24B are, respectively, XRD and Raman spectrum of 5% CB-rubber FG, 5% CB-rubber (200 ms) FG, 5% CB-rubber (300 ms) FG, and 5% CB-rubber (400 ms) FG. The XRD shows the characteristic peaks of graphene, with some dimensional lines increasing in intensity.

2D Materials 2D materials, including non-graphene 2D materials, can be prepared by applying voltage pulse(s) (i.e., flash Joule heating) across respective precursors. This flash Joule heating achieves millisecond-scale synthesis of 2D materials (including some metastable phase materials), which is nearly impossible to do directly by CVD or hydrothermal method without any reagents' assistance. And the price of the FJH synthesis strategy is much cheaper and the range of 2D materials that can be manufactured is largely extended, which is also beneficial for many industrial applications. Based on the materials synthesized, there are multiple kinds of applications. For example, 1T'-MoS$_2$, has higher catalytic activity and better energy storing performance compared with 2H—MoS$_2$. [Yu 2018; Chang 2016; Acerce 2015]

For the preparation of 2D materials, if the precursor is conductive and the conductivity is more than 10$^{-6}$ S/cm, the voltage pulse(s) can be applied directly. If the precursor is not conductive and the conductivity is less than $10^{-7}$ S/cm, the precursor can be mixed with some carbon material or metal powder to increase the conductivity.

The pulse length is generally between 1 microsecond and 5 seconds, and more particularly between 10 milliseconds to 1,000 milliseconds. The pulse number is generally between 1 pulse and 100 pulses, and more particularly between 1 pulse and 10 pulses. The current is generally between 0.01 A/cm$^2$ and 10,000 A/cm$^2$, and more particularly between 0.1 A/cm$^2$ and 1,000 A/cm$^2$. The voltage is generally between 10 V and 4,000 V, and more particularly between 100 V and 400 V.

The conductive precursors can include iron powder, molybdenum powder, tungsten metal, copper metal and other metal sources. Nonmetal materials include carbon black, calcined petroleum coke, and other carbon materials. Nonconductive sources include molybdenum disulfide ($MoS_2$), ammonium tetrathiomolybdate ($(NH_4)_2MoS_4$), borane ammonia complex ($BH_3NH_3$), red phosphorous and other respective precursors. The nonconductive sources can be mixed with conductive sources specified above to reach the conductivity in the range specified above.

If the starting materials are molybdenum disulfide or ammonium tetrathiomolybdate, these can be converted to $MoS_2$ with different forms, such as, specifically, 1T'-$MoS_2$ and 2H-$MoS_2$. If the starting materials is borane ammonia complex, these can be converted to hexagonal boron nitride (h-BN). If the starting materials is red phosphorus, black phosphorus can be obtained.

A FJH system, such as shown in FIGS. 1A and 2A can be used to make the 2D materials. For the conductive precursors, they can directly be put in the quartz tube 101 for flash heating treatment. For the nonconductive precursors, these can first be mixed with conductive carbon materials or metal and grind them in the mortar. Then these can be treated the same as the conductive precursors. For some special precursors, such as red phosphorus, because of the existence of surface oxide, NaOH and distilled water are first used to wash these precursors and remove the oxide before processing.

The precursor samples, with both sides facing flattened copper wool 202, were compressed in the quartz tubes 101 and capacitors 210 discharged through the respective precursors. This increased the temperature to a broad range (from 800 K to 3000 K) depending on the flash Joule heater settings. The discharging was typically done in 10-1000 milliseconds. The temperature range and discharge time made it possible to synthesize many different kinds of 2D or other materials in a short time period. This process can be repeated 2-5 times as needed to increase the quality and quantity of the respective 2D materials. Discharging was carried out in a low vacuum chamber to avoid the impact of oxygen and other gases in the formation atmosphere.

By way of examples, utilizing this FJH process, (i) $(NH_4)_2MoS_4$ was converted to 2H-$MoS_2$ and 1T'-$MoS_2$, (ii) commercial 2H-$MoS_2$ was converted to 1T'-$MoS_2$, and (iii) $BH_3NH_3$ was converted to h-BN.

Figure 25A:
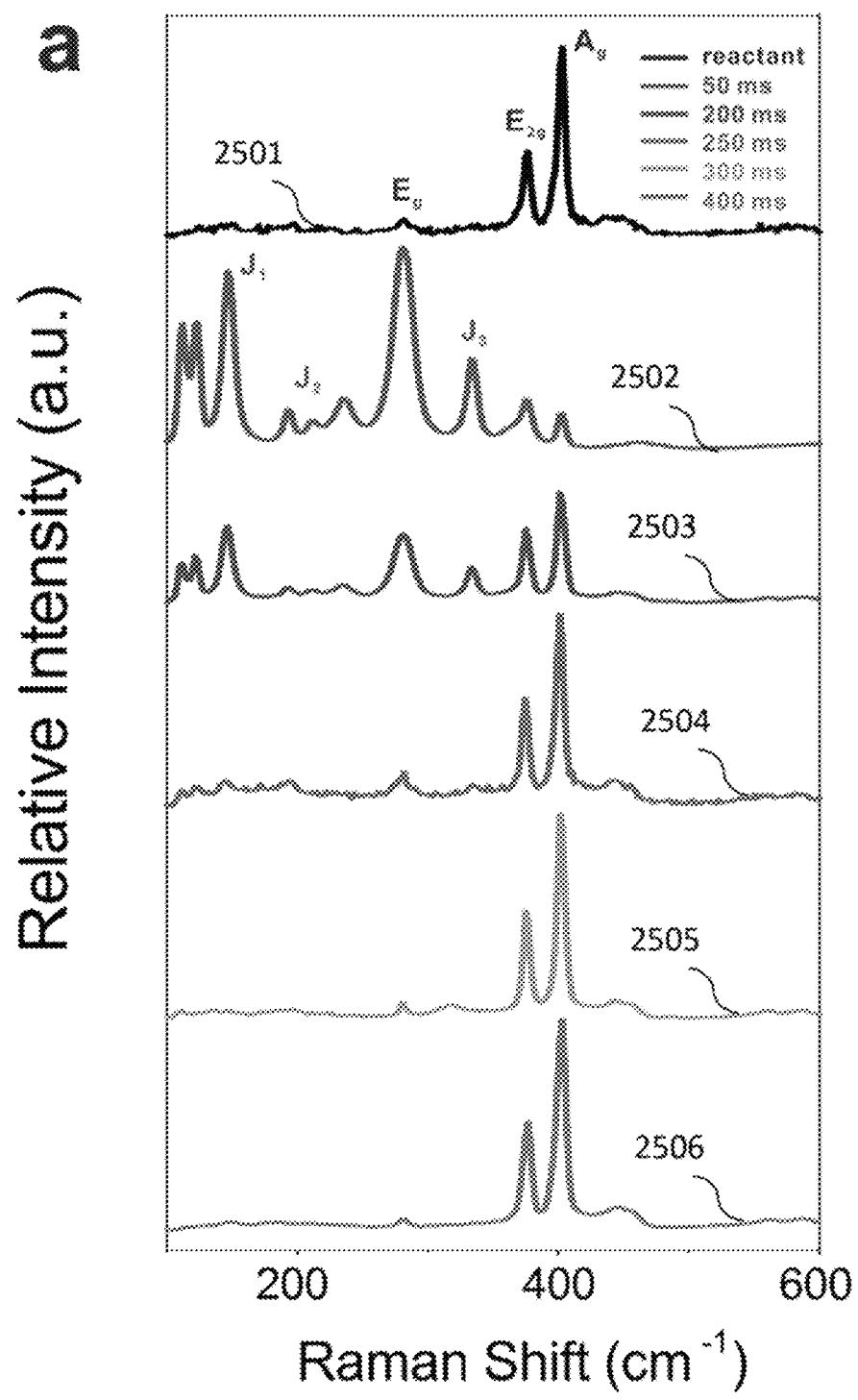
FIG. 25A is the Raman spectra of flash heating $MoS_2$ by using different flash times.
Figure 25B:
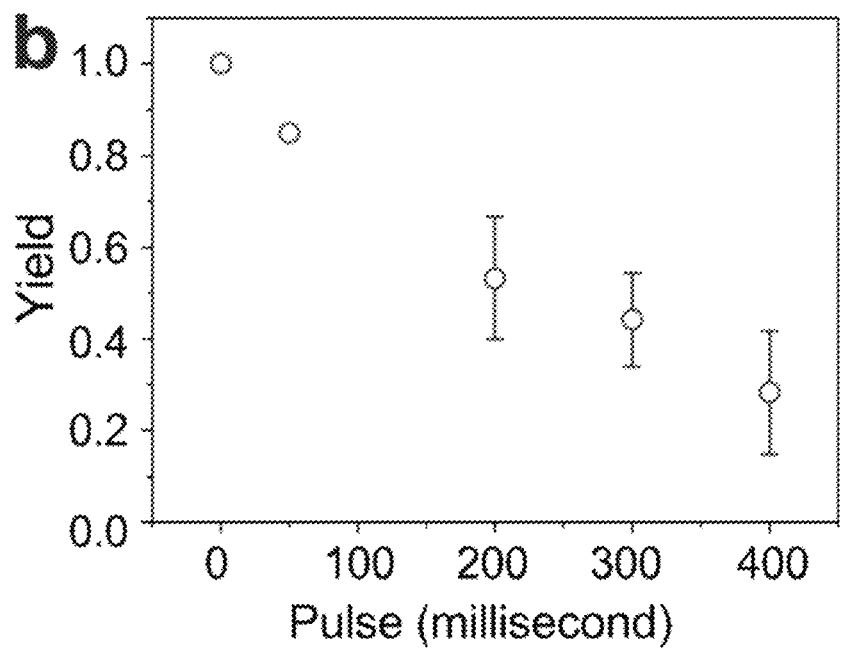
FIG. 25B is the yield of flash heating $MoS_2$ under different flash time.
Figure 25C:
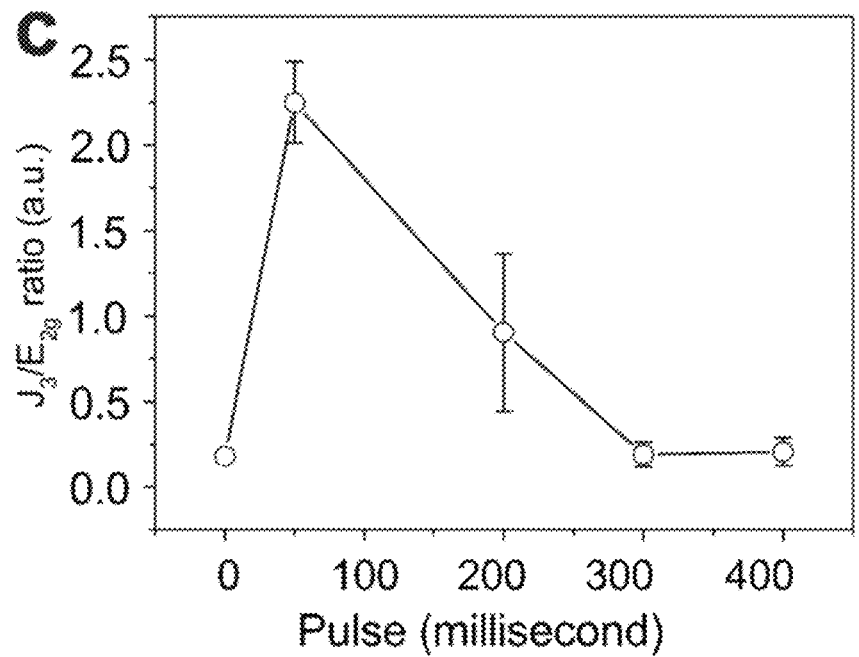
FIG. 25C is the $J_3$ to $E_{2g}$ peak intensity ratio under different flash time.

FIG. 25A is the Raman spectra of flash heating $MoS_2$ by using different flash times, with plots 2501-2506 corresponding to reactant and 50 ms, 200 ms, 250 ms, 300 ms, and 400 ms flash times, respectively. By Raman spectroscopy, the J series peaks, $J_1$ (156 cm$^{-1}$), $J_2$ (218 cm$^{-1}$) and $J_3$ (335 cm$^{-1}$) are characteristic peaks of 1T'-$MoS_2$ and the $E_{2g}$ peak (380 cm$^{-1}$) is the characteristic peak of 2H-$MoS_2$. [Yu 2018]. FIG. 25B is the yield of flash heating $MoS_2$ under different flash time. FIG. 25C is the $J_3$ to $E_{2g}$ peak intensity ratio under different flash time. It can be seen that a proper flash time is vital component to convert 2H-$MoS_2$ to 1T'-$MoS_2$. If too long a pulse time is used, then $MoS_2$ still keeps the thermodynamically stable phase (2H-$MoS_2$). And a good quality of metastable 1T'-$MoS_2$ phase could be obtained with a good yield by controlling the pulse time between 50 milliseconds and 250 milliseconds.

Figure 26:
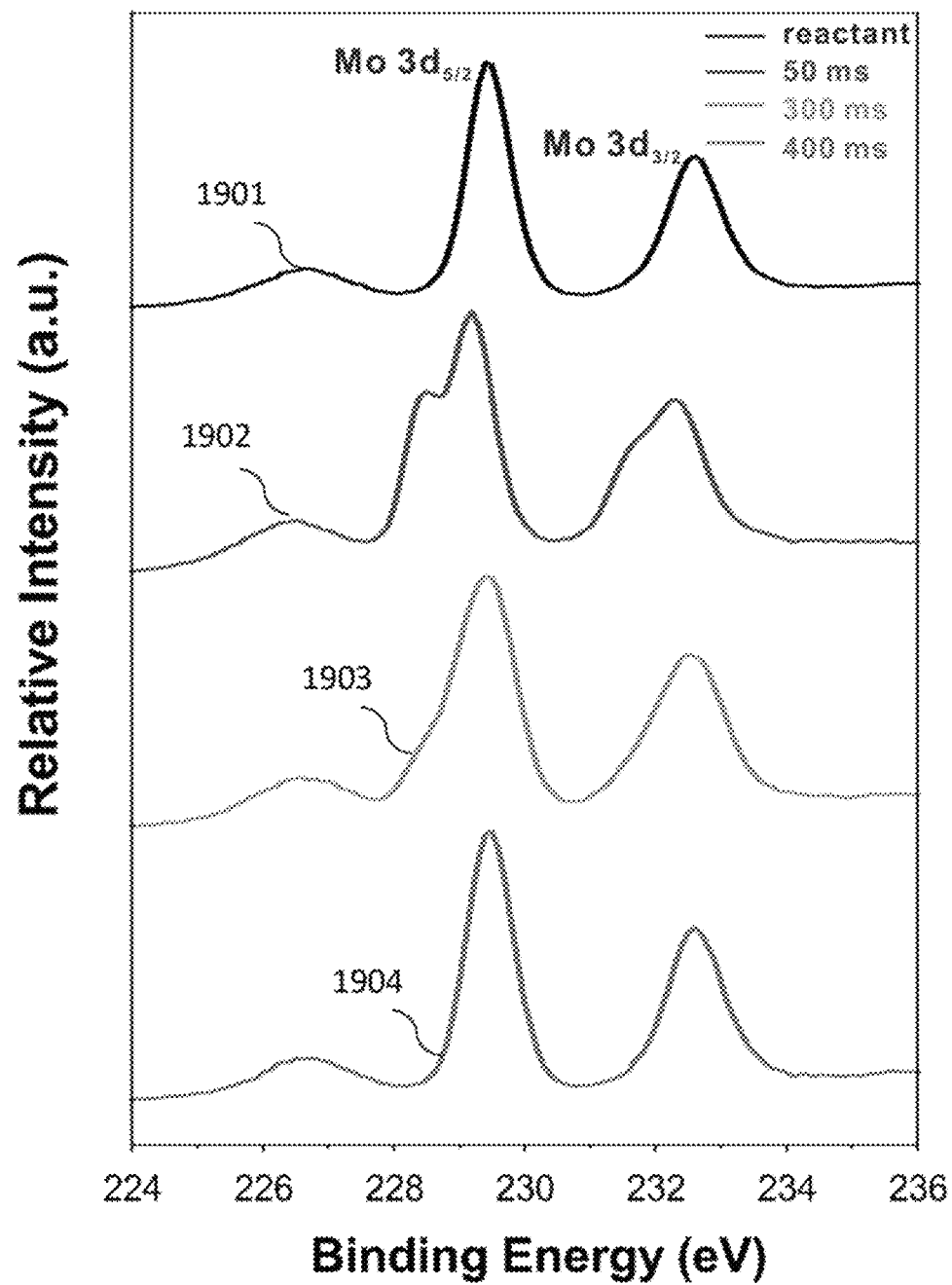
FIG. 26 is the XPS Mo 3d spectra of flash heating $MoS_2$ by using different flash time.

1T'-$MoS_2$ has lower binding energy 228.1 eV ($3d_{5/2}$) and 231.1 eV ($3d_{3/2}$) compared to the 2H-$MoS_2$ 229.6 eV ($3d_{5/2}$) and 232.1 eV ($3d_{3/2}$). [Yu 2018]. As shown by FIG. 26 (XPS Mo 3d spectra of flash heating $MoS_2$ by using different flash time with plots Q1901-Q1904 corresponding to reactant and 50 ms, 300 ms, and 400 ms flash times, respectively), a shift to lower binding energy was observed by using flash time between 50 millisecond and 300 millisecond, which means the existence of 1T'-$MoS_2$ phase in the sample and is consistent with the results in Raman spectra.

Figure 27:
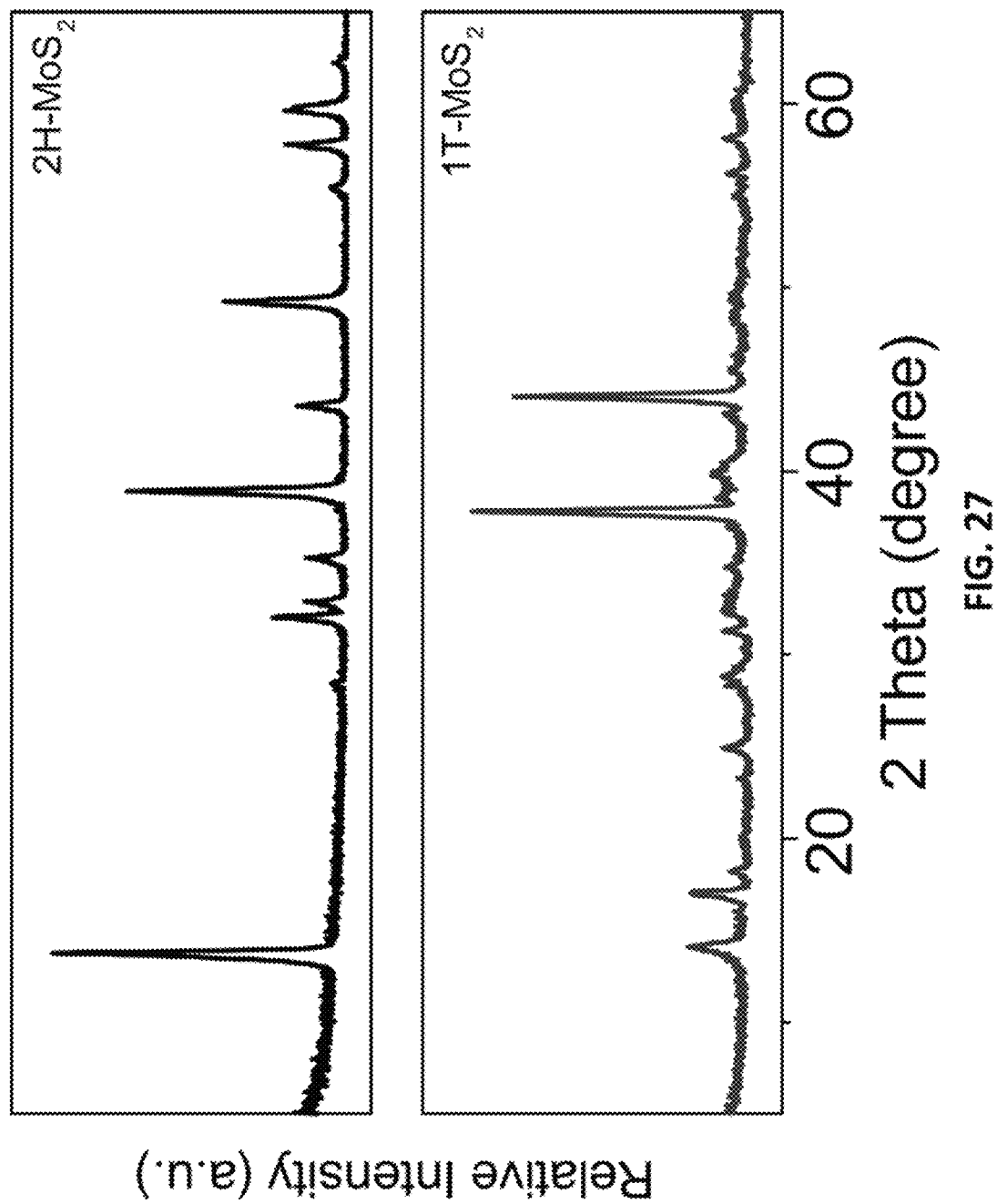
FIG. 27 is the XRD of 2H—$MoS_2$ and 1T'-$MoS_2$.
Figure 28B:
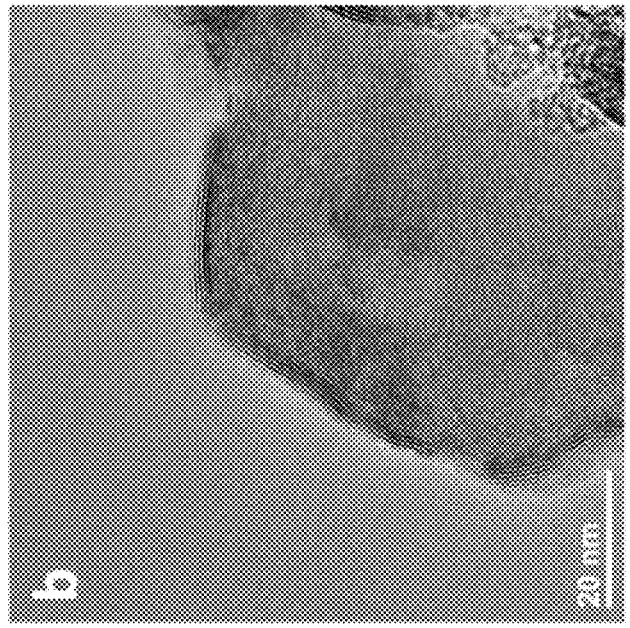
FIGS. 28A-28B are TEM images of flash heating $MoS_2$.
Figure 28A:
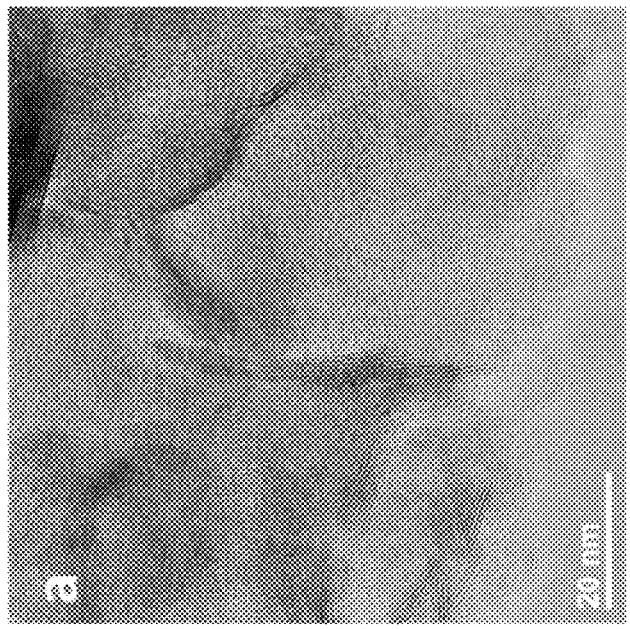

As shown in FIG. 27 (XRD of 2H-$MoS_2$ and 1T'-$MoS_2$), a comparison of the 1T'-$MoS_2$ with 2H-$MoS_2$ shows the (002) peak ~14° shifts to high angle, which is the same as shown in the literature. [Yu 2018]. Moreover, the intensity of (002) is much lower for our 1T'-$MoS_2$ sample, which means that a few-layer products were obtained and was consistent with the TEM images of FIGS. 28A-28B. From FIGS. 28A-28B, a clear pattern of the $MoS_2$ edge can be seen, and by checking the intensity profile data, the interlayer distance is about 0.62 nm which is 3% smaller than 2H-$MoS_2$, which is consistent with the XRD shown in FIG. 20. And most regions of the sample are composed of few layer $MoS_2$. Moreover, the edge angle is about 120°, which is very important for knowing the atom arrangement and the performance of samples in some applications, such as catalysts.

Figure 29:
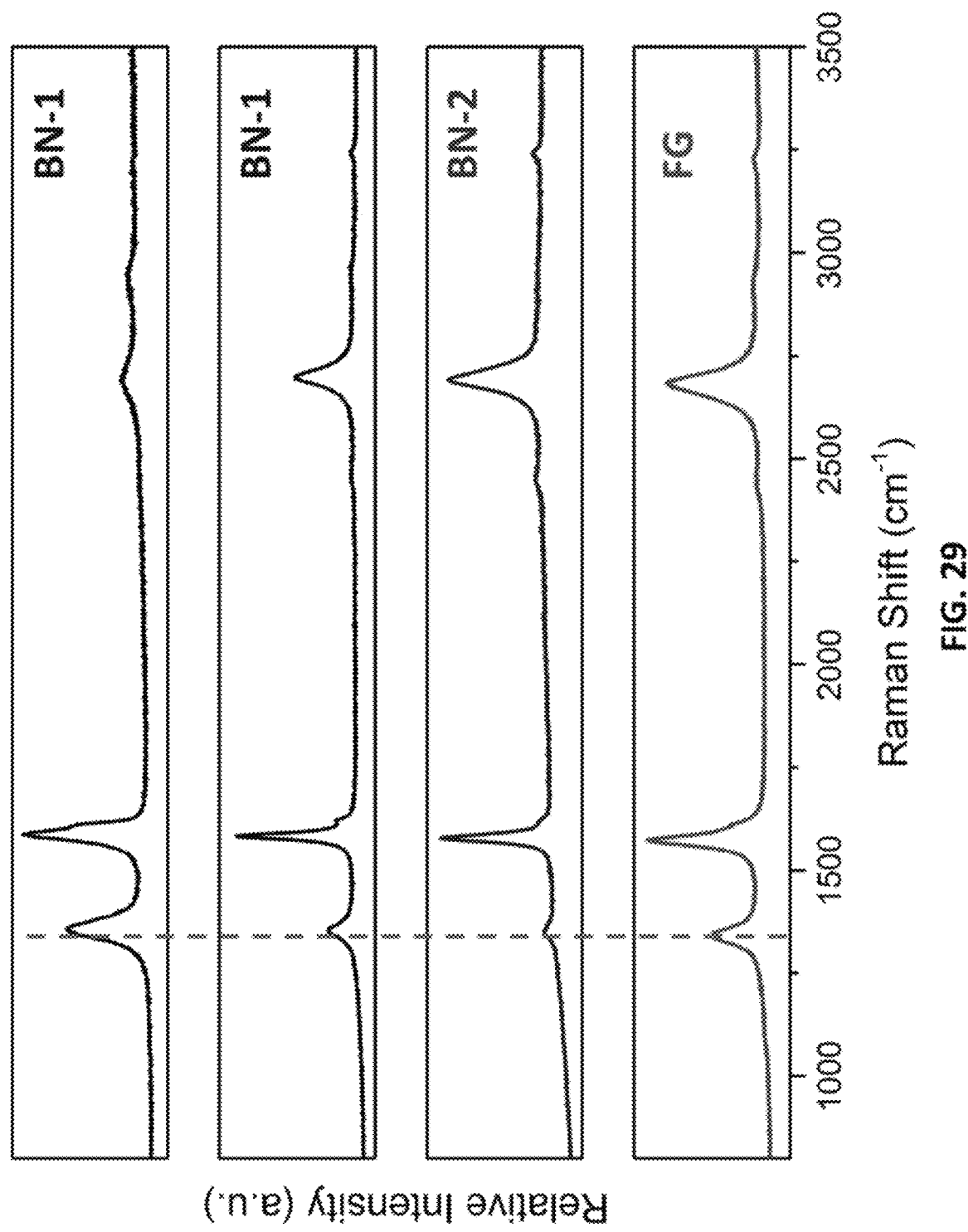
FIG. 29 are the Raman spectra of flash graphene (FG) and different boron nitride (BN) samples.

Boron nitride was also utilized in the flash heating method. To increase the conductivity of the precursor, some conductive carbon black was added. FIG. 29 are the Raman spectra of flash graphene (FG) and different boron nitride (BN) samples. After the flashing process, Raman spectra of the BN samples had some blue shift of ~10 cm$^{-1}$. This signified that it was a combination of flash graphene D peak (~1350 cm$^{-1}$) and the h-BN $E_{2g}$ peak (~1369 cm$^{-1}$). [Wang 2017].

Figures 30A, 30B:
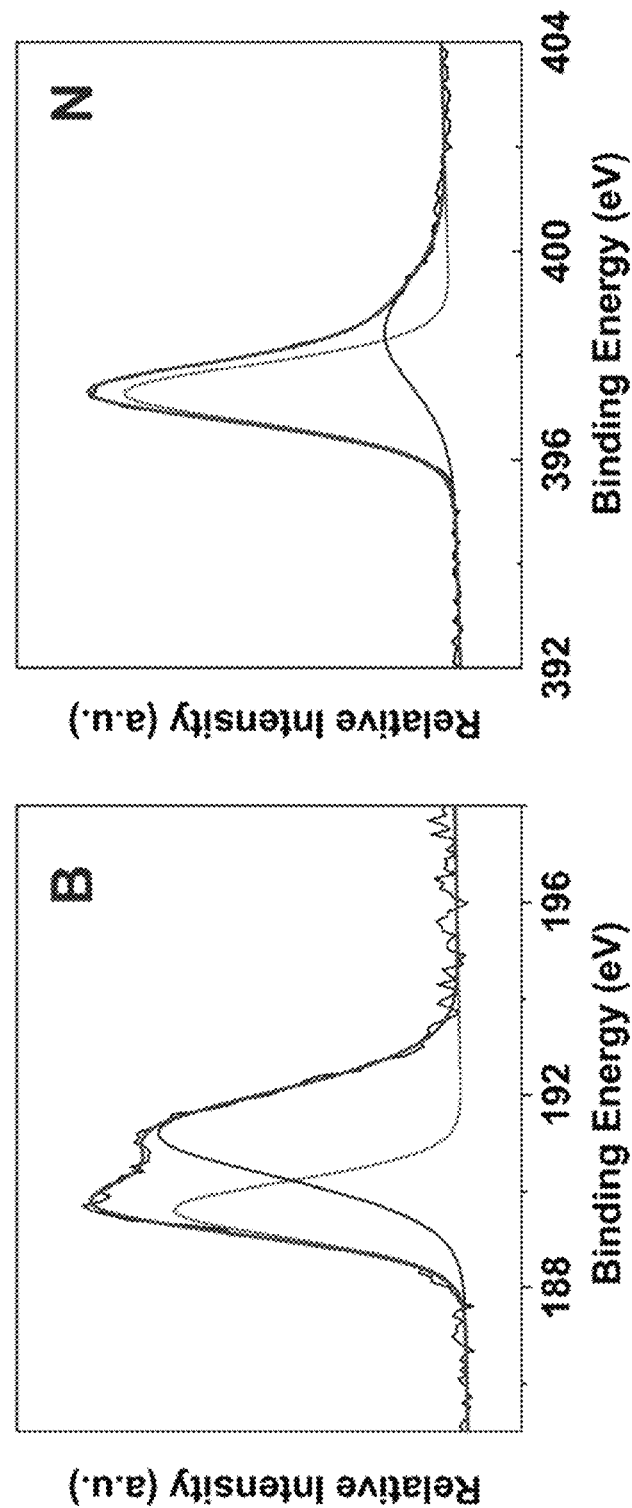
FIGS. 30A-30B are, respectively, the XPS B 1s and N 1s spectra of a boron nitride sample.

FIGS. 30A-30B are, respectively, the XPS B 1s and N 1s spectra of a boron nitride sample. TABLE V is the peak position survey of B 1s and N 1s.

TABLE V

| Peak | B | N |
|---|---|---|
| 1 | 190.9 eV(B—N) | 398.6 eV(N—B) |
| 2 | 192.5 eV(BC=O) | 400.3 eV(N—C) |

The splitting of the B 1s and N 1s spectra infers the new materials formation, and the Raman and XPS supports such formation of boron nitride by flash heating. [Wang 2017].

In summary, the present invention provides for a low-energy bottom-up synthesis of easily exfoliated graphene from ultralow-cost carbon sources, such as coal and petroleum coke, renewable resources such as biochar, and mixed waste products including plastic bottles and discarded food. This allows massive carbon fixation while providing reuse carbon for bulk construction composite materials that are enhanced by graphene.

REFERENCES

Acerce, M. et al., "Metallic 1T phase $MoS_2$ nanosheets as supercapacitor electrode materials," Nat. Nanotech., 2015, 10, 313-318 ("Acerce 2015").

Advincula, P. A. et al., "Accommodating volume change and imparting thermal conductivity by encapsulation of phase change materials in carbon nanoparticles," *J. Mater. Chem. A*, 2018, 6, 2461-2467 ("Advincula 2018").

Allen, M. J. et al., "Honeycomb carbon: a review of graphene," *Chem. Rev.*, 2009, 110, 132-145 ("Allen 2009").

Brenner, D. W et al., "A second-generation reactive empirical bond order (REBO) potential energy expression for hydrocarbons," *J. Phys.: Condens. Matter*, 2002, 14, 783 ("Brenner 2002").

Cai, M., Thorpe et al., "Methods of graphite exfoliation," *J. Mater. Chem.*, 2012, 22, 24992-25002 ("Cai 2012").

Chang, K. et al., "Targeted Synthesis of 2H- and 1T-Phase $MoS_2$ Monolayers for Catalytic Hydrogen Evolution," *Adv. Mater.*, 2016, 28, 10033-10041 ("Chang 2016").

Eda, G., et al., "Large-area ultrathin films of reduced graphene oxide as a transparent and flexible electronic material," *Nat. Nano.*, 2008, 3, 270 ("Eda 2008").

Ferrari, A. C. et al., "Raman spectroscopy as a versatile tool for studying the properties of graphene," *Nat. Nano.*, 2013, 8, 235 ("Ferrari 2013").

Ferrari, A. C., "Raman spectroscopy of graphene and graphite: Disorder, electron-phonon coupling, doping and nonadiabatic effects," *Solid State Commun.*, 2007, 143, 47-57 ("Ferrari 2007").

Ferrari, A. C. et al., "Raman spectrum of graphene and graphene layers," *Phys. Rev. Lett.*, 2006, 97, 187401 ("Ferrari 2006").

Garlow, J. A. et al., "Large-area growth of turbostratic graphene on Ni (111) via physical vapor deposition," *Scientific reports*, 2016, 6, 19804 ("Garlow 2016").

Gustavsson, J. et al., "*Global food losses and food waste*," FAO Rome, 2011 ("Gustavsson 2011").

Han, X. et al., "Laser-Induced Graphene from Wood Impregnated with Metal Salts and Use in Electrocatalysis," *ACS Appl. Nano Mater.* 2018, 9, 5053-5061 ("Han 2018").

Hao, Y. et al., "Probing Layer Number and Stacking Order of Few-Layer Graphene by Raman Spectroscopy," *Small*, 1990, 6(2), 195-200 ("Hao 1990").

Harris, P. J. F., "Engineering carbon materials with electricity," *Carbon*, 2017, 122, 504-513 ("Harris 2017").

Hernandez, Y. et al., "High-yield production of graphene by liquid-phase exfoliation of graphite," *Nat. Nano.*, 2008, 3, 563 ("Hernandez 2008").

Hosseini, E., et al., "Multifunctional ceramic composites via intercalation of fused graphene-boron nitride nanosheets," *ACS App. Mater. Interf,* 2019, 11, 8635-8644 ("Hosseini 2019")

Jambeck, J. R. et al., "Plastic waste inputs from land into the ocean," *Science,* 2015, 347, 768-771 ("Jambeck 2015").

Kato, H. et al., "Growth and Raman spectroscopy of thickness-controlled rotationally faulted multilayer graphene," *Carbon*, 2019, 141, 76-82 ("Kato 2019").

Kim, K. et al., "Raman spectroscopy study of rotated double-layer graphene: misorientation-angle dependence of electronic structure," *Phys. Rev. Lett.*, 2012, 108, 246103 ("Kim 2012").

Kiselov, V. et al., "The growth of weakly coupled graphene sheets from silicon carbide powder," *Semiconductor physics quantum electronics & optoelectronics*, 2014, 301-307 ("Kiselov 2014").

Kudin, K. N. et al., "Raman spectra of graphite oxide and functionalized graphene sheets," *Nano Lett.*, 2008, 8, 36-41 ("Kudin 2008").

Kumar, N. et al., "High-temperature phase transformation and low friction behaviour in highly disordered turbostratic graphite," *J. Phys. D: Appl. Phys.*, 2013, 46, 395305 ("Kumar 2013").

Li, D. et al., "Processable aqueous dispersions of graphene nanosheets," *Nat. Nano.*, 2008, 3, 101 ("Li 2008").

Li, Z. Q. et al., "X-ray diffraction patterns of graphite and turbostratic carbon," *Carbon*, 2007, 45, 1686-1695 ("Li 2007").

Lin, J. et al., "Laser-Induced Porous Graphene Films from Commercial Polymers," *Nature Comm.* 2014, 5:5714 ("Lin 2014").

Luong, D. X. et al., "Laser-induced graphene fibers," *Carbon*, 2018, 126, 472-479 ("Luong 2018").

Malard, L. M. et al., "Raman spectroscopy in graphene," *Phys. Rep.*, 2009, 473, 51-87 ("Malard 2009").

Moghaddam, H. E. et al., "Morphogenesis of cement hydrate," *J. Mater. Chem. A*, 2017, 5, 3798-3811 ("Moghaddam 2017").

Ni, Z. H. et al. "Probing Charged Impurities in Suspended Graphene Using Raman Spectroscopy," *ACS Nano*, 2009, 3, 569-574 ("Ni 2009").

Niilisk, A. et al., "Raman characterization of stacking in multi-layer graphene grown on Ni," *Carbon*, 2016, 98, 658-665 ("Niilisk 2016").

Novoselov, K. S. et al., "Two-dimensional gas of massless Dirac fermions in graphene," *Nature*, 2005, 438, 197 ("Novoselov 2005").

Novoselov, K. S. et al., "Electric Field Effect in Atomically Thin Carbon Films," *Science*, 2009, 306, 666-669 ("Novoselov 2004").

Parfitt, J., et al., "Food waste within food supply chains: quantification and potential for change to 2050," *Philos. Trans. R Soc. Lond. B Biol. Sci.*, 2010, 365, 3065-3081 ("Parfitt 2010").

Partoens, B. et al., "From graphene to graphite: Electronic structure around the $K$ point," *Physical Review B*, 2006, 74, 075404 ("Partoens 2006").

Plimpton, S., "Fast parallel algorithms for short-range molecular dynamics," *J. Comput. Phys.*, 1995, 117, 1-19 ("Plimpton 1995").

Stankovich, S. et al., "Synthesis of graphene-based nanosheets via chemical reduction of exfoliated graphite oxide," *Carbon*, 2007, 45, 1558-1565 ("Stankovich 2007").

Stuart, S. J., Tutein, A. B., Harrison, J. A. A reactive potential for hydrocarbons with intermolecular interactions," *J. Chem. Phys.*, 2000, 112, 6472-6486 ("Stuart 2000").

Wang, C. et al., "Hexagonal Boron Nitride-Graphene Core-Shell Arrays Formed by Self-Symmetrical Etching Growth," *J. Am. Chem. Soc.*, 2017, 139, 13997-14000 ("Wang 2017").

Yan, Z. et al., "Hexagonal graphene onion rings," *J. Am. Chem. Soc.* 2013, 135, 10755-10762 ("Yan 2013").

Yan, Z. et al., "Toward the Synthesis of Wafer-Scale Single-Crystal Graphene on Copper Foils," *ACS Nano* 2012, 6, 9110-9117 ("Yan 2012").

Yao, Y. et al., "Carbothermal shock synthesis of high-entropy-alloy nanoparticles," *Science* 359, 1489-1494 ("Yao 2018").

Ye, R. et al., "Laser-Induced Graphene," *Acc. Chem. Res.* 2018, 51, 1609-1620. ("Ye 2018").

Yi, M. et al., "A review on mechanical exfoliation for the scalable production of graphene," *J. Mater. Chem. A*, 2015, 3, 11700-11715 ("Yi 2015").

Yu, Y. et al., "High phase-purity 1T'-MoS$_2$- and 1T'-MoSe$_2$-layered crystals," *Nat. Chem.*, 2018, 10, 638-643 ("Yu 2018").

Zhang, C., et al. "Single-Atomic Ruthenium Catalytic Sites on Nitrogen-Doped Graphene for Oxygen Reduction Reaction in Acidic Medium," *ACS Nano* 2017, 11, 6930-6941 ("C. Zhang 2017").

Zhang, J. et al., "In Situ Synthesis of Efficient Water Oxidation Catalysts in Laser-Induced Graphene," *ACS Energy Lett.* 2018, 3, 677-683 ("J Zhang 2018").

Zhang, J. et al., "Efficient Water Splitting Electrodes Based on Laser-Induced Graphene," *ACS Appl. Mater. Interfaces* 2017, 9, 26840-26847 ("J. Zhang 2017").

U.S. Pat. No. 9,449,857, "Process for high yield production of graphene via detonation of carbon-containing material," issued Sep. 13, 2016, to Sorensen et al. ("Sorensen '857 Patent").

U.S. Patent Appl. Publ. No. 20170062821, published Mar. 2, 2017, to Tour et al. ("Tour '821 Patent Application").

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

Amounts and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described. The symbol "~" is the same as "approximately".

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" and "substantially" when referring to a value or to an amount of mass, weight, time, volume, concentration or percentage is meant to encompass variations of in some embodiments±20%, in some embodiments±10%, in some embodiments ±5%, in some embodiments±1%, in some embodiments±0.5%, and in some embodiments ±0.1% from the specified amount, as such variations are appropriate to perform the disclosed method.

As used herein, the term "substantially perpendicular" and "substantially parallel" is meant to encompass variations of in some embodiments within ±10° of the perpendicular and parallel directions, respectively, in some embodiments within +5° of the perpendicular and parallel directions, respectively, in some embodiments within ±1 of the perpendicular and parallel directions, respectively, and in some embodiments within ±0.5° of the perpendicular and parallel directions, respectively.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

What is claimed is:

1. A process for synthesizing graphene, the process comprising:
   (a) applying a voltage pulse across a conductive carbon source that comprises a carbon source material that is not graphene, wherein a current is conducted across the conductive carbon source by the application of the voltage pulse; and
   (b) heating the conductive carbon source via the current to convert the carbon source material into graphene, wherein
      (i) the conductive carbon source comprises a conductive carbon source additive that renders the conductive carbon source to have a conductivity greater than $10^{-5}$ S/cm,
      (ii) the conductive carbon source additive is selected from a group consisting of anthracite coal, calcined petroleum coke, carbon nanotubes, [graphene quantum dots,] acetylene black, carbon black, shungite, [graphene] or mixtures thereof,
      (iii) the carbon source material is a lower conductivity carbon material selected from a group consisting of feces, [plastics, vinyl polymers, condensation polymers, step-growth polymers, chain-growth polymers, living polymers, rubbers,] humic acid, carbohydrates, rice powder, food waste, food, [coal,] organic waste, [organic material, bituminous coal,] coke, petroleum coke, oil, petroleum products, carbon from the stripping of the non-carbon atoms off of natural gas or oil or carbon dioxide, wood, cellulose, leaves, branches, grass, biomass, animal carcasses, fish carcasses, proteins, and mixtures thereof, and
      (iv) the conductive carbon source additive is added to the lower conductivity carbon material to render the conductive carbon source to have a conductivity greater than $10^{-5}$ S/cm.

2. The process of claim 1, wherein the process is a continuous process of moving the conductive carbon source and the synthesized graphene, wherein the movement of the conductive carbon source and synthesized graphene is synchronized to applying the voltage pulse across the conductive carbon source.

3. A process for synthesizing graphene, the process comprising:
- (a) applying a voltage pulse across a conductive carbon source that comprises a carbon source material that is not graphene, wherein a current is conducted across the conductive carbon source by the application of the voltage pulse; and
- (b) heating the conductive carbon source via the current to convert the carbon source material into graphene, wherein
  - (i) the synthesized graphene is turbostratic graphene,
  - (ii) the conductive carbon source comprises a conductive carbon source additive that renders the conductive carbon source to have a conductivity greater than $10^{-5}$ S/cm,
  - (iii) the conductive carbon source additive is selected from a group consisting of anthracite coal, calcined petroleum coke, carbon nanotubes, [graphene quantum dots,] acetylene black, carbon black, shungite, [graphene] or mixtures thereof,
  - (iv) the carbon source material is a lower conductivity carbon material selected from a group consisting of feces, [plastics, vinyl polymers, condensation polymers, step-growth polymers, chain-growth polymers, living polymers, rubbers,] humic acid, carbohydrates, rice powder, food waste, food, [coal,] organic waste, [organic material, bituminous coal,] coke, petroleum coke, oil, petroleum products, carbon from the stripping of the non-carbon atoms off of natural gas or oil or carbon dioxide, wood, cellulose, leaves, branches, grass, biomass, animal carcasses, fish carcasses, proteins, and mixtures thereof, and
  - (v) the conductive carbon source additive is added to the lower conductivity carbon material to render the conductive carbon source to have a conductivity greater than $10^{-5}$ S/cm.

4. The process of claim 3, wherein the turbostratic graphene is a graphene with mis-oriented graphene layers.

\* \* \* \* \*